(12) United States Patent
Stokes et al.

(10) Patent No.: US 11,624,822 B2
(45) Date of Patent: Apr. 11, 2023

(54) PILOT DISPLAY SYSTEMS AND METHODS

(71) Applicant: Teledyne FLIR, LLC, Thousand Oaks, CA (US)

(72) Inventors: Paul Stokes, Fleet (GB); Mark Rivers, Hampshire (GB)

(73) Assignee: Teledyne FLIR, LLC, Thousand Oaks, CA (US)

( * ) Notice: Subject to any disclaimer, the term of this patent is extended or adjusted under 35 U.S.C. 154(b) by 717 days.

(21) Appl. No.: 15/494,232

(22) Filed: Apr. 21, 2017

(65) Prior Publication Data

US 2017/0227639 A1 Aug. 10, 2017

Related U.S. Application Data

(63) Continuation of application No. PCT/US2015/056786, filed on Oct. 21, 2015.
(Continued)

(51) Int. Cl.
*G01S 15/89* (2006.01)
*G01S 7/62* (2006.01)
*G01S 15/10* (2006.01)

(52) U.S. Cl.
CPC ............ *G01S 15/89* (2013.01); *G01S 7/6272* (2013.01); *G01S 7/6281* (2013.01); *G01S 15/104* (2013.01)

(58) Field of Classification Search
CPC ...... G01C 21/20; G01C 21/00; G01C 21/203; G01C 21/005; G05D 1/02; G05D 1/0206; G06F 3/0482; G06F 9/44; G06F 9/451; G01S 7/6272; G01S 13/9307; G01S 15/025; G01S 13/86; G01S 13/862; G01S 13/867; G01S 15/88; G01S 15/89; G01S 15/10;
(Continued)

(56) References Cited

U.S. PATENT DOCUMENTS 4,328,568 A 5/1982 Webb
5,245,587 A 9/1993 Hutson
(Continued)

OTHER PUBLICATIONS

WASSP sonar 1.1: Introduction to multibeam mapping https://www.youtube.com/watch?v=jPZID9aoOSc (Year: 2011).*
(Continued)

*Primary Examiner* — Daniel L Murphy
*Assistant Examiner* — Amie M Ndure
(74) *Attorney, Agent, or Firm* — Haynes and Boone, LLP

(57) ABSTRACT

A method for providing enhanced sonar images includes ensonifying a target column of water with sonar beams corresponding to pulses of continuous wave (CW) and pulse compression (FM) signals. Received acoustic returns are processed to generate sonar image data corresponding to the CW signals and the FM signals. The CW and FM sonar image data are then displayed contemporaneously such that one sonar image data set overlays another. Techniques are also disclosed to provide situational imagery. A pilot display system includes a user interface, a logic device, and a speed sensor mounted to a mobile structure. The user interface is configured to receive user input and provide user feedback, and the logic device is configured to receive a speed of the mobile structure from the speed sensor, generate corresponding situational image data, and render the situational image data via at least one display of the user interface.

20 Claims, 27 Drawing Sheets

Related U.S. Application Data

(60) Provisional application No. 62/069,961, filed on Oct. 29, 2014, provisional application No. 62/066,802, filed on Oct. 21, 2014.

(58) Field of Classification Search
CPC ........ G01S 7/62; G01S 7/6281; G01S 15/104; G08G 3/02; B63B 49/00; B63B 2035/009; B63H 2025/045; B63J 2099/008

See application file for complete search history.

(56) References Cited

U.S. PATENT DOCUMENTS

| | | | | |
|---|---|---|---|---|
| 8,270,666 | B2* | 9/2012 | Nielsen | G09B 29/007 |
| | | | | 382/100 |
| 8,280,631 | B2* | 10/2012 | Nielsen | G06Q 50/06 |
| | | | | 701/521 |
| 8,442,766 | B2* | 5/2013 | Nielsen | B05B 12/124 |
| | | | | 701/521 |
| 8,836,730 | B1* | 9/2014 | Desai | G01C 3/08 |
| | | | | 345/660 |
| 8,954,226 | B1* | 2/2015 | Binion | G07C 5/008 |
| | | | | 701/33.4 |
| 2002/0183927 | A1 | 12/2002 | Odamura | |
| 2003/0083060 | A1* | 5/2003 | Menendez | H04W 88/02 |
| | | | | 455/423 |
| 2004/0184351 | A1* | 9/2004 | Nishimori | G01S 7/52003 |
| | | | | 367/103 |
| 2004/0203909 | A1* | 10/2004 | Koster | H04W 4/02 |
| | | | | 455/456.1 |
| 2005/0039036 | A1* | 2/2005 | Eisen | G06Q 40/02 |
| | | | | 713/193 |
| 2007/0150366 | A1* | 6/2007 | Yahiro | G06Q 10/10 |
| | | | | 705/14.34 |
| 2009/0045290 | A1* | 2/2009 | Small | B64D 39/04 |
| | | | | 244/135 A |
| 2009/0121933 | A1* | 5/2009 | Tucker | G01C 15/00 |
| | | | | 342/357.48 |
| 2010/0157736 | A1* | 6/2010 | Riordan | G01S 15/87 |
| | | | | 367/88 |
| 2010/0250030 | A1* | 9/2010 | Nichols | G01C 23/005 |
| | | | | 701/7 |
| 2010/0305857 | A1* | 12/2010 | Byrne | G06T 7/73 |
| | | | | 701/301 |
| 2011/0184647 | A1* | 7/2011 | Yoel | G08G 5/0078 |
| | | | | 701/301 |
| 2012/0296678 | A1* | 11/2012 | Boot | G06Q 10/02 |
| | | | | 705/5 |
| 2013/0173322 | A1* | 7/2013 | Gray | G06Q 50/06 |
| | | | | 705/7.13 |
| 2013/0271301 | A1* | 10/2013 | Kabel | B63B 49/00 |
| | | | | 340/987 |
| 2013/0286784 | A1 | 10/2013 | Misonoo et al. | |
| 2014/0107914 | A1* | 4/2014 | Toole | G06F 7/00 |
| | | | | 701/300 |
| 2015/0025909 | A1* | 1/2015 | Hayter, II | G06F 19/321 |
| | | | | 705/3 |
| 2015/0066442 | A1* | 3/2015 | Pryor | G06F 17/5009 |
| | | | | 703/1 |
| 2015/0112730 | A1* | 4/2015 | Binion | G06Q 40/08 |
| | | | | 705/4 |
| 2015/0112731 | A1* | 4/2015 | Binion | G06Q 40/08 |
| | | | | 705/4 |
| 2015/0112800 | A1* | 4/2015 | Binion | G06Q 30/0255 |
| | | | | 705/14.53 |
| 2017/0108340 | A1* | 4/2017 | Devi | G01C 21/30 |
| 2019/0132350 | A1* | 5/2019 | Smith | G06F 21/577 |

OTHER PUBLICATIONS

Kohlberg (Waze: Paving the Future of Digital Mapping Nov. 20, 2016, https://digital.hbs.edu/platform-rctom/submission/waze-paving-the-future-of-digital-mapping/; https://www.youtube.com/watch?v=PPpZNzXqId0&t=16s) (Year: 2016).*

McLennan, Donald, "15 Apps for Navigating with your Apple of Android Device", Jun. 18, 2014, pp. 1-11 [online], [retrieved on Jun. 17, 2016], Retrieved from the Internet: <URL:http://www.sailmagazine.com/diy/electronics/navigating-the-app-world/>.

* cited by examiner

PILOT DISPLAY SYSTEMS AND METHODS

CROSS-REFERENCE TO RELATED APPLICATIONS

This application is a continuation of International Patent Application No. PCT/US2015/056786 filed Oct. 21, 2015 and entitled "PILOT DISPLAY SYSTEMS AND METHODS", which is hereby incorporated by reference in its entirety.

International Patent Application No. PCT/US2015/056786 claims priority to and the benefit of U.S. Provisional Patent Application No. 62/066,802 filed Oct. 21, 2014 and entitled "ENHANCED SONAR DISPLAY USING CW/FM PULSE OVERLAYS", and U.S. Provisional Patent Application No. 62/069,961 filed Oct. 29, 2014 and entitled "PILOT DISPLAY SYSTEMS AND METHODS", which are hereby incorporated by reference in their entirety.

This application is related to U.S. patent application Ser. No. 14/261,342 filed Apr. 24, 2014 and entitled "WIDEBAND SONAR WITH PULSE COMPRESSION", which is a continuation of International Patent Application No. PCT/US2012/062288 filed Oct. 26, 2012 and entitled "WIDEBAND SONAR WITH PULSE COMPRESSION", which claims priority to U.S. Provisional Patent Application No. 61/551,859 filed Oct. 26, 2011 and entitled "WIDEBAND ISOLATING TRANSFORMER", and U.S. Provisional Patent Application No. 61/551,883 filed Oct. 26, 2011 and entitled "SONAR WITH PULSE COMPRESSION", which are all hereby incorporated by reference in their entirety.

TECHNICAL FIELD

One or more embodiments of the invention relate generally to marine systems and more particularly, for example, to systems and methods for providing marine display imagery.

BACKGROUND

Sonar can be used to perform bathymetry, detect underwater hazards, find fish, and/or otherwise assist in navigation by producing data and/or imagery of a water column beneath a watercraft. Conventional sonar systems often include one or more independently operating sonar transducers with temporally and/or spatially non-overlapping beams arranged to help differentiate ensonifications and produce traditionally recognizable sonar imagery.

Higher quality sonar imagery has conventionally been associated with relatively large and unwieldy sonar transducer assemblies that can preclude operation in shallow depths. Sonar systems incorporating such assemblies are typically expensive and, a practical matter, cannot be used with a large portion of non-commercial watercraft. At the same time, consumer market pressures and convenience dictate smaller and easier-to-use systems that include more features and produce higher quality resulting imagery. Thus, there is a need for improved methodologies that provide compact, yet feature-rich and flexible-use sonar systems, particularly in the context of providing relatively high quality enhanced sonar data and/or imagery.

In addition, various forms of marine technology may be used to detect movements of a watercraft, the orientation of the watercraft, and the speed of the watercraft over water or ground, among other possibilities. Further, some forms of marine technology may be used to assist in the navigation of the watercraft, for example, by detecting tide heights, water drifts, and currents of bodies of water in relation to the watercraft. As such, conventional marine systems often include a display configured to provide information to a user. As the level of sophistication in marine technology continues to rise, market demands for intuitive and feature-rich user-interfaces follow. Therefore, there is a need for improved methodologies in providing information through recognizable imagery for operating a watercraft

SUMMARY

Systems and methods of the disclosure provide accurate and compact sonar systems for the vessels. A sonar system can include a transducer and associated processing and control electronics and optionally orientation and/or position sensors disposed substantially within the housing of a sonar transducer assembly. The transducer can include multiple transmission and/or receive channels/transducer elements. The transducer assembly can be configured to support and protect the transducer and associated electronics and sensors, to physically and/or adjustably couple to a vessel, and/or to provide a simplified interface to other systems coupled to the vessel. The system can additionally include an actuator configured to adjust the orientation of the transducer assembly. Resulting sonar data and/or imagery can be displayed to a user and/or used to adjust various operational systems of the vessel.

In one example embodiment, a method for providing enhanced sonar images comprises ensonifying a target column of water with alternating pulses of continuous wave (CW) and pulse compression (FM) signals. Received return signals comprising echoes of the ensonifying signals are processed into image data sets respectively corresponding to the CW return signals and the FM return signals. The CW and FM image data sets are then displayed simultaneously or contemporaneously such that the FM image data set overlays the CW image data set.

In another example embodiment, a method for providing an enhanced sonar image comprises ensonifying a target column of water with pulses of compression pulse (FM) signals. Received return signals comprising echoes of the ensonifying signals are processed into a set of high resolution image data and are post-processed into a set of blurred image data. The high resolution and blurred image data sets are then displayed simultaneously or contemporaneously such that the high resolution image data set overlays the blurred image data set.

Techniques are disclosed for systems, methods, and devices that provide situational imagery to help users pilot mobile structures. A pilot display system may include one or more logic devices configured to communicate with various sensors and user interfaces, which may include one or more displays. Each user interface may be in proximity to a mobile structure and/or a user of a mobile structure and be configured to receive user input and provide user feedback with respect to a mobile structure. The logic devices may be configured to receive at least a speed of the mobile structure from a speed sensor mounted to the mobile structure, to generate situational image data based, at least in part, on the speed of the mobile structure, and to render the situational image data via at least one display of the user interface.

In various embodiments, a pilot display system may include one or more orientation sensors, position sensors, gyroscopes, accelerometers, and/or additional sensors, actuators, controllers, user interfaces, mapping systems, AIS transceivers, and/or other modules mounted to or in proximity to a vehicle or mobile structure. Each component of the system may be implemented with a logic device adapted to form one or more wired and/or wireless communication links for transmitting and/or receiving sensor signals, control signals, or other signals and/or data between the components.

In one embodiment, a system may include a user interface configured to receive user input and provide user feedback with respect to a mobile structure, and a logic device configured to communicate with the user interface. The logic device may be configured to receive a speed of the mobile structure from a speed sensor mounted to the mobile structure, generate situational image data based, at least in part, on the speed of the mobile structure, and render the situational image data via at least one display of the user interface. The system may include an orientation sensor mounted on the mobile structure. The logic device may receive an orientation of the mobile structure from the orientation sensor and generate situational image data based, at least in part, on the orientation and/or the speed of the mobile structure. The situational image data may correspond to a chart plot of a graphical area near the mobile structure that may be scaled to the speed of the mobile structure.

In another embodiment, a method may include receiving a speed of a mobile structure, generating situational image data based, at least in part, on the speed of the mobile structure, and rendering the situational image data via at least one display of a user interface in proximity to the mobile structure.

In yet another embodiment, a system may include a user interface configured to receive user input and provide user feedback with respect to a mobile structure. The system may include a logic device configured to communicate with the user interface, where the system further includes means for receiving a speed of the mobile structure from a speed sensor mounted to the mobile structure. The system may include means for generating situational image data based, at least in part, on the speed of the mobile structure. In addition, the system may include means for rendering the situational image data via at least one display of the user interface.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE SEVERAL VIEWS OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

In accordance with various embodiments of the present disclosure, compact sonar systems and methods can advantageously include a controller and one or more sonar transducer assemblies in conjunction with an orientation sensor, a gyroscope, an accelerometer, a position sensor, and/or a speed sensor providing measurements of an orientation, a position, an acceleration, and/or a speed of the sonar transducer assemblies and/or an associated vessel within which the sonar system is disposed. For example, the sensors can be mounted to or within the vessel, or can be integrated with the sonar transducer assemblies and/or the controller.

Embodiments of the present disclosure can reliably produce higher quality imagery and be easier to use than conventional systems and/or methods through the use of multiple types of sonar ensonifications and various processing techniques, and/or by automatically coordinating sonar operation with various orientation and/or position measurements. Moreover, such embodiments can be relatively compact and can be formed according to a number of unique sonar transducer arrangements. The unique sonar transducer arrangements, in turn, provide various opportunities to develop new sonar processing and/or data accumulation techniques, as described herein.

Figure 1A:
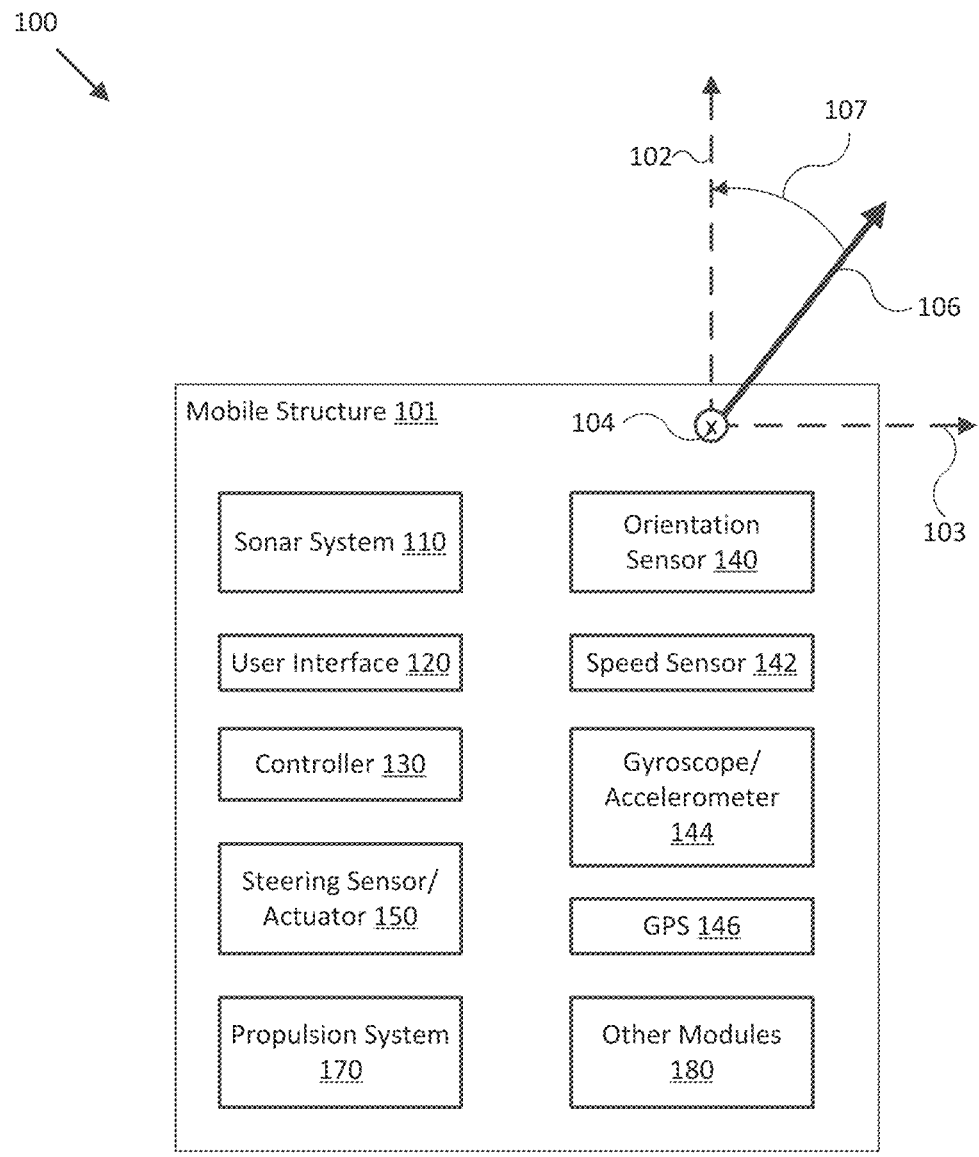
FIG. 1A is a functional block diagram of a sonar system in accordance with an example embodiment of the disclosure.

FIG. 1A illustrates a block diagram of a system 100 in accordance with an embodiment of the disclosure. In various embodiments, system 100 may be adapted to measure an orientation, a position, an acceleration, and/or a speed of mobile structure 101, sonar system 110, and/or user interface 120. System 100 may then use these measurements to form various views of sonar data provided by sonar system 110 and/or to adjust an orientation of sonar system 110 according to a desired operation of sonar system 110 and/or mobile structure 101. In some embodiments, system 100 may display resulting sonar data and/or imagery to a user through user interface 120, and/or use the sonar data and/or imagery to control operation of mobile structure 101, such as controlling steering actuator 150 and/or propulsion system 170 to steer mobile structure 101 according to a desired heading, such as heading angle 107, for example.

In the embodiment shown in FIG. 1A, system 100 may be implemented to provide sonar data and/or imagery for a particular type of vessel/mobile structure 101, such as a drone, a watercraft, an aircraft, a robot, a vehicle, and/or other types of mobile structures. In one embodiment, system 100 may include one or more of a sonar system 110, a user interface 120, a controller 130, an orientation sensor 140, a speed sensor 142, a gyroscope/accelerometer 144, a global positioning satellite system (GPS) 146, a steering sensor/actuator 150, a propulsion system 170, and one or more other sensors and/or actuators, such as other modules 180. In some embodiments, one or more of the elements of system 100 may be implemented in a combined housing or structure that can be coupled to mobile structure 101 and/or held or carried by a user of mobile structure 101.

Directions 102, 103, and 104 describe one possible coordinate frame of mobile structure 101 (e.g., for headings or orientations measured by orientation sensor 140 and/or angular velocities and accelerations measured by gyroscope and/or accelerometer 144). As shown in FIG. 1A, direction 102 indicates a direction that may be substantially parallel to and/or aligned with a longitudinal axis of mobile structure 101, direction 103 indicates a direction that may be substantially parallel to and/or aligned with a lateral axis of mobile structure 101, and direction 104 indicates a direction that may be substantially parallel to and/or aligned with a vertical axis of mobile structure 101, as described herein. For example, a roll component of motion of mobile structure 101 may correspond to rotations around direction 102, a pitch component may correspond to rotations around direction 103, and a yaw component may correspond to rotations around direction 104.

Heading angle 107 may correspond to the angle between a projection of a reference direction 106 (e.g., the local component of the Earth's magnetic field) onto a horizontal plane (e.g., referenced to a gravitationally defined "down" vector local to mobile structure 101) and a projection of direction 102 onto the same horizontal plane. In some embodiments, the projection of reference direction 106 onto a horizontal plane (e.g., referenced to a gravitationally defined "down" vector) may be referred to as Magnetic North. In various embodiments, Magnetic North, a "down" vector, and/or various other directions, positions, and/or fixed or relative reference frames may define an absolute coordinate frame, for example, where directional measurements referenced to an absolute coordinate frame may be referred to as absolute directional measurements (e.g., an "absolute" orientation). In some embodiments, directional measurements may initially be referenced to a coordinate frame of a particular sensor (e.g., a sonar transducer assembly or other module of sonar system 110, and/or user interface 120) and be transformed (e.g., using parameters for one or more coordinate frame transformations) to be referenced to an absolute coordinate frame and/or a coordinate frame of mobile structure 101. In various embodiments, an absolute coordinate frame may be defined and/or correspond to a coordinate frame with one or more undefined axes, such as a horizontal plane local to mobile structure 101 and referenced to a local gravitational vector but with an unreferenced and/or undefined yaw reference (e.g., no reference to Magnetic North).

Sonar system 110 may be implemented as one or more electrically and/or mechanically coupled controllers, transmitters, receivers, transceivers, signal processing logic devices, various electrical components, transducer elements of various shapes and sizes, multichannel transducers/transducer modules, transducer assemblies, assembly brackets, transom brackets, and/or various actuators adapted to adjust orientations of any of the components of sonar system 110, as described herein. For example, in various embodiments, sonar system 110 may be implemented and/or operated according to any of the systems and methods described in U.S. Provisional Patent Application 62/005,838 filed May 30, 2014 and entitled "MULTICHANNEL SONAR SYSTEMS AND METHODS", and/or U.S. Provisional Patent Application 61/943,170 filed Feb. 21, 2014 and entitled "MODULAR SONAR TRANSDUCER ASSEMBLY SYSTEMS AND METHODS", both of which are hereby incorporated by reference in their entirety. In other embodiments, sonar system 110 may be implemented according to other sonar system arrangements that can be used to detect objects within a water column and/or a floor of a body of water.

More generally, sonar system 110 may be configured to emit one, multiple, or a series of acoustic beams, receive corresponding acoustic returns, and convert the acoustic returns into sonar data and/or imagery, such as bathymetric data, water depth, water temperature, water column/volume debris, bottom profile, and/or other types of sonar data. Sonar system 110 may be configured to provide such data and/or imagery to user interface 120 for display to a user, for example, or to controller 130 for additional processing, as described herein.

In some embodiments, sonar system 110 may be implemented using a compact design, where multiple sonar transducers, sensors, and/or associated processing devices are located within a single transducer assembly housing that is configured to interface with the rest of system 100 through a single cable providing both power and communications to and from sonar system 110. In some embodiments, sonar system 110 may include orientation and/or position sensors configured to help provide two or three dimensional waypoints, increase sonar data and/or imagery quality, and/or provide highly accurate bathymetry data, as described herein.

For example, fisherman desire highly detailed and accurate information and/or imagery of underwater structure and mid water targets (e.g., fish). Conventional sonar systems can be expensive and bulky and typically cannot be used to provide enhanced and/or augmented reality underwater views, as described herein. Embodiments of sonar system 110 include low cost single, dual, and/or multichannel sonar systems that can be configured to produce detailed two and three dimensional sonar data and/or imagery. In some embodiments, sonar system 110 may consolidate electronics and transducers into a single waterproof package to reduce size and costs, for example, and may be implemented with a single connection to other devices of system 100 (e.g., via an Ethernet cable with power over Ethernet, an integral power cable, and/or other communication and/or power transmission conduits integrated into a single interface cable).

In various embodiments, sonar system 110 may be configured to provide many different display views from a variety of selectable perspectives, including down imaging, side imaging, and/or three dimensional imaging, using a selection of configurations and/or processing methods, as described herein. In some embodiments, sonar system 110 may be implemented with a single transducer assembly housing incorporating one or two transducers and/or associated electronics. In other embodiments, sonar system 110 may be implemented with a transducer assembly housing incorporating a multichannel transducer and/or associated electronics. Such embodiments can also provide improved image quality by locating transmission and receiver electronics close to their corresponding transmission and receive channels, which can dramatically improve signal to noise relative to systems that transmit and/or receive analog signals over long cabling.

In general, embodiments of sonar system 110 can be configured to transmit shaped acoustic beams using a transmission channel and/or element of a single or multichannel transducer, receive similarly shaped acoustic returns using the same element and/or multiple receive channels and/or elements of the transducer, and to perform various processing (e.g., overlay, blending, beamforming, and/or interferometry processing) on the acoustic returns to produce high quality two and/or three dimensional sonar imagery, as described herein. In some embodiments, one or more sonar transmitters of the sonar system 110 can be configured to use one or both continuous wave (CW), i.e., constant frequency signal pulses, and "CHIRP," i.e., frequency modulated (FM) pulse signals to improve range resolution, and/or otherwise enhance the sonar data and/or imagery, such as reduce ambiguities typically inherent in interferometry processing techniques.

In various embodiments, sonar system 110 may be implemented with optional orientation and/or position sensors (e.g., similar to orientation sensor 140, gyroscope/accelerometer 144, and/or GPS 146) that may be incorporated within the transducer assembly housing to provide three dimensional orientations and/or positions of the transducer assembly and/or transducer(s) for use when processing or post processing sonar data for display. The sensor information can be used to correct for movement of the transducer assembly between ensonifications to provide improved alignment of corresponding acoustic returns/samples, for example, and/or to generate imagery based on the measured orientations and/or positions of the transducer assembly. In other embodiments, an external orientation and/or position sensor can be used alone or in combination with an integrated sensor or sensors.

In embodiments where sonar system 110 is implemented with a position sensor, sonar system 110 may be configured to provide a variety of sonar data and/or imagery enhancements. For example, sonar system 110 may be configured to provide accurate positioning of sonar data and/or user-defined waypoints remote from mobile system 101. Similarly, sonar system 110 may be configured to provide accurate two and/or three dimensional aggregation and/or display of a series of sonar data; without position data, a sonar system typically assumes a straight track, which can cause image artifacts and/or other inaccuracies in corresponding sonar data and/or imagery. Additionally, when implemented with a position sensor and/or interfaced with a remote but relatively fixed position sensor (e.g., GPS 146), sonar system 110 may be configured to generate accurate and detailed bathymetric views of a floor of a body of water.

In embodiments where sonar system 110 is implemented with an orientation and/or position sensor, sonar system 110 may be configured to store such location/position information along with other sensor information (acoustic returns, temperature measurements, text descriptions, water depth, altitude, mobile structure speed, and/or other sensor and/or control information) available to system 100. In some embodiments, controller 130 may be configured to generate a look up table so that a user can select desired configurations of sonar system 110 for a particular location or to coordinate with some other sensor information. Alternatively, an automated adjustment algorithm can be used to select optimum configurations based on the sensor information.

For example, in one embodiment, mobile structure 101 may be located in an area identified on an chart using position data, a user may have selected a user setting for a configuration of sonar system 110, and controller 130 may be configured to control an actuator and/or otherwise implement the configuration for sonar system 110 (e.g., to set a particular orientation). In another embodiment, the controller 130 can be configured to determine water depth, and use such data to control the orientation of the sonar system 110 to maintain an optimum orientation for the reported depths. In yet another useful embodiment, a user could be searching for fish in a relatively wide area and can select a configuration setting that will adjust the transducer assembly configuration to ensonify a relatively broad, shallow area. In still another embodiment, controller 130 may be configured to receive orientation measurements for mobile structure 101. In such embodiment, controller 130 may be configured to control the actuators associated with the transducer assembly to maintain its orientation relative to, for example, the mobile structure and/or the water surface, and thus improve the displayed sonar images (e.g., by ensuring consistently oriented acoustic beams and/or proper registration of a series of acoustic returns). In various embodiments, controller 130 may be configured to control steering sensor/actuator 150 and/or propulsion system 170 to adjust a position and/or orientation of mobile structure 101 to help ensure proper registration of a series of acoustic returns, sonar data, and/or sonar imagery.

Although FIG. 1A shows various sensors and/or other components of system 100 separate from sonar system 110, in other embodiments, any one or combination of sensors and components of system 100 may be integrated with a sonar assembly, an actuator, a transducer module, and/or other components of sonar system 110. For example, orientation sensor 140 may be integrated with a transducer module of sonar system 110 and be configured to provide measurements of an absolute and/or relative orientation (e.g., a roll, pitch, and/or yaw) of the transducer module to controller 130 and/or user interface 120, both of which may also be integrated with sonar system 110.

User interface 120 may be implemented as a display, a touchscreen, a keyboard, a mouse, a joystick, a knob, a steering wheel, a ship's wheel or helm, a yoke, and/or any other device capable of accepting user input and/or providing feedback to a user. Further, user interface 120 may include multiple displays and/or touchscreens that may be mounted to mobile structure 101 and/or be portable and disposed in proximity to mobile structure 101 and/or surrounding areas. In various embodiments, user interface 120 may be adapted to provide user input (e.g., as a type of signal and/or sensor information) to other devices of system 100, such as controller 130. User interface 120 may also be implemented with one or more logic devices that may be adapted to execute instructions, such as software instructions, implementing any of the various processes and/or methods described herein. For example, user interface 120 may be adapted to form communication links, transmit and/or receive communications (e.g., sensor signals, control signals, sensor information, user input, and/or other information), determine various coordinate frames and/or orientations, determine parameters for one or more coordinate frame transformations, and/or perform coordinate frame transformations, for example, or to perform various other processes and/or methods.

In various embodiments, user interface 120 may be adapted to accept user input, for example, to form a communication link, to select a particular wireless networking protocol and/or parameters for a particular wireless networking protocol and/or wireless link (e.g., a password, an encryption key, a MAC address, a device identification number, a device operation profile, parameters for operation of a device, and/or other parameters), to select a method of processing sensor signals to determine sensor information, to adjust a position and/or orientation of an articulated sensor, and/or to otherwise facilitate operation of system 100 and devices within system 100. Once user interface 120 accepts a user input, the user input may be transmitted to other devices of system 100 over one or more communication links.

In one embodiment, user interface 120 may be adapted to receive a sensor or control signal (e.g., from orientation sensor 140 and/or steering sensor/actuator 150) over communication links formed by one or more associated logic devices, for example, and display sensor and/or other information corresponding to the received sensor or control signal to a user. In related embodiments, user interface 120 may be adapted to process sensor and/or control signals to determine sensor and/or other information. For example, a sensor signal may include an orientation, an angular velocity, an acceleration, a speed, and/or a position of mobile structure 101. In such embodiment, user interface 120 may be adapted to process the sensor signals to determine sensor information indicating an estimated and/or absolute roll, pitch, and/or yaw (attitude and/or rate), and/or a position or series of positions of mobile structure 101, for example, and display the sensor information as feedback to a user. In one embodiment, user interface 120 may be adapted to display a time series of various sensor information and/or other parameters as part of or overlaid on a graph or map, which may be referenced to a position and/or orientation of mobile structure 101. For example, user interface 120 may be adapted to display a time series of positions, headings, and/or orientations of mobile structure 101 and/or other elements of system 100 (e.g., a transducer assembly and/or module of sonar system 110) overlaid on a geographical map, which may include one or more graphs indicating a corresponding time series of actuator control signals, sensor information, and/or other sensor and/or control signals.

In some embodiments, user interface 120 may be adapted to accept user input including a user-defined target heading, route, and/or orientation for a transducer module, for example, and to generate control signals for steering sensor/actuator 150 and/or propulsion system 170 to cause mobile structure 101 to move according to the target heading, route, and/or orientation. In further embodiments, user interface 120 may be adapted to accept user input including a user-defined target attitude for an actuated device (e.g., sonar system 110) coupled to mobile structure 101, for example, and to generate control signals for adjusting an orientation of the actuated device according to the target attitude. More generally, user interface 120 may be adapted to display sensor information to a user, for example, and/or to transmit sensor information and/or user input to other user interfaces, sensors, or controllers of system 100, for instance, for display and/or further processing. In one embodiment, user interface 120 may be integrated with one or more sensors (e.g., imaging modules, position and/or orientation sensors, other sensors) and/or be portable (e.g., such as a portable touch display or smart phone, for example, or a wearable user interface) to facilitate user interaction with various systems of mobile structure 101.

Controller 130 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of sonar system 110, steering sensor/actuator 150, mobile structure 101, and/or system 100, for example. Such software instructions may also implement methods for processing sensor signals, determining sensor information, providing user feedback (e.g., through user interface 120), querying devices for operational parameters, selecting operational parameters for devices, or performing any of the various operations described herein (e.g., operations performed by logic devices of various devices of system 100).

In addition, a machine readable medium may be provided for storing non-transitory instructions for loading into and execution by controller 130. In these and other embodiments, controller 130 may be implemented with other components where appropriate, such as volatile memory, non-volatile memory, one or more interfaces, and/or various analog and/or digital components for interfacing with devices of system 100. For example, controller 130 may be adapted to store sensor signals, sensor information, parameters for coordinate frame transformations, calibration parameters, sets of calibration points, and/or other operational parameters, over time, for example, and provide such stored data to a user using user interface 120. In some embodiments, controller 130 may be integrated with one or more user interfaces (e.g., user interface 120), and, in one embodiment, may share a communication module or modules. As noted herein, controller 130 may be adapted to execute one or more control loops for actuated device control, steering control (e.g., using steering sensor/actuator 150) and/or performing other various operations of mobile structure 101 and/or system 100. In some embodiments, a control loop may include processing sensor signals and/or sensor information in order to control one or more operations of sonar system 110, mobile structure 101, and/or system 100.

Orientation sensor 140 may be implemented as one or more of a compass, float, accelerometer, and/or other digital or analog device capable of measuring an orientation of mobile structure 101 (e.g., magnitude and direction of roll, pitch, and/or yaw, relative to one or more reference orientations such as gravity and/or Magnetic North) and providing such measurements as sensor signals that may be communicated to various devices of system 100. In some embodiments, orientation sensor 140 may be adapted to provide heading measurements for mobile structure 101. In other embodiments, orientation sensor 140 may be adapted to provide roll, pitch, and/or yaw rates for mobile structure 101 (e.g., using a time series of orientation measurements). Orientation sensor 140 may be positioned and/or adapted to make orientation measurements in relation to a particular coordinate frame of mobile structure 101, for example.

Speed sensor 142 may be implemented as an electronic pitot tube, metered gear or wheel, water speed sensor, wind speed sensor, a wind velocity sensor (e.g., direction and magnitude) and/or other device capable of measuring or determining a linear speed of mobile structure 101 (e.g., in a surrounding medium and/or aligned with a longitudinal axis of mobile structure 101) and providing such measurements as sensor signals that may be communicated to various devices of system 100. In some embodiments, speed sensor 142 may be adapted to provide a velocity of a surrounding medium relative to sensor 142 and/or mobile structure 101.

Gyroscope/accelerometer 144 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of mobile structure 101 and providing such measurements as sensor signals that may be communicated to other devices of system 100 (e.g., user interface 120, controller 130). Gyroscope/accelerometer 144 may be positioned and/or adapted to make such measurements in relation to a particular coordinate frame of mobile structure 101, for example. In various embodiments, gyroscope/accelerometer 144 may be implemented in a common housing and/or module to ensure a common reference frame or a known transformation between reference frames.

GPS 146 may be implemented as a global positioning satellite receiver and/or other device capable of determining absolute and/or relative position of mobile structure 101 (e.g., or an element of mobile structure 101, such as sonar system 110 and/or user interface 120) based on wireless signals received from space-born and/or terrestrial sources, for example, and capable of providing such measurements as sensor signals that may be communicated to various devices of system 100. In some embodiments, GPS 146 may be adapted to determine a velocity, speed, and/or yaw rate of mobile structure 101 (e.g., using a time series of position measurements), such as an absolute velocity and/or a yaw component of an angular velocity of mobile structure 101. In various embodiments, one or more logic devices of system 100 may be adapted to determine a calculated speed of mobile structure 101 and/or a computed yaw component of the angular velocity from such sensor information.

Steering sensor/actuator 150 may be adapted to physically adjust a heading of mobile structure 101 according to one or more control signals, user inputs, and/or stabilized attitude estimates provided by a logic device of system 100, such as controller 130. Steering sensor/actuator 150 may include one or more actuators and control surfaces (e.g., a rudder or other type of steering or trim mechanism) of mobile structure 101, and may be adapted to physically adjust the control surfaces to a variety of positive and/or negative steering angles/positions.

Propulsion system 170 may be implemented as a propeller, turbine, or other thrust-based propulsion system, a mechanical wheeled and/or tracked propulsion system, a sail-based propulsion system, and/or other types of propulsion systems that can be used to provide motive force to mobile structure 101. In some embodiments, propulsion system 170 may be non-articulated, for example, such that the direction of motive force and/or thrust generated by propulsion system 170 is fixed relative to a coordinate frame of mobile structure 101. Non-limiting examples of non-articulated propulsion systems include, for example, an inboard motor for a watercraft with a fixed thrust vector, for example, or a fixed aircraft propeller or turbine. In other embodiments, propulsion system 170 may be articulated, for example, and may be coupled to and/or integrated with steering sensor/actuator 150, for example, such that the direction of generated motive force and/or thrust is variable relative to a coordinate frame of mobile structure 101. Non-limiting examples of articulated propulsion systems include, for example, an outboard motor for a watercraft, an inboard motor for a watercraft with a variable thrust vector/port (e.g., used to steer the watercraft), a sail, or an aircraft propeller or turbine with a variable thrust vector, for example.

Other modules 180 may include other and/or additional sensors, actuators, communications modules/nodes, and/or user interface devices used to provide additional environmental information of mobile structure 101, for example. In some embodiments, other modules 180 may include a humidity sensor, a wind and/or water temperature sensor, a barometer, a radar system, a light detection and ranging (LIDAR) system, a visible spectrum camera, an infrared camera, and/or other environmental sensors providing measurements and/or other sensor signals that can be displayed to a user and/or used by other devices of system 100 (e.g., controller 130) to provide operational control of mobile structure 101 and/or system 100 that compensates for environmental conditions, such as wind speed and/or direction, swell speed, amplitude, and/or direction, and/or an object in a path of mobile structure 101, for example. In some embodiments, other modules 180 may include one or more actuated devices (e.g., spotlights, infrared illuminators, cameras, radars, LIDARs, sonars, and/or other actuated devices) coupled to mobile structure 101, where each actuated device includes one or more actuators adapted to adjust an orientation of the device, relative to mobile structure 101, in response to one or more control signals (e.g., provided by controller 130). In still further embodiments, other modules 180 may include one or more sensors configured to measure a state of mobile structure 101 and/or an elements or subsystem of mobile structure 101, such as a fuel-usage sensor, one or more user proximity sensors, a light level sensor, an Automatic Identification System (AIS) transmitter and/or receiver, other types of target sensors, and/or other state sensors for mobile structure 101.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sonar data and/or imagery, for example, or for transmitting and/or receiving communications, such as sensor signals, sensor information, and/or control signals, between one or more devices of system 100. In one embodiment, such method may include instructions to receive an orientation, acceleration, position, and/or speed of mobile structure 101 and/or sonar system 110 from various sensors, to determine a transducer orientation adjustment (e.g., relative to a desired transducer orientation) from the sensor signals, and/or to control an actuator to adjust a transducer orientation accordingly, for example, as described herein. In a further embodiment, such method may include instructions for forming one or more communication links between various devices of system 100.

In addition, one or more machine readable mediums may be provided for storing non-transitory instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Each of the elements of system 100 may be implemented with one or more amplifiers, modulators, phase adjusters, beamforming components, digital to analog converters (DACs), analog to digital converters (ADCs), various interfaces, antennas, transducers, and/or other analog and/or digital components enabling each of the devices of system 100 to transmit and/or receive signals, for example, in order to facilitate wired and/or wireless communications between one or more devices of system 100. Such components may be integrated with a corresponding element of system 100, for example. In some embodiments, the same or similar components may be used to perform one or more sensor measurements, as described herein.

For example, the same or similar components may be used to create an acoustic pulse (e.g., a transmission control signal and/or a digital shaping control signal), convert the acoustic pulse to an excitation signal (e.g., a shaped or unshaped transmission signal) and transmit it to a sonar transducer element to produce an acoustic beam, receive an acoustic return (e.g., a sound wave received by the sonar transducer element and/or corresponding electrical signals from the sonar transducer element), convert the acoustic return to acoustic return data, and/or store sensor information, configuration data, and/or other data corresponding to operation of a sonar system, as described herein.

Sensor signals, control signals, and other signals may be communicated among elements of system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of system 100 may include one or more modules supporting wired, wireless, and/or a combination of wired and wireless communication techniques.

In some embodiments, various elements or portions of elements of system 100 may be integrated with each other, for example, or may be integrated onto a single printed circuit board (PCB) to reduce system complexity, manufacturing costs, power requirements, and/or timing errors between the various sensor measurements. For example, gyroscope/accelerometer 144, user interface 120, and controller 130 may be configured to share one or more components, such as a memory, a logic device, a communications module, and/or other components, and such sharing may act to reduce and/or substantially eliminate such timing errors while reducing overall system complexity and/or cost.

Each element of system 100 may include one or more batteries or other electrical power storage devices, for example, and may include one or more solar cells or other electrical power generating devices (e.g., a wind or water-powered turbine, or a generator producing electrical power from motion of one or more elements of system 100). In some embodiments, one or more of the devices may be powered by a power source for mobile structure 101, using one or more power leads. Such power leads may also be used to support one or more communication techniques between elements of system 100.

In various embodiments, a logic device of system 100 (e.g., of orientation sensor 140 and/or other elements of system 100) may be adapted to determine parameters (e.g., using signals from various devices of system 100) for transforming a coordinate frame of sonar system 110 and/or other sensors of system 100 to/from a coordinate frame of mobile structure 101, at-rest and/or in-motion, and/or other coordinate frames, as described herein. One or more logic devices of system 100 may be adapted to use such parameters to transform a coordinate frame of sonar system 110 and/or other sensors of system 100 to/from a coordinate frame of orientation sensor 140 and/or mobile structure 101, for example. Furthermore, such parameters may be used to determine and/or calculate one or more adjustments to an orientation of sonar system 110 that would be necessary to physically align a coordinate frame of sonar system 110 with a coordinate frame of orientation sensor 140 and/or mobile structure 101, for example, or an absolute coordinate frame. Adjustments determined from such parameters may be used to selectively power adjustment servos/actuators (e.g., of sonar system 110 and/or other sensors or elements of system 100), for example, or may be communicated to a user through user interface 120, as described herein.

Figure 1B:
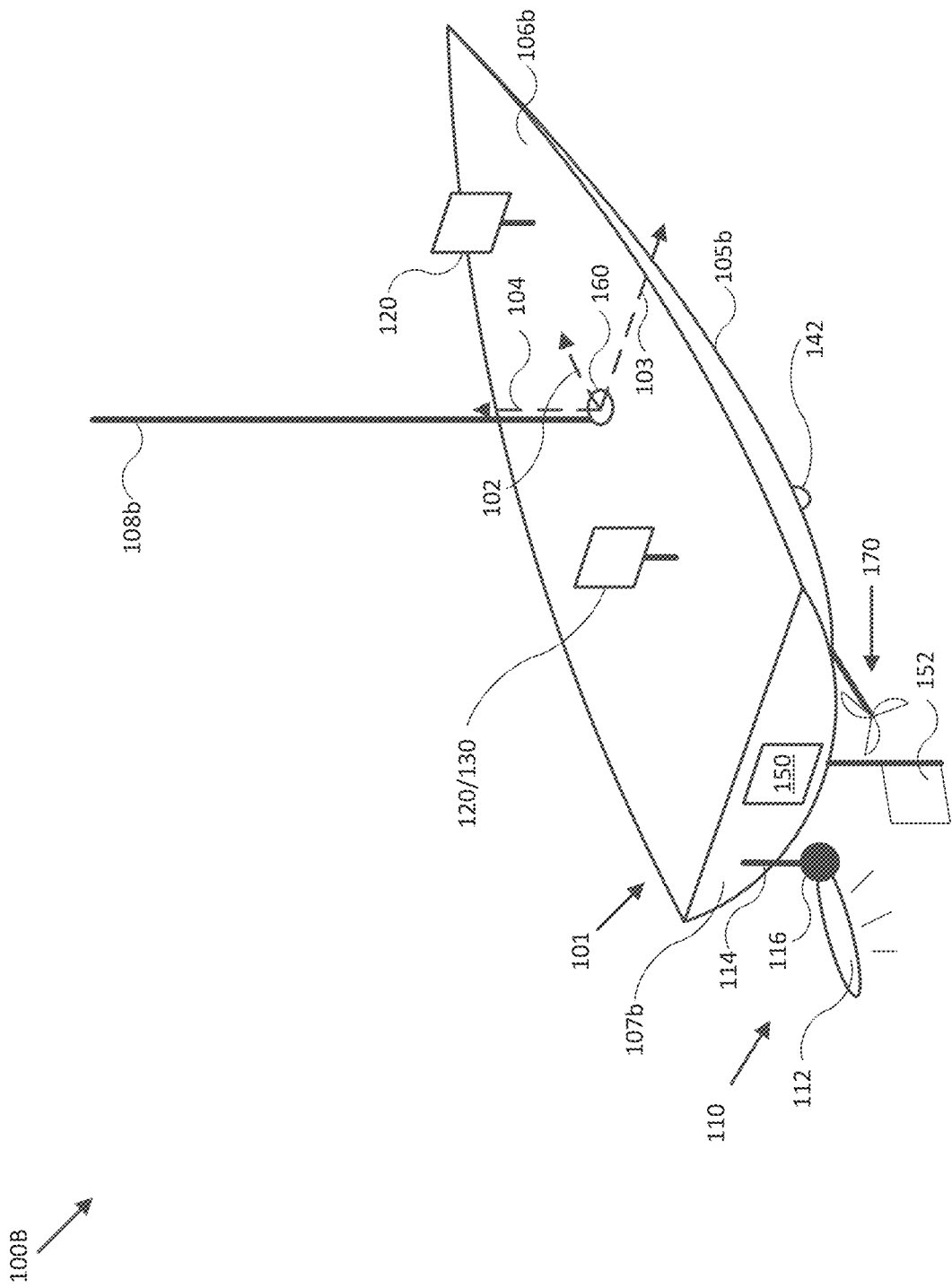
FIG. 1B is a perspective diagram of a vessel incorporating a sonar system in accordance with an example embodiment of the disclosure.

FIG. 1B illustrates a diagram of system 100B in accordance with an embodiment of the disclosure. In the embodiment shown in FIG. 1B, system 100B may be implemented to provide sonar data and/or imagery for use with operation of mobile structure 101, similar to system 100 of FIG. 1B. For example, system 100B may include sonar system 110, integrated user interface/controller 120/130, secondary user interface 120, steering sensor/actuator 150, sensor cluster 160 (e.g., orientation sensor 140, gyroscope/accelerometer 144, and/or GPS 146), imager cluster 161, and various other sensors and/or actuators. In the embodiment illustrated by FIG. 1B, mobile structure 101 is implemented as a motorized boat including a hull 105b, a deck 106b, a transom 107b, a mast/sensor mount 108b, a rudder 152, an inboard motor 170, and an actuated sonar system 110 coupled to transom 107b. In other embodiments, hull 105b, deck 106b, mast/sensor mount 108b, rudder 152, inboard motor 170, and various actuated devices may correspond to attributes of a passenger aircraft or other type of vehicle, robot, or drone, for example, such as an undercarriage, a passenger compartment, an engine/engine compartment, a trunk, a roof, a steering mechanism, a headlight, a radar or LIDAR system, and/or other portions of a vehicle.

As depicted in FIG. 1B, mobile structure 101 includes actuated sonar system 110, which in turn includes transducer assembly 112 coupled to transom 107b of mobile structure 101 through assembly bracket/actuator 116 and transom bracket/electrical conduit 114. In some embodiments, assembly bracket/actuator 116 may be implemented as a roll, pitch, and/or yaw actuator, for example, and may be adapted to adjust an orientation of transducer assembly 112 according to control signals and/or an orientation (e.g., roll, pitch, and/or yaw) or position of mobile structure 101 provided by user interface/controller 120/130. For example, user interface/controller 120/130 may be adapted to receive an orientation of transducer assembly 112 configured to ensonify a portion of surrounding water and/or a direction referenced to an absolute coordinate frame, and to adjust an orientation of transducer assembly 112 to retain ensonification of the position and/or direction in response to motion of mobile structure 101, using one or more orientations and/or positions of mobile structure 101 and/or other sensor information derived by executing various methods described herein.

In another embodiment, user interface/controller 120/130 may be configured to adjust an orientation of transducer assembly 112 to direct sonar transmissions from transducer assembly 112 substantially downwards and/or along an underwater track during motion of mobile structure 101. In such embodiment, the underwater track may be predetermined, for example, or may be determined based on criteria parameters, such as a minimum allowable depth, a maximum ensonified depth, a bathymetric route, and/or other criteria parameters. Transducer assembly 112 may be implemented with a sonar position and/or orientation sensor (SPOS), which may include one or more sensors corresponding to orientation sensor 140, gyroscope/accelerometer 144 and/or GPS 146, for example, that is configured to provide absolute and/or relative positions and/or orientations of transducer assembly 112 to facilitate actuated orientation of transducer assembly 112.

In one embodiment, user interfaces 120 may be mounted to mobile structure 101 substantially on deck 106b and/or mast/sensor mount 108b. Such mounts may be fixed, for example, or may include gimbals and other leveling mechanisms/actuators so that a display of user interfaces 120 can stay substantially level with respect to a horizon and/or a "down" vector (e.g., to mimic typical user head motion/orientation), for example, or so the display can be oriented according to a user's desired view. In another embodiment, at least one of user interfaces 120 may be located in proximity to mobile structure 101 and be mobile/portable throughout a user level (e.g., deck 106b) of mobile structure 101 and proximate areas surrounding mobile structure 101. For example, a secondary user interface 120 may be implemented with a lanyard, strap, headband, and/or other type of user attachment device and be physically coupled to a user of mobile structure 101 so as to be in proximity to the user and mobile structure 101. In various embodiments, user interfaces 120 may be implemented with a relatively thin display that is integrated into a PCB of the corresponding user interface in order to reduce size, weight, housing complexity, and/or manufacturing costs.

As shown in FIG. 1B, in some embodiments, speed sensor 142 may be mounted to a portion of mobile structure 101, such as to hull 105b, and be adapted to measure a relative water speed. In some embodiments, speed sensor 142 may be adapted to provide a thin profile to reduce and/or avoid water drag. In various embodiments, speed sensor 142 may be mounted to a portion of mobile structure 101 that is substantially outside easy operational accessibility. Speed sensor 142 may include one or more batteries and/or other electrical power storage devices, for example, and may include one or more water-powered turbines to generate electrical power. In other embodiments, speed sensor 142 may be powered by a power source for mobile structure 101, for example, using one or more power leads penetrating hull 105b. In alternative embodiments, speed sensor 142 may be implemented as a wind velocity sensor, for example, and may be mounted to mast/sensor mount 108b to have relatively clear access to local wind.

In the embodiment illustrated by FIG. 1B, mobile structure 101 includes direction/longitudinal axis 102, direction/lateral axis 103, and direction/vertical axis 104 meeting approximately at mast/sensor mount 108b (e.g., near a center of gravity of mobile structure 101). In one embodiment, the various axes may define a coordinate frame of mobile structure 101 and/or sensor cluster 160. Each sensor adapted to measure a direction (e.g., velocities, accelerations, headings, or other states including a directional component) may be implemented with a mount, actuators, and/or servos that can be used to align a coordinate frame of the sensor with a coordinate frame of any element of system 100B and/or mobile structure 101. Each element of system 100B may be located at positions different from those depicted in FIG. 1B. Each device of system 100B may include one or more batteries or other electrical power storage devices, for example, and may include one or more solar cells or other electrical power generating devices. In some embodiments, one or more of the devices may be powered by a power source for mobile structure 101. As noted herein, each element of system 100B may be implemented with an antenna, a logic device, and/or other analog and/or digital components enabling that element to provide, receive, and process sensor signals and interface or communicate with one or more devices of system 100B. Further, a logic device of that element may be adapted to perform any of the methods described herein.

Under some circumstances, it may be challenging for a user to view image data and/or numerical data on a marine display. For example, sonar, radar, LIDAR, map or chart, and/or other types of image data may be difficult to view and/or interpret when viewed while mobile structure 101 is heaving, pitching, or and/or vibrating on water, possibly due to mobile structure 101 bouncing off waves and/or reacting to currents in water. Other external influences may include tides and/or strong winds, which may cause rolling and/or other motion of mobile structure 101. In such environments, viewing the image data may be imperative for maneuvering mobile structure 101 to a safer environment. Further, certain types of image data may be more helpful and/or relevant than other types of image data, depending on the particular environmental conditions.

Figure 1C:
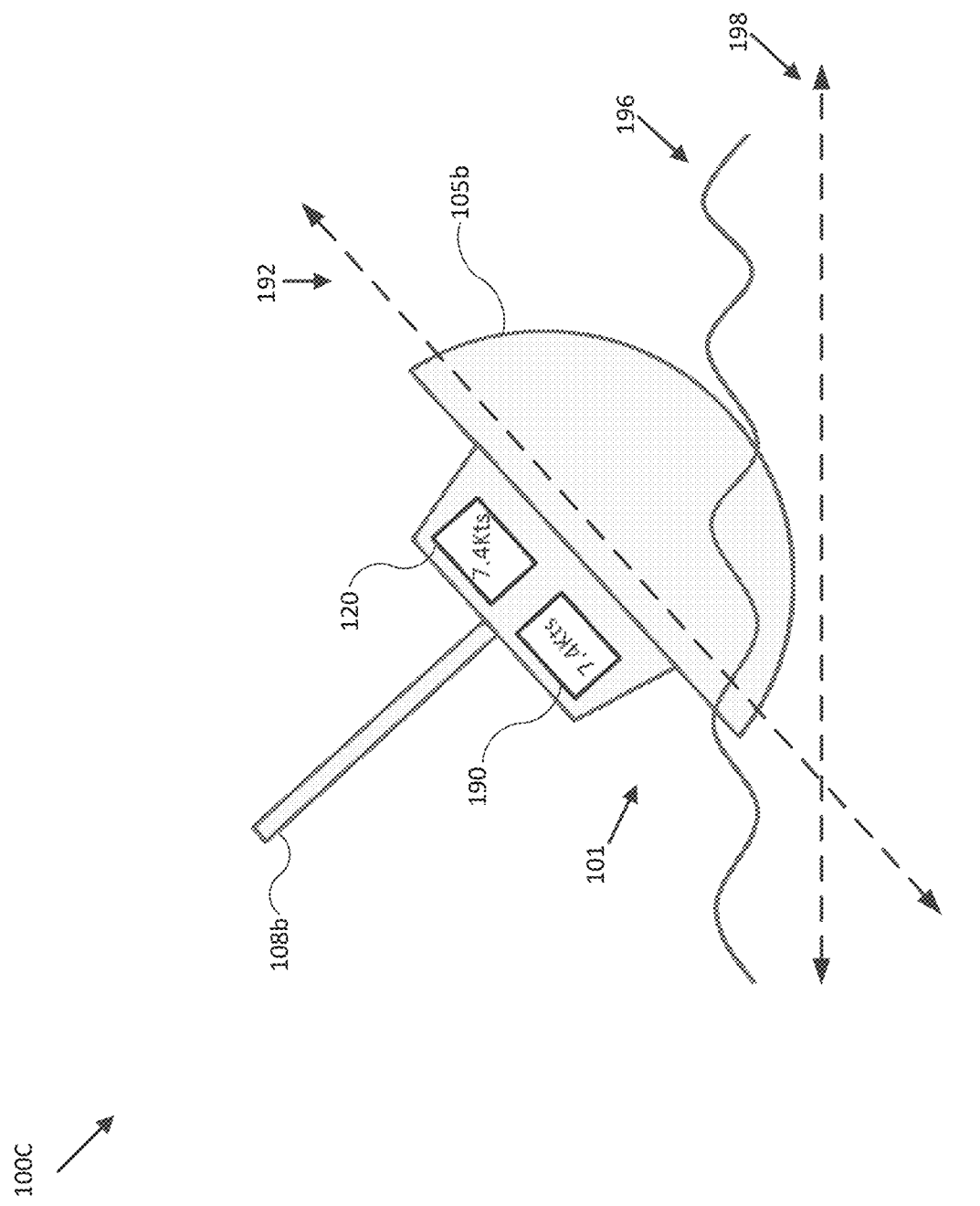
FIG. 1C illustrates a diagram of a pilot display system in accordance with an embodiment of the disclosure.

FIG. 1C illustrates a diagram of a pilot display system 100C in accordance with an embodiment of the disclosure. As shown, FIG. 1C illustrates a rear or front view of mobile structure 101, including mast 108*b*, user interfaces 120 and 190, and hull 105*b*. Also shown are plane 192 (e.g., corresponding to lateral axis 103 of mobile structure 101), plane 198 (e.g., corresponding to the general surface of water 196 and/or one or more ground surfaces beneath water 196). In particular, plane 192 indicates the roll of mobile structure 101 as it travels across water 196.

As shown in FIG. 1C, user interfaces 120 and 190 may be configured to display image data (e.g., the speed of mobile structure 101), and, more specifically, user interface 120 may be configured compensate for the roll experienced by mobile structure 101 when displaying the image data, and user interface 190 may be configured to display the image data without compensation. More generally, user interfaces 120 and/or 190 may be configured to display image data that is rotated, warped, and/or otherwise processed to help compensate for deviations in a roll, pitch, and/or yaw of mobile structure 101 (relative to an at-rest or gravity-referenced orientation, for example) to provide image data that is more easily interpreted and/or read by a user. In embodiments with multiple displays, system 100C may be configured to selectively rotate or otherwise process portions of image data, for example, such as where the portions of image data do not span across multiple displays, or where certain displays are designated to display non-motion compensated image data. In various embodiments, deviations in an orientation of mobile structure 101 may be detected and/or measured by orientation sensor 140. In some instances, various external influences and conditions may be determined through sensor inputs and/or manual settings. For example, the sensor inputs may detect tides, strong winds, various currents, lighting conditions, fog, a time of day, sunlight, and/or a position of the sun with respect to one or more displays of user interface 120. Yet further, other types of environmental conditions may include logistical conditions, such as a distance between a user of mobile structure 101 and user interface 120.

Figure 2A:
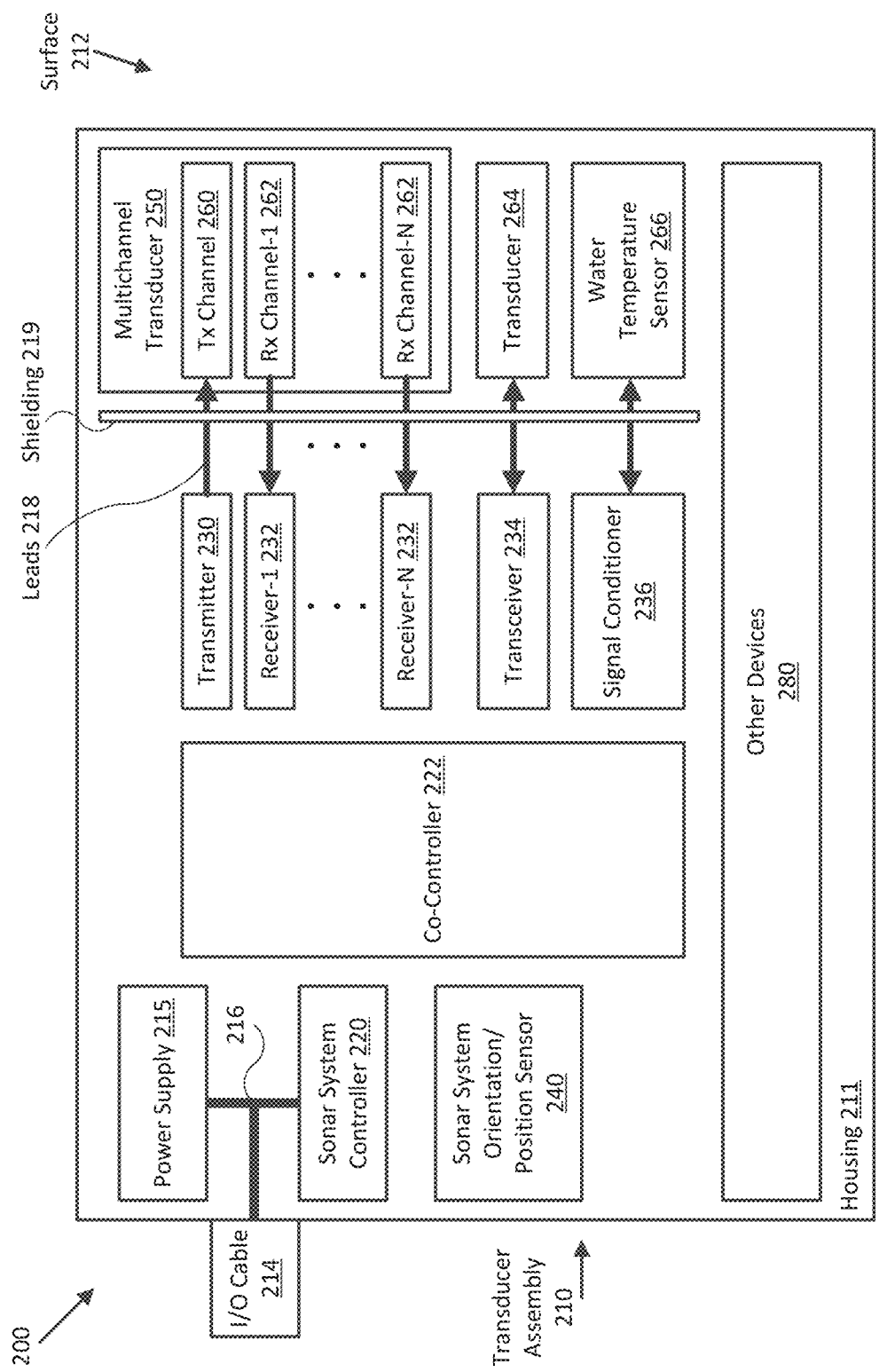
FIG. 2A is a functional block diagram of a sonar system in accordance with an example embodiment of the disclosure.

FIG. 2A illustrates a diagram of a sonar system 200 in accordance with an embodiment of the disclosure. In the embodiment illustrated in FIG. 2A, the sonar system 200 includes a transducer assembly 210 that can be coupled to a user interface (e.g., the user interface 120 of FIG. 1A) and/or a power source through a single I/O cable 214. As shown, the transducer assembly 210 can include one or more controllers (e.g., a sonar system controller 220 and/or a co-controller 222), a transducer or transducers (e.g., a transducer 250 and/or a transducer 264), other sensors (e.g., an orientation/position sensor 240 and/or a water temperature sensor 266), and/or other devices facilitating operation of the system 200 all disposed within a common housing 211. In other embodiments, one or more of the devices shown in FIG. 2A can be integrated with a remote user interface and communicate with the remaining devices disposed in the transducer assembly 210 through one or more data and/or power cables similar to I/O cable 214.

The controller 220 and/or the co-controller 222 can each be implemented as any appropriate logic device (e.g., processing device, microcontroller, processor, application specific integrated circuit (ASIC), field programmable gate array (FPGA), memory storage device, memory reader, or other device or combinations of devices) that can be adapted to execute, store, and/or receive appropriate instructions, such as software instructions implementing a control loop for controlling various operations of the transducer assembly 210 and/or the system 200, for example, similar to the controller 130. In typical embodiments, the controller 220 can be tasked with overseeing general operation of the transducer assembly 210, generating sonar imagery from sonar data, correlating sensor data with sonar data/imagery, communicating operational parameters and/or sensor information with other devices through the I/O cable 214, and/or other non-time-critical operations of the system 200. In such embodiments, the co-controller 222 can be implemented with relatively high resolution timing circuitry capable of generating digital transmission and/or sampling control signals for operating transmitters, receivers, transceivers, signal conditioners, and/or other devices of the transducer assembly 210, for example, and other time critical operations of the system 200, such as per-sample digital beamforming and/or interferometry operations applied to sonar returns from the transducer 250, as described herein. In some embodiments, the controller 220 and the co-controller 222 can be integrated together, for example, or can be implemented in a distributed manner across a number of individual controllers.

The transmitter 230 can be implemented with one or more digital to analog converters (DACs), signal shaping circuits, filters, phase adjusters, signal conditioning elements, amplifiers, timing circuitry, logic devices, and/or other digital and/or analog electronics configured to accept digital control signals from the co-controller 222 and to generate transmission signals to excite a transmission channel/transducer element of the transducer 250 (e.g., transmission channel 260) to produce one or more acoustic beams. In some embodiments, the operation of the transmitter 230 (e.g., amplification, frequency dependent filtering, transmit signal frequency, duration, shape, and/or timing/triggering, and/or other signal attributes), can be controlled (e.g., through use of various control signals) by the co-controller 222, as described herein.

Each of the receivers 232 (e.g., for N channels as shown) can be implemented with one or more analog to digital converters (ADCs), filters, phase adjusters, signal conditioning elements, amplifiers, timing circuitry, logic devices, and/or other digital and/or analog electronics configured to accept analog acoustic returns from a corresponding receive channel/transducer element of the transducer 250 (e.g., receive channels 262), convert the analog acoustic returns into digital acoustic returns, and to provide the digital acoustic returns to the co-controller 222. In some embodiments, the operation of each receiver 232 (e.g., amplification, frequency dependent filtering, basebanding, sample resolution, duration, and/or timing/triggering, and/or other ADC/signal attributes) can be controlled by the co-controller 222. For example, the co-controller 222 can be configured to use the receivers 232 to convert an acoustic return into a digital acoustic return comprising one or more digital baseband transmissions that are then provided to the co-controller 222. In some embodiments, the receivers 232 can be configured to low-pass or otherwise filter, amplify, decimate, and/or otherwise process the acoustic and/or digital acoustic returns (e.g., using analog and/or digital signal processing) prior to providing the digital acoustic returns to the co-controller 222. In other embodiments, the receivers 232 can be configured to provide substantially unprocessed (e.g., raw) analog and/or digital acoustic returns to the co-controller 222 for further signal processing, as described herein. In further embodiments, the transmitter 230 and one or more of the receivers 232 can be integrated into a single transceiver.

In the embodiment illustrated in FIG. 2A, the transducer 250 includes multiple transducer elements and/or transmission/receive channels that can be operated substantially independently of each other and be configured to emit acoustic beams and receive acoustic returns through an emission surface 212 of the housing 211. In some embodiments, the transducer 250 can include a single transmission channel 260 and, separately, multiple receive channels 262. In other embodiments, the transducer 250 can include multiple transmission channels. In further embodiments, the transmission channel 260 can be implemented as both a transmission channel and a receive channel though the use of a transceiver (e.g., similar to the transceiver 234). In general, the transmission channel 260 can be implemented as one, two, or many separate the transducer elements configured to produce one or more acoustic beams. Each of the receive channels 262 can also be implemented as one, two, or many separate transducer elements, but configured to receive acoustic returns. The effective volumetric shapes of the acoustic beams and acoustic returns can be determined by the shapes and arrangements of their corresponding transducer elements. In various embodiments, the various channels of the transducer 250 can be arranged to facilitate processing, such as beamforming, interferometry, inter-beam interpolation, and/or other types of processing used to produce sonar data and/or imagery.

For example, in one embodiment, the transducer 250 can be implemented with multiple transmission channels 260 arranged in a phased array to enable electronic steering of relatively narrow acoustic beams (relative to those produced by a single transmission channel 260) within a relatively wide range of transmission angles. In such embodiments, the transducer assembly 210 can be configured to use such electronically steered beams to improve signal-to-noise in resulting sonar data and/or imagery and/or to improve rejection of false targets detected in the corresponding acoustic returns. A related and less complex embodiment could be a transmission array implemented without phasing such that the resulting acoustic beam width can be adjusted by including or excluding transmission channels and/or elements. For example, such embodiments could be used to alternate between operation in deep versus shallow waters, in which, for example, the acoustic beams could be switched between relatively narrow for deep water and relative wide for shallow water.

In some embodiments, the transducer assembly 210 can be implemented with one or more additional transducers (e.g., the transducer 264) separate from the transducer 250, and serviced by separate transmitter/receiver electronics similar to the transmitter 230 and/or the receivers 232 (e.g., transceiver 234, which can include high voltage protection circuitry and/or transmit/receive switching to enable transmission and reception over the same leads 218). In various embodiments, the operation of the transceiver 234 and/or the transducer 264 (including its constituent transducer elements) can be controlled by the co-controller 222, similar to the control of transmitter 230 and/or the receivers 232 described herein. Typically, the transceiver 234 and/or the transducer 264 can be configured to produce acoustic beams adapted to reduce or eliminate interference with operation of the transducer 250, such as by using a substantially different transmission frequency, timing, and/or shape, and/or by aiming the acoustic beams in a substantially non-interfering direction. In alternative embodiments, the transceiver 234 and/or the transducer 264 can be configured to generate acoustic beams that produce acoustic returns in the transducer 250, similar to operation of the transmitter 230 and transmission channel 260, but from an oblique angle relative to the transducer 250. In such embodiments, the oblique acoustic returns can be used to generate sonar imagery with increased spatial differentiation and/or contrast between objects in the water column ensonified by the transducer assembly 210.

The transducer assembly 210 can include a water temperature sensor 266, which can be a digital and/or analog thermometer, sound cell, and/or other analog or digital device configured to measure the temperature of the water near the emission surface 212 and to provide a corresponding sensor signal to the signal conditioner 236 and/or the co-controller 222. For example, sound velocity and/or attenuation in water is at least partially dependent on water temperature, and so measured water temperatures can be used to determine accurate measurements of spatial displacements (e.g., depths, object dimensions, and/or other spatial displacements) ensonified by the transducer assembly 210. The signal conditioner 236 can be one or more ADCs, filters, signal conditioning elements, amplifiers, timing circuitry, logic devices, and/or other digital and/or analog electronics configured to accept sensor signals from the water temperature sensor 266, filter, amplify, linearize, and/or otherwise condition the sensor signals, and to provide the conditioned sensor signals to the co-controller 222. In some embodiments, the signal conditioner 236 can be configured to provide reference signals and/or other control signals to the water temperature sensor 266 to enable operation of a particular type of water temperature sensor, for example, and can be controlled by the co-controller 222.

In FIG. 2A, each of the multichannel transducer 250, the transducer channels 262, and/or the water temperature sensor 266 are coupled to their electronics over leads 218 and through shielding 219. In various embodiments, the leads 218 and/or the shielding 219 can be implemented as one or more shielded transmission lines configured to convey analog and/or digital signals between the various elements while shielding the transducers and/or temperature sensor from electromagnetic interference from each other, other elements of the transducer assembly 210, and/or external sources. In some embodiments, the leads 218 and the shielding 219 can be integrated together to form a transmission system. For example, the shielding 219 can be configured to provide a ground plane/return for signals conveyed by the leads 218. In one embodiment, the leads 218 can be implemented as a first conductive ribbon with multiple electrically isolated conductive traces (e.g., one for each channel/sensor), for example, and the shielding 219 can be implemented as a second conductive ribbon with relatively wide conductive traces electrically coupled to multiple channels of the transducer 250, the transducer 264, and/or the water temperature sensor 266.

As illustrated, the transducer assembly 210 can be implemented with a sonar system orientation/position sensor 240. The orientation/position sensor 240 can be implemented as one or more orientation sensors, GPS sensors, differential GPS sensors, orientation/position reference transducers and/ or optical sensors (e.g., for actuators), and/or other sensors configured to measure the relative and/or absolute orientation and/or position of the transducer assembly 210 and/or the transducer 250 and to provide such measurements to the controller 220 and/or the co-controller 222. In some embodiments, the controller 220 and/or the co-controller 222 can be configured to combine sonar data and/or imagery according to such measurements and/or measurements of the orientation and/or position of the vessel 101 to produce combined sonar data and/or imagery, such as multiple co-registered sonar images, for example, and/or three dimensional sonar images. In other embodiments, the controller 220 and/or the co-controller 222 can be configured to use orientation and/or position measurements of the transducer assembly 210 and/or a coupled the vessel to control one or more actuators (e.g., other devices 280) to adjust the position and/or orientation of the transducer assembly 210 and thereby ensonify a particular position and/or orientation using the transducer assembly 210 and/or the transducer 250.

The other devices 280 of the assembly 210 can include other and/or additional sensors, sensor arrays, actuators, logic devices, communications modules/nodes, power distribution components, and/or user interface devices used to provide additional environmental information and/or configuration parameters, for example, and/or to adjust the position and/or orientation of the transducer assembly 210. In some embodiments, the other devices 280 can include a visible spectrum camera, an infrared camera, and/or other environmental sensors that provide measurements and/or other sensor signals that can be displayed to a user and/or used by other devices of the transducer assembly 210 (e.g., the controller 220) to provide operational control of the transducer assembly 210. In some embodiments, the other devices 280 can include one or more actuators adapted to adjust the orientation (e.g., roll, pitch, and/or yaw) and/or the position (longitudinal, lateral, and/or vertical) of the transducer assembly 210, the transducer 250, and/or the transducer 264, relative to the vessel 101, in response to one or more control signals (e.g., provided by the controller 220). In other embodiments, the other devices 280 can include one or more brackets, such as a transom bracket, adapted to couple the housing 211 to the vessel 101.

In various embodiments, the transducer assembly 210 can be implemented in a single housing 211 with a single interface (e.g., the I/O cable 214) to simplify installation and use. For example, the I/O cable 214 can be implemented as a power-over-Ethernet (POE) cable supporting transmission of both communications and power between the transducer assembly 210 and elements of the vessel 101. Such communications and/or power can be delivered over leads 216 to a power supply 215 and/or the controller 220. The power supply 215 can be implemented as one or more power conditioners, line filters, switching power supplies, DC to DC converters, voltage regulators, power storage devices (e.g., batteries), and/or other power supply devices configured to receive power over the leads 216 and/or to distribute power to the various other elements of transducer assembly 210.

In various location sensor applications, including sonar, radar, and/or other transmission signal-based sensor systems, it is advantageous to be able to control the overall shape and/or coherency of the transmission signal (e.g., a burst of coherent signal pulses). From a processing perspective, shaping and frequency modulation of the transmission signal can reduce the number and magnitude of artifacts, including noise and reverberation, that typically occur along the range direction of the sensor system, thereby improving the quality and accuracy of resulting imagery and collateral processing, such as reducing false target detection. From a power amplifier design perspective, the shaping can reduce transients and associated issues with component saturation. From an electromagnetic compatibility (EMC) perspective, the shaping can reduce harmonics and associated spurious interference. Switching methods, such as pulse width modulation (PWM), pulse amplitude modulation (PAM), pulse density modulation (PDM), pulse frequency modulation (PFM), or pulse code modulation (PCM) require relatively expensive fast switching components that can introduce unwanted harmonics and otherwise cause degradation in operation of a sensor system.

Figure 2B:
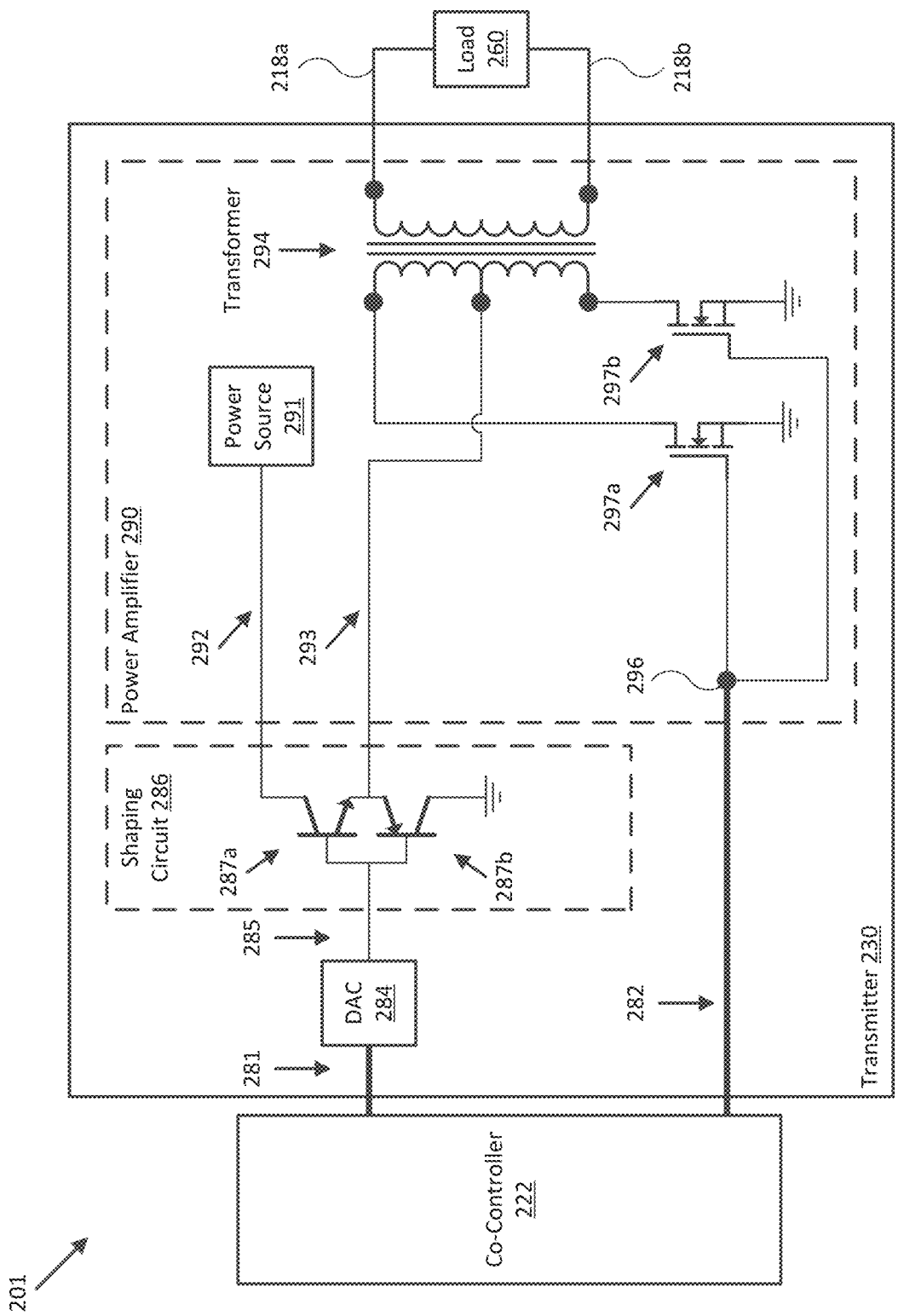
FIG. 2B is a functional block diagram of a sonar transmitter in accordance with an example embodiment of the disclosure.

FIG. 2B illustrates a diagram of a sonar transmitter 230 configured to implement a digitally controlled method of shaping a transmission signal without the need for fast switching components, in accordance with an embodiment of the disclosure. Other embodiments of sonar transmitter 230 may be configured to provide an FM pulse, which may or may not be shaped as described herein. In the embodiment shown in FIG. 2B, the system 201 includes the co-controller 222 configured to provide a digital shaping control signal over the lead 281, and a transmission control signal over the lead 282, to the transmitter 230, which in turn, is configured to provide a shaped transmission signal to a load 260 over the leads 218a-b.

As illustrated in FIG. 2B, the transmitter 230 can be implemented with a shaping circuit 286 (e.g., an emitter-follower type of circuit) that is operated by the co-controller 222 through a DAC 284. This arrangement digitally controls the proportion of a reference voltage (e.g., provided by the power source 291 over the lead 292) that is presented to the power amplifier 290 over the lead 293, and hence, shapes the transmission signal (e.g., corresponding to a transmission control signal provided over the lead 282 by the co-controller 222).

For example, in general operation, the co-controller 222 can be configured to provide two digital control signals to the transmitter 230, viz., a digital shaping control signal over the lead 281, and a transmission control signal over the lead 282. The lead 281 can provide the digital shaping control signal to the DAC 284 of the transmitter 230, and the DAC 284 can be configured to convert the digital shaping control signal to a corresponding analog shaping control signal that is provided to the shaping circuit 286 over the lead 285. The shaping circuit 286 can be configured to convert a reference voltage (e.g., provided by the power source 291 of the power amplifier 290) to a shaped voltage corresponding to the analog shaping control signal, for example, and the shaped voltage can be provided to the power amplifier 290 over the lead 293. The power amplifier 290 can be configured to convert the shaped voltage into a shaped transmission signal corresponding to both the digital shaping control signal and the transmission control signal provided by the co-controller 222. The power amplifier 290 can also be configured to provide the shaped transmission signal to the load 260 over the leads 218a-b, as illustrated in FIG. 2B.

The DAC 284 can be implemented with one or more logic devices, filters, amplifiers, timing circuitry, and/or other digital and/or analog electronics configured to convert the digital shaping control signal to a corresponding analog shaping control signal and provide the analog shaping control signal to the shaping circuit 286. In some embodiments, the DAC 284 can be configured to use the digital shaping control signal directly to charge one or more capacitors that are then controllably discharged in order to convert the digital shaping control signal into a corresponding analog shaping control signal without reliance on a digital interface between the co-controller 222 and the DAC 284.

The shaping circuit 286 can be implemented with one or more transistors, filter arrangements, amplifier arrangements, and/or other digital and/or analog electronics configured to receive an analog shaping control signal, convert a reference voltage to a corresponding shaped voltage, and provide the shaped voltage to the power amplifier 290. In one embodiment, the shaping circuit 286 can be configured to provide current gain and/or to act as an analog current amplifier for the analog shaping control signal. For example, the shaping circuit 286 can be implemented with one or more bipolar junction transistors (BJTs) arranged in an emitter-follower and/or a voltage buffer circuit, as illustrated. In some embodiments, the shaping circuit 286 can include NPN BJT 287a and PNP BJT 287b with coupled emitters and bases, with the bases coupled to receive the analog shaping control signal, one collector coupled to the reference voltage, and the other collector coupled to ground.

The power amplifier 290 can be implemented with one or more power sources, transformers, transistors, and/or other digital and/or analog electronics configured to receive a shaped voltage from the shaping circuit 286 and convert the shaped voltage into a corresponding shaped transmission signal. In some embodiments, the power amplifier 290 can be implemented with the power source 291 configured to supply a reference voltage and sufficient backing current to the shaping circuit 286 in order to generate a shaped transmission signal across the leads 218a-b using the shaped voltage supplied by the shaping circuit 286, as described herein.

In one embodiment, the power amplifier 290 can include a transformer 294 and current switches 297a-b, all configured to convert a shaped voltage provided over lead 293 and a transmission control signal provided over the lead 282 into a corresponding shaped transmission signal. In such an embodiment, the transformer 294 can be implemented with a primary winding coupled to the shaped voltage and the current switches 297a-b, and a secondary winding coupled to the leads 218a-b. The primary and secondary windings can have the same or a different number of windings, for example, and the number of windings can depend on the expected currents and loads and can be configured to maximize the power delivered to the load 260. The primary winding can be center tapped, for example, or can be tapped off-center to tune the transmitter 230 so as to maximize the power delivered to the load 260, and the tap can be coupled to the shaped voltage as shown. The ends of the primary winding can be coupled to the switches 297a-b as shown, which can be controlled by the co-controller 222 using the transmission control signal provided over the lead 282.

In one embodiment, the transmission control signal can include a positive signal component and a negative signal component transmitted on different conductors of the lead 282. The different conductors can be split at node 296 and each conductor then coupled to corresponding control leads of the current switches 297a-b.

In some embodiments, the current switches 297a-b can be implemented from one or more MOSFETs, such as one or more N-channel inductive channel MOSFETs, for example, and the control leads can correspond to the gates of the MOSFETs. In various embodiments, a positive voltage at a control lead of either current switch 297a-b causes a first current to pass through the primary winding of the transformer 294 from the tap to the top or bottom end and then to ground, and the amount of first current is determined, at least in part, by the shaped voltage provided by the shaping circuit 286, as shown and described. The first current induces a second current in the secondary windings that, in turn, produces a corresponding second voltage across the load 260. The amount and polarity of the second current and voltage are determined, at least in part, by the amount and polarity of the first current, which in turn, is determined by the shaped voltage and operation of one of the current switches 297a-b. Thus, when presented with a shaped voltage and a transmission control signal, the power amplifier 290 converts the shaped voltage into a shaped transmission signal corresponding to both the digital shaping control signal and the transmission control signal provided by the co-controller 222.

Figure 2C:
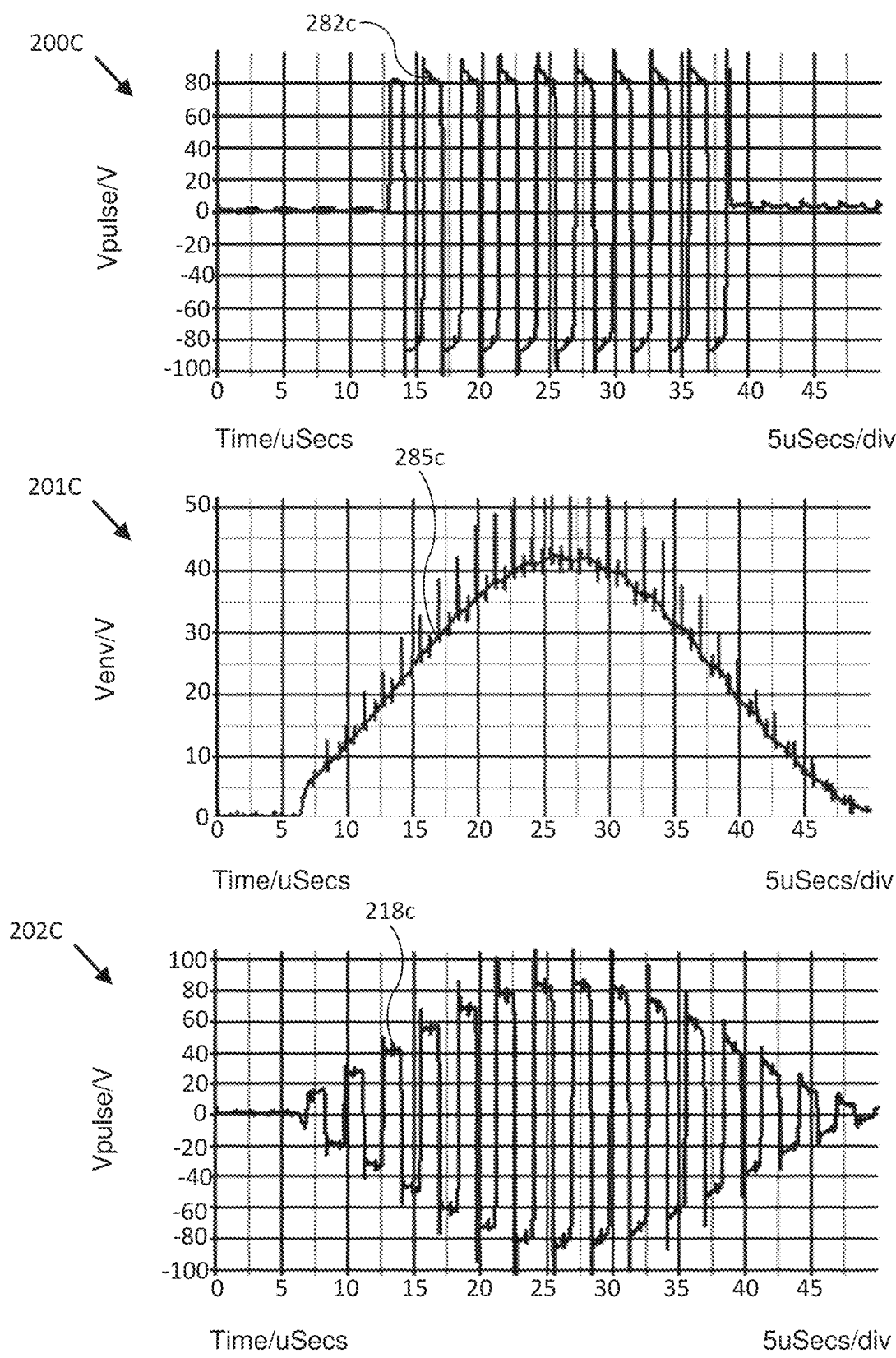
FIG. 2C are graphs of various signals of a sonar transmitter in accordance with an example embodiment of the disclosure.

FIG. 2C shows graphical illustrations of various signals of the sonar transmitter 230 in accordance with an embodiment of the disclosure. The graphs 200C, 201C, and 202C show simulations of an unshaped, constant frequency or "continuous wave" (CW) pulse transmission signal 282c, an analog shape-control envelope signal 285c, and an amplitude modulated or shaped transmission signal 218c, respectively, in which the shaped transmission signal 218c has been formed, or amplitude modulated, using a slow-changing envelope (e.g., the analog shape control signal 285c) relative to the transmission control signal (e.g., corresponding to the unshaped transmission signal 282c). As discussed below in connection with FIGS. 15-17, the transmitter 230 can also be configured to produce frequency-modulated (FM), i.e., "chirped" transmission signals, which may themselves be shaped or unshaped.

In some embodiments, the transmitter 230 can be used to excite a transmission channel of the transducer 250, as illustrated in FIG. 2A, and/or can be used to implement a portion of the transceiver 234 to excite the transducer 264. In other embodiments, the transmitter 230 can be used to excite a single sonar, radar, or other type sensor element and/or load, for example, or multiple sensor elements and/or sensor channels. In general, embodiments of the transmitter 230 can be used with any type of sensor system that utilizes transmission signals to operate and that would benefit from shaped transmission signals, as described herein. For example, the load 260 can be implemented as a sonar transducer, a radar antenna, a transducer and/or antenna array, and/or other loads adapted to accept an electrical transmission signal and produce corresponding sound and/or other types of propagating mechanical and/or electromagnetic pulses or waves.

Figure 3:
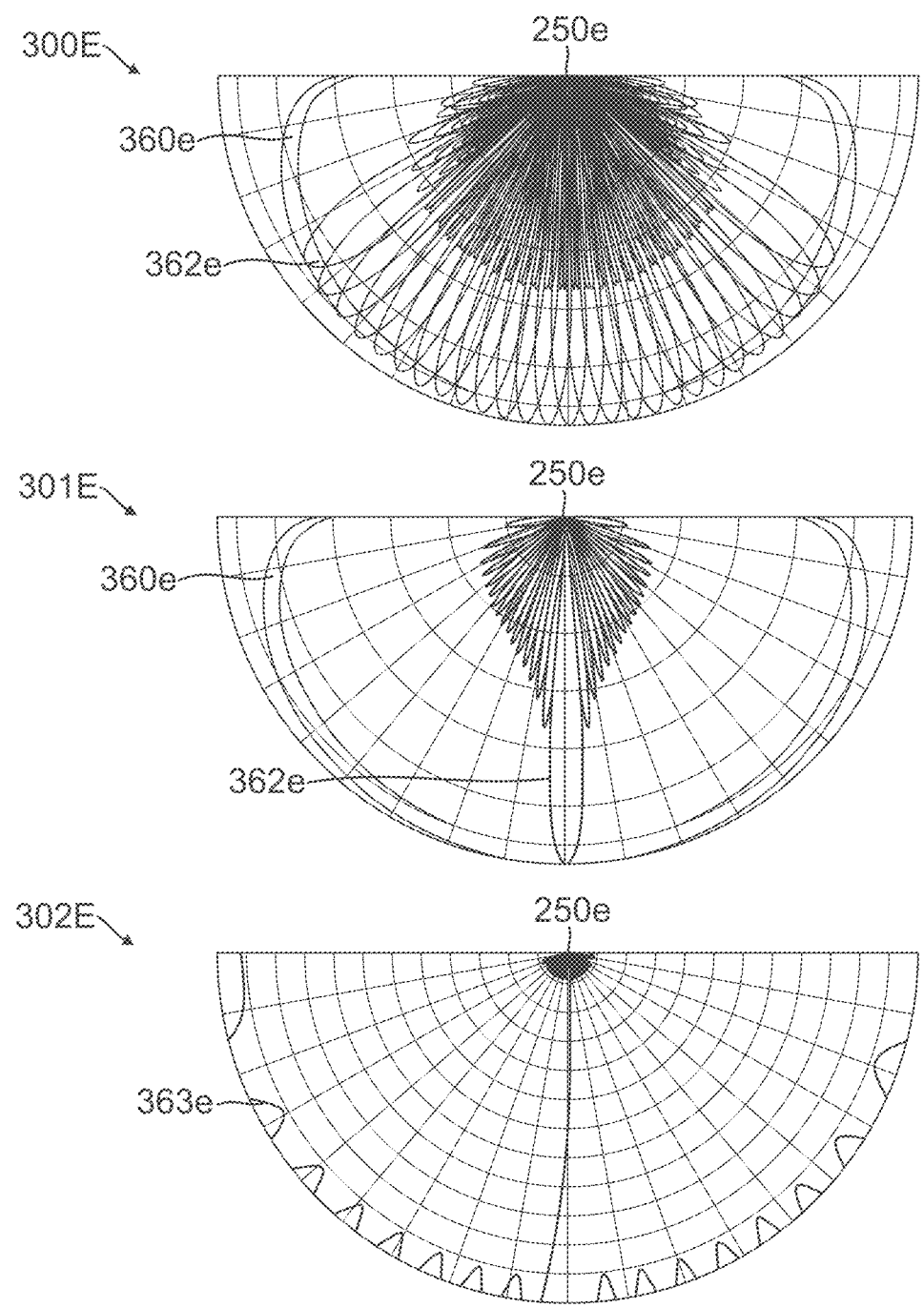
FIG. 3 illustrates various plots of sonar beams produced by sonar systems in accordance with example embodiments of the disclosure.

FIG. 3 illustrates various plots of sonar beams produced by various embodiments of sonar systems (e.g., the transducer 264 of FIG. 2A) in accordance with the disclosure. In each of the graphs 300E, 301E, and 302E, the position 250e indicates a spatial location of a center channel of the transducer 250 relative to the corresponding graph elements, with constituent linear elements longitudinally aligned to extend perpendicularly into and/or out of the page. For example, the graph 300E shows transmission beam 360e and return beams 362e corresponding to the transmission channel 260 and the receive channels 262 of transducer 250, similar to the arrangement illustrated in FIG. 3A, with a total of 32 channels and processed to form 27 return beams, as described herein.

As those of some skill will appreciate, the electroacoustic characteristics of a transducer, such as its gain, radiation pattern, impedance, bandwidth, resonant frequency and polarization, may be substantially the same whether the transducer is transmitting or receiving. Thus, for example, the "receiving pattern" of a transducer, i.e., its sensitivity as a function of direction, when used for receiving return signals, may be substantially identical to its radiation pattern when it is being driven, e.g., by the transmitter 230. This fundamental property of many modern transducers is a consequence of the electroacoustic "reciprocity" principle. In particular, to be reciprocal, the elements of the transducer typically must be linear, passive, and reversible, and these conditions are often satisfied by, e.g., piezoelectric transducer elements. Thus, for example, in some embodiments, e.g., the transducer 250 of FIG. 2A, each of the Tx and Rx channels 260, 262 can be undifferentiated, i.e., can serve as both a Tx and Rx element of a transducer array of a so-called "monostatic" sonar system.

As illustrated in the graph 300E, the transmission beam 360e is a fan-shaped beam extending laterally with respect to an orientation of the transmission channel 260. Each of the return beams 362e are sonar return beams formed radially between maximum operating angles within the transmission beam 360e by beamforming and/or interferometry processing applied to the acoustic returns received by one or more of the receive channels 262 of the transducer 250. For example, pairs of the acoustic returns from corresponding pairs of adjacent receive channels 262 can be processed (e.g., by the co-controller 222) to form corresponding return beams for each pair, where each return beam can be characterized by an orientation, shape, and/or one or more beam widths. In some embodiments, all of the elements of the transducer array can be used to form the return beams in a process known as beamforming or beam steering. In various embodiments, the return beams 362e (as shown in the graph 300E) indicate the spatial equivalents of the programmatically formed beams, and the co-controller 222 can be configured to form the return beams 362e to be narrower and/or oriented differently from the acoustic returns corresponding to a receive channel acting alone (which typically could have, e.g., relatively wide fan-shaped patterns similar in dimension, shape, and orientation to the transmission beam 360e). As illustrated in the polar diagrams and discussed in more detail below, in some embodiments, such beamforming and/or beam steering processing can be configured to produce relatively narrow multiple return beams 362 with a wide range of orientations, which can be used to generate higher resolution and higher quality sonar imagery relative to conventional sonar systems, as described herein.

The graph 301E illustrates a single, main lobe of a sonar transmit/return beam 362e, which can be formed by processing acoustic returns received by the receive channels 262 of the transducer 250, for example. The graph 310E illustrates the effective spatial sensitivity of the return beam 362e relative to the position and orientation of the transducer 250. The graph 302E includes inter-beam angle conversion basis 363e, which can be used to determine accurate signal amplitudes and corresponding relative angles for signal detail received by the return beam 362e shown in the graph 301E and one or more other return beams 362 shown in the graph 300E. For example, a signal detail can include a signal spike associated with an object in a water column, and that signal spike can be recognizable in acoustic returns provided by multiple receive channels, but be offset in time due to different signal path lengths. After the acoustic returns are converted into sonar return beams, the inter-beam angle conversion basis 363e can be used to resolve the position of the object from the signal spikes as reproduced in the return beams 362e. With one or more such inter-beam conversion bases, the acoustic returns received by multiple channels and/or return beams can be more accurately localized to a specific orientation and/or position relative to the transducer 250.

Figure 4:
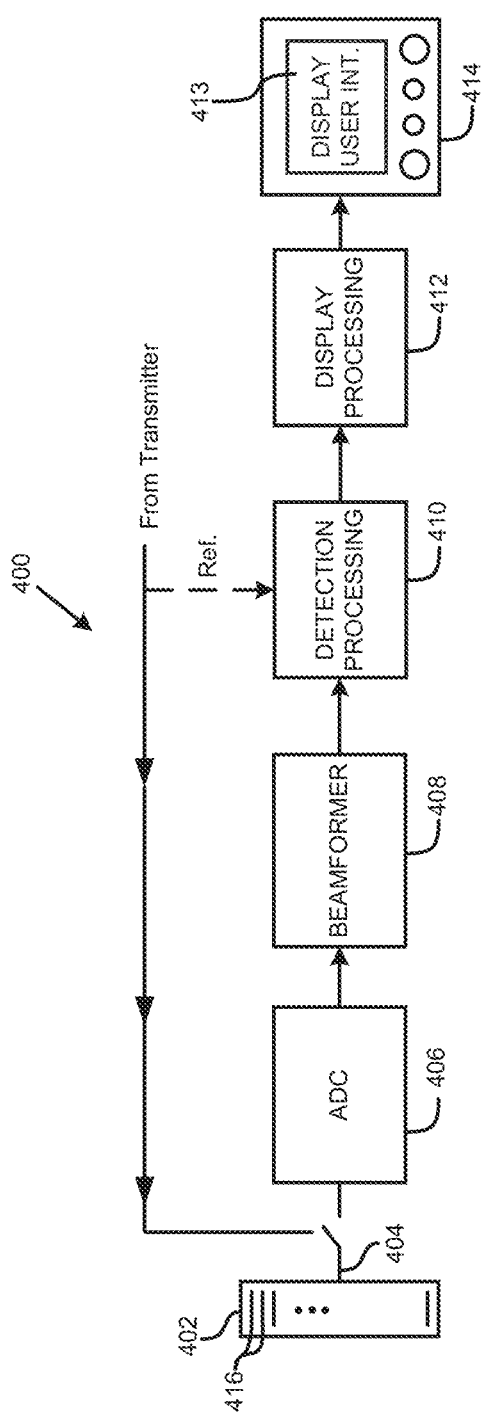
FIG. 4 is a functional block diagram of an example a sonar receiver in accordance with the disclosure.

FIG. 4 is a functional block diagram of an example embodiment of a sonar receiver 400 in accordance with the present disclosure. In some embodiments, the example receiver 400 could correspond to the N receivers 232 of the system 200 of FIG. 2A and/or a portion of the transceiver 234. In the particular example embodiment of FIG. 4, the receiver 400 is shown coupled to a one-dimensional transducer array 402, i.e., a "line array," through a transmit/receive switch 404 that can be used to switch the array 402 between transmit and receive modes of operation. Thus, the switch 404 can be used to selectably couple the array 402 to a transmitter (not illustrated), e.g. the transmitter 201 discussed above in connection with FIG. 2B, and thereby "blank" the receiver 400 when the system is transmitting a pulse, and vice-versa, i.e., to decouple the array 402 from the transmitter and couple it to the receiver 400 when the system is disposed in a "listening" mode between pulses.

In the embodiment of FIG. 4, the example receiver 400 is seen to comprise a number of modules, including an analog-to-digital converter (ADC)/signal conditioner module 406, a beam former or beam steerer module 408, a detection/processing module 410, a display processing module 412 and a display/user interface module 414, which, in some embodiments, could comprise, e.g., the user interface 120 discussed above in connection with FIGS. 1A and 1B. As those of skill will appreciate, this arrangement of functional modules is by way of an example, and in other embodiments, the functions could be combined into or divided among a fewer or greater number of modules, depending on the particular application at hand.

The line array transducer 402 can comprise, for example, N signal receive elements 416, where N=1, . . . N, and as discussed above in connection with the system 200 of FIG. 2A, can comprise receive-only elements 416 disposed adjacent to a like or a different number of transmit-only elements, or alternatively, elements 416 capable of both transmitting and receiving signals. Further, although the array 402 is described and illustrated as being a one-dimensional array 402, as discussed elsewhere herein, in other embodiments, the array 402 could comprise a 2-D or a 3-D array, such as a rectangular or a cylindrical array, respectively. Also, as discussed above in connection with FIG. 1B, the array 402 can be mounted on the hull 105b of a vessel 101, or on a mounting bracket 114 coupled to the transom 107b of the vessel 101 in such a way as to ensonify or receive acoustic signals from a selected column of water disposed immediately adjacent to the sonar beam(s) formed/received by the array 402.

In this regard, the acoustic signals received by the elements of the array 402 comprise longitudinal sound waves having a substantially planar wave front, i.e., "far field" returns or echoes of transmitted pulses from distant objects, together with other noise in the theater, e.g., "self-noise" of the receiver 400 and/or associated vessel 101, as well as ambient noise, e.g., random white noise, arising from a multitude of sources, including biological, wind and rain noises. The receive function of the array 402 is to convert these combined acoustical rarefactions and compressions into continuous electrical analog signals that can be analyzed and filtered, i.e., temporally and spatially, for desired information, e.g., distance to and direction of a target. Thus, while the analog output signals of the array 402 can be analyzed and filtered on a continuous basis, this can result in a prohibitively complex computational burden on the system, and accordingly, in many modern sonar systems, it is desirable to invoke the substantial power that digital signal processing (DSP) techniques can bring to bear in order to achieve the desired goals.

Thus, in the example receiver 400 of FIG. 4, an essential function of the analog-to-digital converter/signal conditioner module 406 can include, in addition to amplifying, attenuating, decimating, bandshifting, etc., of the signals provided by the array 402, a conversion of the signals from analog to digital signals for provision to the beam former/beam steerer 408. This can be effected by the provision of an analog-to-digital converter (ADC) across the output of the array 402 which samples the output of each element 415 of the array 402 at desired time intervals and thereby converts them to an array of discrete values. In this regard, the rate at which the samples are taken is preferably equal to or greater than the Nyquist rate, i.e., twice the highest frequency contained in any of the samples, to prevent known "aliasing" problems in the samples. Thus, the ADC provides discrete sequential "time slices" or "data snapshots" of the output signals of the elements 416 of the array 402 that can be analyzed on a sample-by-sample basis or across a plurality of contiguous samples.

As those of some skill will understand, if an incoming plane wave having an amplitude A and frequency f strikes a line array 402 "broadside," i.e., in a direction perpendicular to the length of the array 402, the wave will impact on each of the elements 416 of the array simultaneously, and accordingly, the voltage signals produced by the elements 416 will all be in phase, and therefore will add constructively to produce a signal having the same frequency f and an amplitude NA. The array 402 is thus highly sensitive to acoustic waves arriving in this direction. However, if the wave strikes the array 412 at an angle θ off of the perpendicular, or is not in the form of a plane wave (e.g., a point source at a relatively shallow depth), the signals from the elements will be out of phase with each other, and their sum will have peaks and troughs as a result of destructive addition, and the amplitude will be less than NA. Accordingly, the array 402 is not as sensitive in the direction θ as it is in the direction θ=0. Thus, the line array 402 will have a narrow main lobe 362e like that illustrated in FIG. 3 that is centered on the array 402, with a maximum response axis extending perpendicular to the array and through the main lobe 362e.

Figure 9:
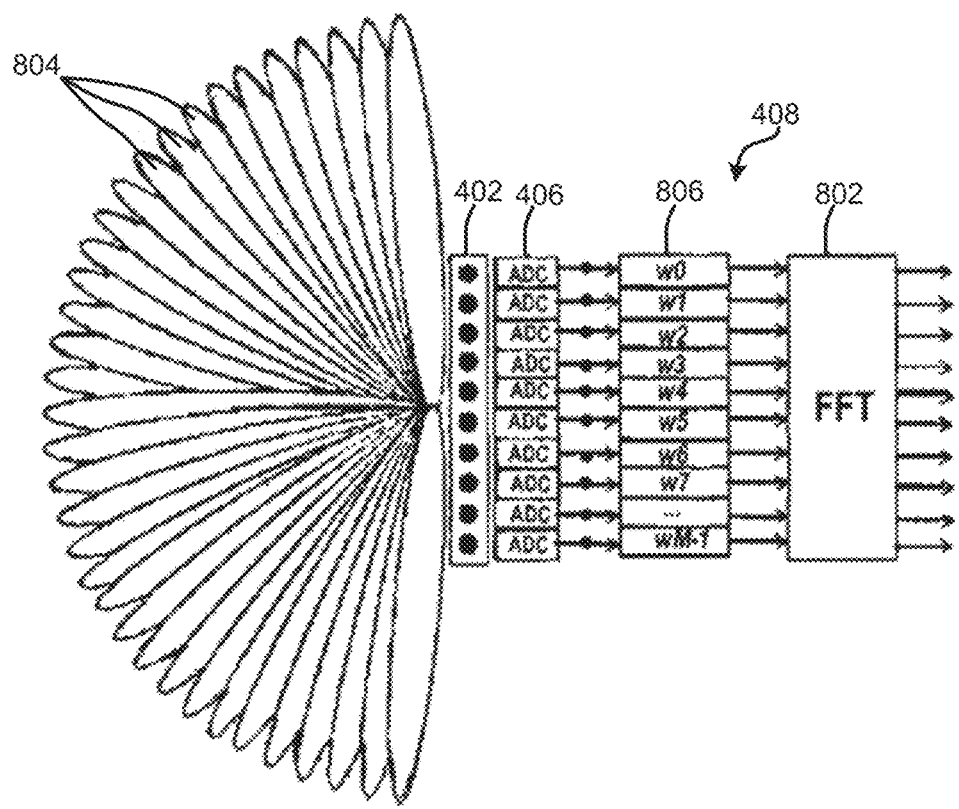
FIG. 9 is a schematic illustration of an example linear transducer array and front end of an example sonar receiver incorporating an FFT and showing a fan of transmit/receive beams in accordance with the disclosure.

However, through the technique of beam forming or beam steering, the angle of the lobe or main receive axis of the array 402 can be changed to provide an effective "fan pattern" of enhanced sensitivity beams over a range of angles of θ of about ±90 degrees relative to the main response axis of the array 402, as illustrated in, e.g., FIGS. 3 and 9. It should be understood that, in "steering" the array 402 to have enhanced sensitivity in particular directions $\theta_{in}$, nothing about the array 402 itself is altered. Rather, the alteration is in the manner in which the data produced by the array 402 is processed. As those of some skill will understand, a one-dimensional array 402 is limited to providing only azimuthal direction of arrival (DOA) information, i.e., θ, from a target, and not, e.g., elevation information, which would require a 2-D array.

There are numerous techniques by which beam steering can be effected. A conventional technique frequently employed involves a so-called "delay-and-sum" technique. Thus, in the above case in which a planar wave front impinges on the array 402 at an angle of θ other than 90 degrees, it can be seen that the wave will impinge upon an end one of the elements 416 first, i.e., the one closest to the wave front, then upon the next-succeeding ones of the elements in sequential fashion until it impinges on the last or opposite end element 416. The respective signals produced by the transducer elements 416 will therefore be shifted in time, i.e., delayed, relative to each other, or in the frequency domain, phase shifted, relative to each other. The delay can be computed as a function of θ, the spacing between adjacent elements (d), and the speed of the wavefront or sound in water, c 1500 m/sec, as:

$$\tau = \frac{d}{c}\sin\theta,$$

and the signal from any element of M−1 elements in the array 402 can be expressed as $$x_m(t)=s(t-\tau).$$

Figure 5:
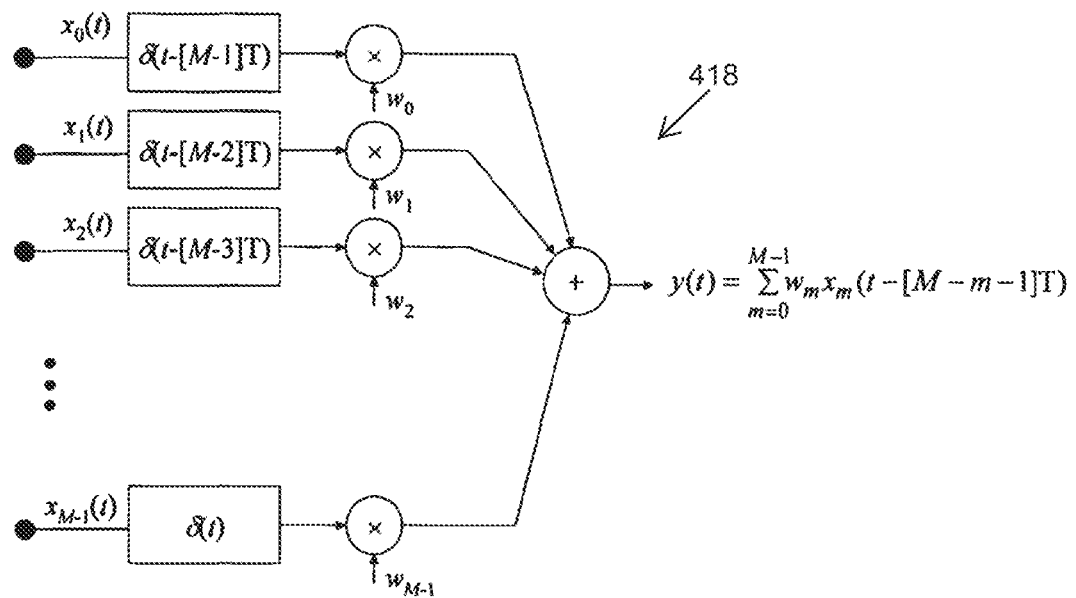
FIG. 5 is a signal flow diagram of an example beam former in accordance with the disclosure

FIG. 5 schematically illustrates a delay-and-sum beam former or beam steerer 418 in which the output samples $x_0(t)$, $x_2(t)$, $x_{M-1}(t)$ of respective ones of the transducer elements 416 are respectively delayed by increasing amounts of "unit delays," δ(t), i.e., δ(t−[M−1]T), δ(t−[M−1]T), ... δ(t), weighted by multiplying them with respective "shading" or "weighting" coefficients $w_0, w_1, \ldots w_{M-1}$, then summed together to form the relationship, $$y(t) = \sum_{m=0}^{M-1} w_m x_m(t - [M - m - 1]T).$$

Thus, when T=τ, the respective signals are aligned in time (and phase) so as to have a maximum array 402 sensitivity to a signal arriving at the array 402 from a direction $\theta_m$.

Figure 6:
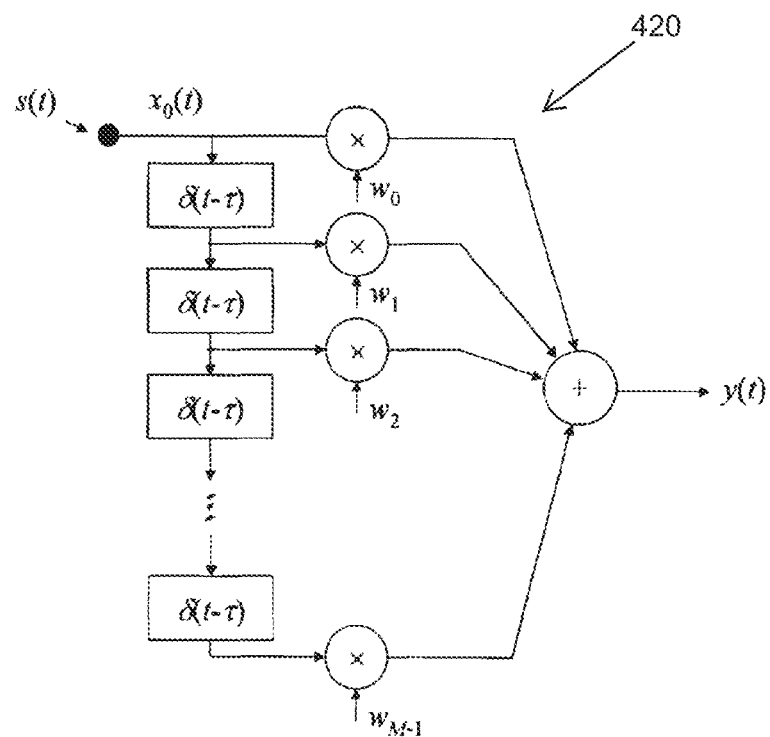
FIG. 6 is a signal flow diagram of an example beam former using a finite impulse response (FIR) filter in accordance with the disclosure.

Further, as those of some skill will recognize, the configuration of the delay-and-sum beam former 418 of FIG. 5 is substantially similar to that of a M-tap finite impulse response (FIR) filter. Thus, if T=0, i.e., the main beam of the array 402 is steered to θ=0 or a broadside orientation, and the signal delay across the array 402 is represented as a delay line, then the beam-steering configuration illustrated in FIG. 6, i.e., an M-tap FIR filter 420 results, in which each sample takes the form x[n]=$x_0$(nT), and y[n]=x[n] *w[n], wherein "*" denotes the convolution of x[n] with w[n]. Thus, $$y[n] = \sum_{k=0}^{M-1} w[k]x[n-k].$$

Figure 7:
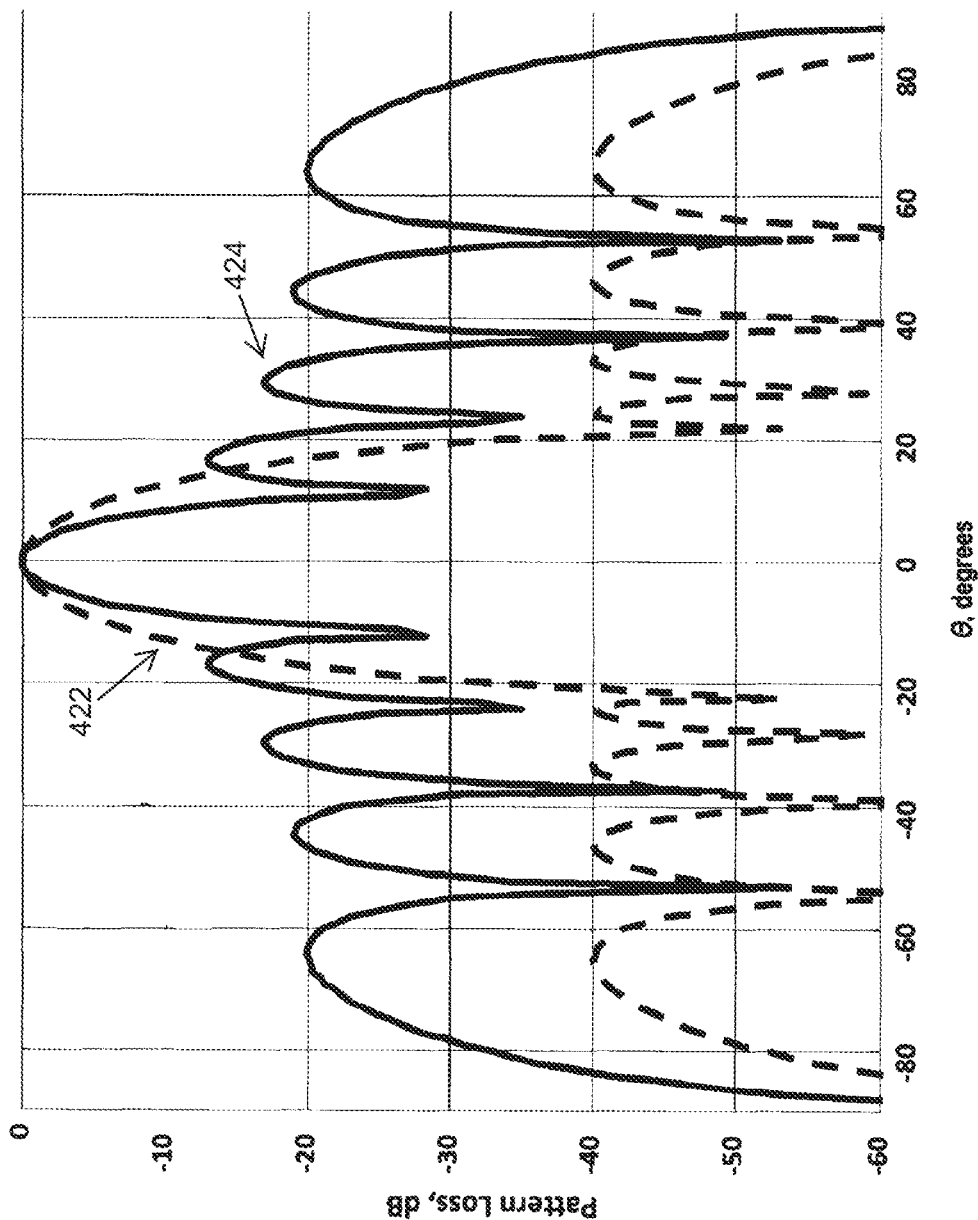
FIG. 7 is a polar plot illustrating a comparison of the respective beam patterns of an example line array in which Dolph-Chebychev weighting coefficients have been applied to the forming of the beam, as compared to that of a beam formed with uniform weighting coefficients.

In the foregoing expression, the w[k] "weighting" values correspond to the impulse response of the FIR filter 420, and can be used to reduce side lobes of the array relative to the main lobe, but do so at the expense of a widening of the latter. A similar result also obtains in the transmitting direction. FIG. 7 illustrates a comparison of the respective beam patterns of a line array 402 having ten elements 416, in which Dolph-Chebychev (DC) "weighting coefficients" w[k] have been applied to the forming of the beam (dashed line 422), compared to that of the beam (solid line 424) formed with uniform weighting coefficients, e.g., w[k]=1 for all values of k. As can be seen in the figure, the DC beam pattern 422 has side lobes that are down about −40 dB relative to the main lobe, but that the main lobe has also been undesirably widened relative to that of the uniformly weighted beam as a result of the weighting. Other filter "windowing" or weighting techniques can also be used, e.g., Blackman, Hamming, Hanning, windowed-sinc, and the like, with similar results.

While the foregoing delay-and-sum beamforming techniques are applicable to both wideband and narrowband systems and can be implemented in silicon, they tend to be computationally intensive. A substantial reduction in computational requirements can be achieved by transforming the signals of interest from the time domain into the frequency domain and using well-known fast Fourier transform (FFT) techniques. Thus, if the output of each element 416 of the array 402 is represented as $S(t)=A(t)e^{j\varphi(t)}$, where $A(t)$ is the amplitude of the signal and $\varphi(t)$ is its phase, it can be shown that the signal of a transducer element i with the appropriate phase delay needed to form a steered beam at angle $\theta$ in a given time slice is given by $$B_i(\theta) = S_i e^{j\left(\frac{2\pi}{\lambda} id \sin\theta\right)},$$

where $\lambda = c/f$,
and that the combined steered beam at angle $\theta$ for a particular time slice is found by summing the contributions of all of the elements 416 of the array 402, each multiplied by an appropriate shading coefficient $w_i$, $$\overline{B(\theta)} = \sum_{i=0}^{N-1} \overline{w_i S_i} e^{j\left(\frac{2\pi}{\lambda} id \sin\theta\right)}.$$

If the phase delay required for an element 416 at a beam steered to an angle of $\theta_m$ is defined as $$\overline{\Delta_{ml}} = e^{j\left(\frac{2\pi}{\lambda} id \sin\theta\right)},$$

then the operation required to find any steered beam $\theta$ becomes $$\overline{B(\theta_m)} = \sum_{i=0}^{N-1} \overline{w_i S_i \Delta_{ml}}.$$

It may be noted that the above equation for $\overline{B(\theta)}$ is substantially similar to that of an FFT transformation for sampled data, i.e., $$\overline{H_k} = \sum_{i=0}^{N} h_i e^{j\left(\frac{2\pi ik}{N}\right)}.$$

Figure 8:
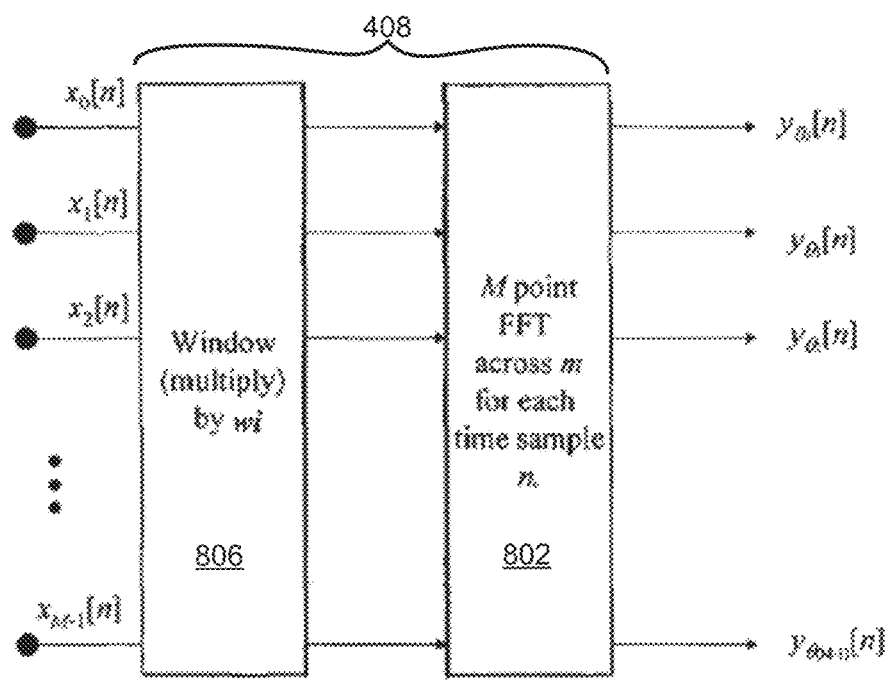
FIG. 8 is a partial schematic diagram of an example beam former comprising a fast Fourier transformer (FFT) in accordance with the disclosure.

Therefore, if the substitutions $$\overline{H_k} = \overline{B(\theta_k)}, \frac{2\pi}{N} ik = \frac{2\pi}{\lambda} id \sin\theta_k,$$

and $h_i = w_i S_i$ are made in the above, then, as illustrated in FIGS. 8 and 9, a beam former 408 can be realized, comprising an M-point FFT 802, preceded by a beam weighting/shaping coefficients multiplier 806 placed across the outputs of the elements 416 of the array 402, and can be used to create M steered beams 804 from the data of the N elements 416 of the array 402 during each sample of data.

It should be understood that, although the generalized relation for $\overline{B(\theta)}$ above can be used to find any arbitrary direction of arrival (DOA) $\theta$ of a beam, the FFT can only be used to find discrete angles $\theta_k$, i.e., only where the relationship $$\frac{2\pi}{N} ik = \frac{2\pi}{\lambda}$$

id $\sin\theta_k$ is true. If this equation is solved for $\theta_k$, then $$\theta_k = \sin^{-1}\left(\frac{\lambda}{d} \cdot \frac{k}{N}\right).$$

Thus, the DOA angles that emerge from the FFT 802 will be a discrete set of angles that are fixed in time and functions of $\lambda/d$ and the number N of transducer elements 416 in the linear array 402. Generally speaking, the longer the array 402, the narrower its main lobe will be in the plane perpendicular to that dimension, and element spacing d should be limited to $d \leq \lambda/2$ to prevent the formation of so-called "grating lobes" in the beam pattern.

In the arrangement of FIG. 8, the outputs of each of the elements 416 of the array 402 are multiplied by the weighting coefficients $w_k$ held in, e.g., a coefficient register 806, before they are operated on by the FFT 802. As discussed above in connection with FIG. 4, the coefficient register 806 can be disposed in the ADC/signal conditioning module 406 or in the beam former 408, together with the FFT 802.

In many commercial sonar applications, e.g., bathymetry, fish finding, side scanning and the like, it is desirable to ensonify a selected column of water below a vessel 101 with a plurality of sonic pulses, or "pings," receive the echo returns of those pings from objects located within the column, including the sea floor, and then process the received echo data so as to convert them into a form useful to a user of the system, e.g., in a display.

Figure 10:
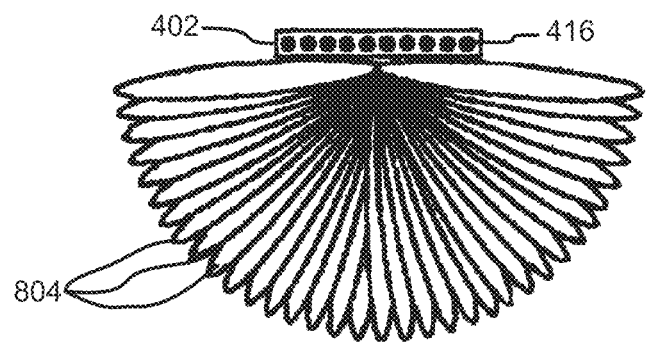
FIG. 10 is a schematic illustration of the example linear array and fan of transmit beams of FIG. 9 in accordance with the disclosure.
Figure 11:
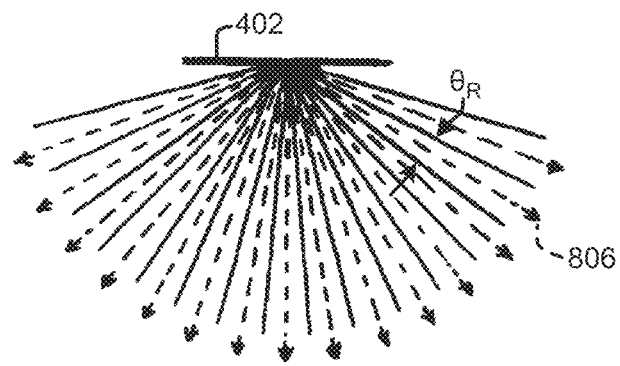
FIG. 11 is a polar diagram illustrating a plurality of receive channels defined by the fan of beams of FIG. 10 in accordance with the disclosure.

Thus, for example, the line array 402 of FIG. 4 can be mounted to a vessel 101 such that its long axis lies parallel to the keel of the vessel 101 and that its elements 416 "listen" straight down, i.e., orthogonal to the surface of the water. In this example, the array 402 will ensonify a "slice" of the water behind, immediately below, and ahead of the vessel 101 that is relatively broad in the front-to-rear direction but relatively thin in the lateral direction using the fan array of steered beams 804, as illustrated in FIG. 10. Due to the reciprocity principal discussed above, the steered transmission beams 804 formed by the array 402 are identical to the steered receive beams 804 through which the echoes of the pings are received. As discussed above and illustrated in FIG. 11, the M steered beams 804 are disposed immediately adjacent to one another, are constant in time and discrete in number, and the angular positions of their respective central axes 806 (dotted lines) are determined by the relationship $$\theta_k = \sin^{-1}\left(\frac{\lambda}{d} \cdot \frac{k}{N}\right),$$

i.e., are functions of the wavelength A of the signal, the spacing d between the elements 416, and the number of elements in the array 402, N, where k runs from −N/2 to N/2+1. The beams 804 thus define equally sensitive listening channels within which echo returns can be received, distinguished among, and processed to produce the data necessary to produce, e.g., a display of them, i.e., directions of arrival (DOA) and times of arrival (TOA) of the echoes, where the DOAs correspond to angles of azimuth and the TOAs correspond to distances to, or ranges, of targets.

Figure 13:
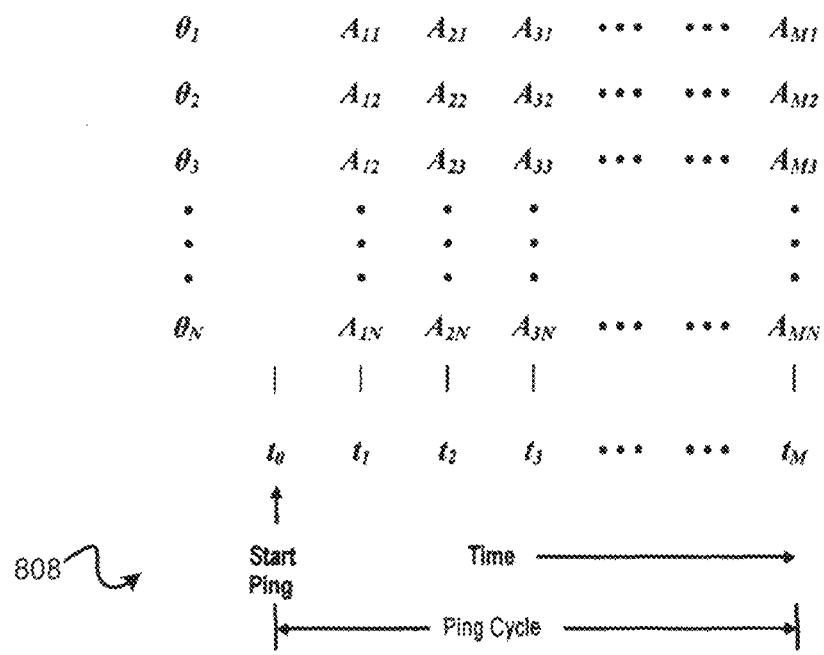
FIG. 13 is an example matrix of sonar return data, arrayed in terms of location within respective receive channels and with respect to time in accordance with the disclosure.

There are several techniques in which this signal processing can be implemented, including processing in the time domain and/or in the frequency domain. Thus, for example, in the time domain, if the array 402 in, e.g., FIG. 9, has N elements 416, the ADC 406 forms M slices of the outputs of the elements 416 in a single pulse or ping, and the output of, e.g., the FFT 802, in response to the receipt of the ping is passed through an inverse FFT, i.e., an IFFT 818 (see FIG. 14), then an N×M matrix 808 of data such as that illustrated in FIG. 13 would be produced. In the matrix 808, the column array $\theta_i$ represents the respective angular positions of each of the steered beams 804 of the transducer array 402, which as above, are fixed at the geometries computed from the above relationship for $\theta_k$ and invariant with time. The $A_{ij}$ columns represent the amplitudes of the signals received by respective ones of the steered beam receive channels 806 in a given time slice $t_j$, and always include an unavoidable component of noise and reverberation.

Figure 12:
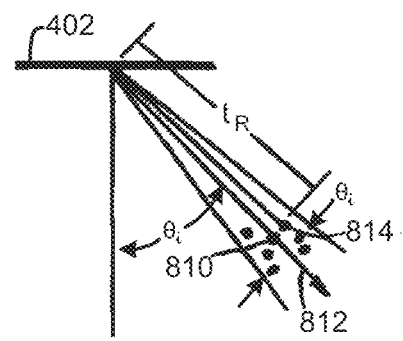
FIG. 12 is a polar plot of sonar return data falling within a selected one of the receive channels of FIG. 11 in accordance with the disclosure.

There are a number of signal processing techniques that can be applied to the data in the matrix to derive the desired DOA and TOA data. For example, as illustrated in FIG. 12, all of the amplitude signals $A_{ij}$ in each of the time slices $t_j$ can first be compared to a reference voltage corresponding to a random noise signal. Those signals greater than this threshold value can be designated as genuine returns and the other signals can be disregarded. The amplitude signals $A_{ij}$ deemed to be genuine can then be associated with the beam or channel $\theta_i$ that received them and plotted in terms of their individual DOAs and TOAs in a polar plot.

In FIG. 12, it may be noted that the return 810 is disposed on the central axis 812 of the beam $\theta_i$, whereas, others are not. Similarly, it may be noted that the return 814 has a TOA of $t_r$, which simply corresponds to the time slice within which the return 814 was received, whereas, the other returns have different TOAs. There are numerous techniques, including statistical manipulation, least squares curve matching, amplitude-weighting, and the like to achieve the desired goal of this part of the processing, namely, to distill all of the returns into a single return lying at an angular position relative to the known central axis 812 of the beam $\theta_i$ and having a DOA that is, in accordance with the technique chosen, representative of all of the genuine returns received by the beam θi during the entire ping cycle, and a TOA that is likewise representative of all of those returns. When this data has been computed for each of the beams $\theta_i$, it can be combined so as to form an image of the objects, including the sea floor, intervening schools of fish and the like, and then passed on to, e.g., the display processing module 412 for presentation on a display 413 of the system.

Another technique that can be used to effect processing of the signal data produced by the elements 416 of the array 402 during a ping involves a "correlation" process. Correlation, often referred to as "matched filtering," is a mathematical process that uses two signals to produce a third signal, and if the signal is being compared with itself, the process is sometimes referred to as "autocorrelation." Correlation is considered an optimal method for detecting a known waveform in random white noise because such noise can be considered uncorrelated with the replica waveform.

In such an embodiment, a replica of the ping being projected by the transmitter is sent to the receiver 400, as illustrated in FIG. 4, and digitized by an ADC 406, preferably at the same rate as are of the outputs of the elements 416 of the array 402. The digitized replica can then be programmed in the "kernel" of an FIR filter similar to the FIR filter 420 discussed above in connection with FIG. 6 as a kind of "mask" or "template" for comparing the first or received signal to the second or transmitted signal. Thus, when the sampled data from the outputs of the array 402 is processed by the resulting matched filter, the third, or "cross-correlation" signal output from the filter will show distinct peaks at the points where the received signal matches the transmitted signal, which are time-delayed relative to the replica signal by the TOA of that peak. As above, this data can be processed to produce an image of objects ensonified by that ping.

Figure 14:
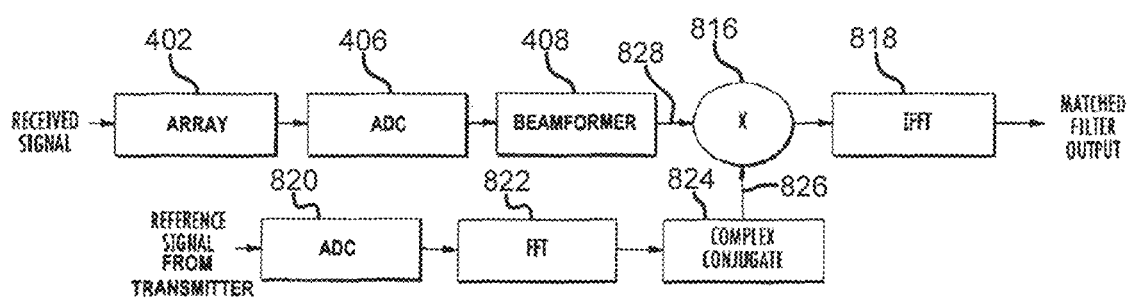
FIG. 14 is a functional block diagram of a method for correlating received sonar return data with transmitted signal data using convolution in accordance with the disclosure.

As those of skill will understand, the processing of the received signal by a correlation or matched filter in the technique above is very similar to the mathematics of convolution, except that in the latter, the data bits of the reference or replica signal are "flipped" left-for-right to form a so-called "complex conjugate" of the replica signal. Thus, as discussed above, the detection or correlation process can also be carried out in the frequency domain, and accordingly, and under the appropriate bandwidth conditions, the use of FFTs and IFFTs can be advantageously employed to speed up the detection process considerably. An example embodiment of this process is illustrated in FIG. 14, where a replica of the signal used to form a transmitted ping is transmitted by the transmitter to the receiver 400, digitized in an ADC 820, transformed into the frequency domain by an FFT 822, and then subjected to a bit-flipping operation to form its complex conjugate, resulting in the reference signal 826. As discussed above in conjunction with FIGS. 8 and 9, when the return ping signal has been received and processed by the beam former 408, it is thereby also transformed into a signal 828 in the frequency domain. Since convolution of two signals in the frequency domain corresponds to multiplying the two signals, this is effected by multiplying the received ping signal 828 with the complex conjugate of the reference signal 826 in a multiplier 816. As illustrated in FIG. 14, the resulting convolution signal can then be returned to the time domain by passing it through an IFFT 818, resulting in a "matched filter" output signal substantially similar to that discussed above. As a result of the use of the FFTs and IFFTs, the rate of the detection process can be increased substantially.

The two signal correlation techniques described above can be used advantageously with both continuous wave (CW) and frequency modulated (FM) pulses. For example, FM pulses can be produced by the technique known as "pulse compression," which is a technique useful in sonar to increase the range resolution, i.e., the ability to distinguish between two closely spaced targets, as well as the signal-to-noise ratio of the system.

In any echo-ranging system using CW pulses, the maximum detection range $R_{max}$ determines the minimum period allowable between successive pulses, $T_{min}$, and hence, also the pulse repetition frequency PRF. Thus, $$T_{min} = \frac{R_{max}}{c},$$

where c again is the speed of sound in water, i.e., ≈1500 m/second. If the range discrimination capability between targets is to be $r_d$, then the maximum pulse length $t_{max}$ is given by $$t_{max} = \frac{2r_d}{c}.$$

It may be noted that $r_d$ also corresponds to the range within which target detection is not possible. Since the signal bandwidth B=1/T, where T is the pulse width, range discrimination capability also determines the bandwidth that transducers and their associated electrical channels must have in order to operate successfully. From the foregoing, it can be seen that $$r_d = \frac{cT}{2} = \frac{c}{2B}.$$

Since the bandwidth of a CW pulse is inversely proportional to the pulse duration, shorter pulses are indicated for improved range resolution. However, the received signal strength and the signal-to-noise ratio are both directly proportional to the pulse duration, indicating that longer pulses are needed for good signal reception. Although better signal reception might result from using more transmitter power in shorter pulses, there are upper limits in terms of several considerations, including size, weight, cost, reliability and transducer physical limitations that mitigate against boosting transmitter power beyond practical limits.

However, the foregoing issues can be successfully addressed by the use of pulse compression techniques, in which the instantaneous frequency of the pulse is made to change during the T seconds duration of the pulse. The bandwidth B in such case is now much wider and is not the inverse of the pulse length T. Rather, as a result of the correlation process, the pulse now has a "resolved" or effective pulse length of T' that is typically much less than the original T of the transmitted pulse. In effect, a long pulse is being transmitted that has a bandwidth corresponding to that of a short pulse. It can be shown that the "pulse compression ratio," i.e., the measure of the improvement in range resolution, is BT, which can have values of from about 20 to 50 or more, compared to those obtainable with CW pulses. Additionally, the signal-to-noise ratio of the system is improved because the power of the received signal is amplified in the pulse compression autocorrelation detection process. Thus, the mean noise power after correlation is equal to 1/BT times the mean noise power before correlation.

Figure 15:
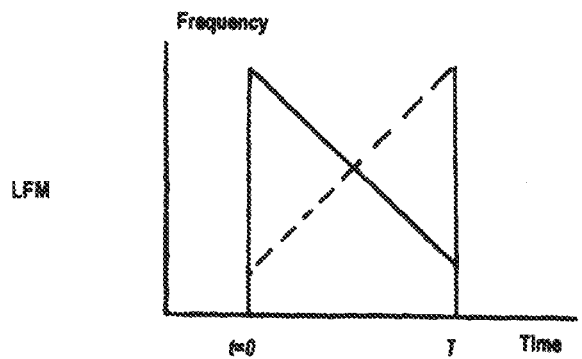
FIGS. 15-17 are graphs respectively illustrating a linear frequency modulated (FM) or LFM pulse, a linear hyperbolic FM pulse, and a nonlinear FM (NLFM) pulse in accordance with the disclosure.
Figure 16:
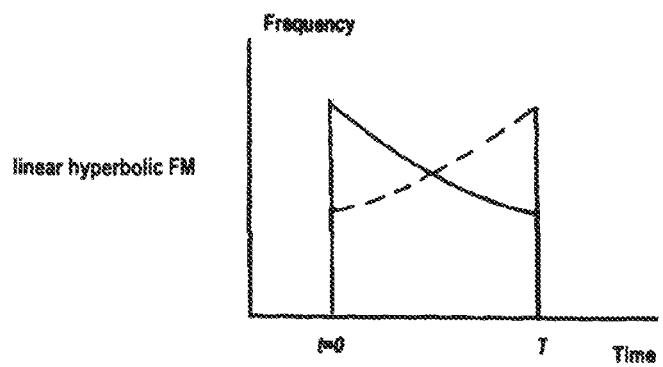

There are a large number of ways in which FM compressed pulses can be created for use in sonar systems, e.g., by changing or modulating its frequency and/or phase with time during the pulse. For example, as illustrated in FIG. 15, in linear frequency modulated (LFM) square pulses, sometimes referred to as "chirps," the instantaneous frequency of the signal is ramped up (solid line) or down (dashed line) in a linear or straight-line fashion during the time T of the pulse, such that the higher-frequency components occur either at the end or the beginning of the pulse, respectively. As illustrated in FIG. 16, in a linear period FM (or hyperbolic FM) modulation of a pulse, the periodicity of the pulse changes with time, again, in either an increasing or decreasing fashion, such that its frequency varies hyperbolically with time. In some applications, the latter type of signal modulation can be preferable to LFM signals because it is not susceptible to phase shifting of the echo signals due to relative target velocity.

Figure 17:
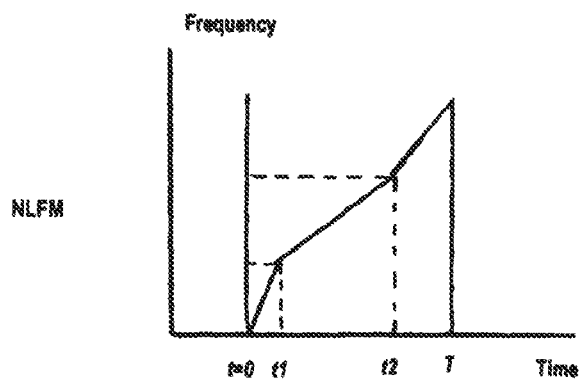

As illustrated in FIG. 17, it is also possible to effect pulse compression using nonlinear frequency modulation (NFLM) techniques. In the embodiment illustrated, a "3-stage" NLFM wave form, the pulse time T is broken up into three segments, viz., $t_0$–$t_1$, $t_1$–$t_2$, $t_2$–T, and the frequency is ramped up linearly, but at different rates, in each of the three time intervals.

Commonly owned U.S. patent application Ser. No. 14/261,342, filed Apr. 24, 2014, by P. Stokes, et al., which is hereby incorporated by reference herein, teaches a technique for forming an NLFM wave form "chirp" in such a way that selected harmonics or side lobes of the signal can be suppressed or tuned out without employing a "windowing" technique of the type discussed above.

Embodiments of the present disclosure combine the foregoing improvements provided by FM pulses and signal processing with CW capabilities in a single system. For example, in certain military sonar applications, e.g., tracking rapidly moving submarines or torpedoes, CW pulses can provide superior Doppler resolution, while FM pulses can provide better range resolution. While Doppler tracking is not ordinarily of great concern in commercial sonar, as both the system and the targets are typically fixed or moving slowly relative to each other, there are other benefits to retaining both CW and FM capabilities in a single system.

For example, in all sonar systems, the presentation of sonar data is paramount to the success of the system. However, the fine resolution produced by the FM pulse compression techniques discussed above are both advantageous, in that much higher detail of targets can be achieved, but also disadvantageous where targets are less conspicuous, and hence, can be lost against a noisy background. It has been discovered that the advantages of standard, single frequency or CW techniques can be combined with newer FM pulse compression techniques on a display in such a way as to improve the visual representation of the sonar information. The method and apparatus to achieve this is referred to herein as "CW/FM overlay."

Referring back to the discussion above in connection with FIG. 12 and the linear array 402 embodiment, it may be recalled that, when the echo return data has been computed for each of the steered receive beams $\theta i$, they can be combined to form images of the objects, including the sea floor, intervening schools of fish and the like, in the narrow "slice" of the water column below the array 402, and then passed on to, e.g., the display processing module 412 for presentation on the display 414 of the system. Since the image data may be in the form of a polar plot, i.e., DOAs (azimuth angles) and TOAs (radial distances), in some embodiments, it may be desirable for the display processing module 412 of the receiver 400 to transform the TOA and DOA data from polar coordinates into rectangular coordinates, and then to scale them appropriately so as to fit onto a rectangular display 413 of, e.g., a user interface 414. In some embodiments, a user interface may be configured to receive user input indicating or selecting a particular zoom level, for example, and the user interface (e.g., and/or display processing module 412) may be configured to scale the sonar data and/or imagery according to the indicated zoom level. In one example embodiment, the center of the upper edge of the display 413 can correspond to the center of the array 402, the upper edge of the display 413 can correspond to the layer of water disposed immediately below and ensonified by the array 413, and the vertical position of an object imaged on the display can correspond to its depth. In various embodiments, sonar image data may be rendered according to a color scale configured to indicate intensity or amplitude of the corresponding acoustic return (e.g., return signal). In some embodiments, the sonar image data may be rendered according to a greyscale configured to indicate intensity or amplitude of the corresponding acoustic return.

As discussed above, CW sonar lacks the resolution capability of FM sonar, and accordingly, for targets that are spaced relatively closely together, their CW images will be combined into a single image, and will be relatively amorphous and blurred relative to the sharper FM images of the same water column. This is because, as discussed above, the "resolution cell" of a CW sonar pulse is inherently smaller than that of an FM pulse. On the other hand, as discussed above, while FM pulses provide finer resolution cells, they can lose targets that are less conspicuous against noisy backgrounds. Thus, visual representation of the sonar water column on a display when using very fine range resolution can make interpretation very difficult and can make targets less conspicuous. Thus, the result of using either CW type pulses or FM type pulses to the exclusion of the other type can result in poor target identification and poor structure representation. However, in accordance with this disclosure, this problem can be overcome by implementing one of the two following CW/FM overlay methods.

Figure 18:
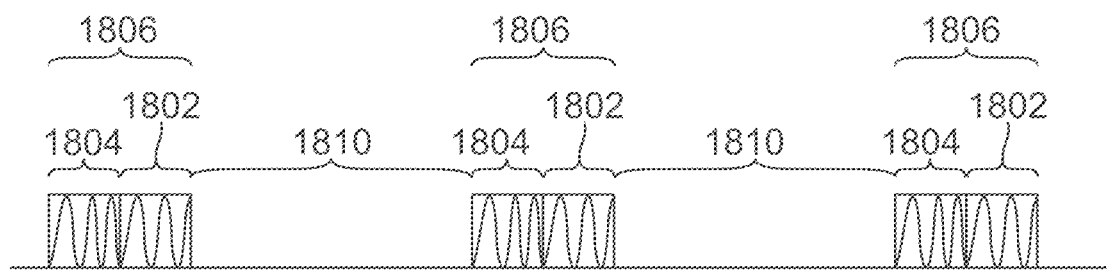
FIGS. 18-20 are timing diagrams respectively illustrating example sonar ping sequences in accordance with the disclosure.
Figure 19:
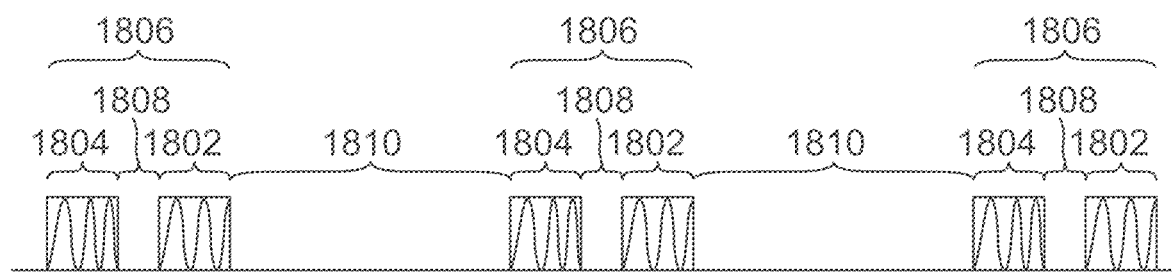
Figure 20:
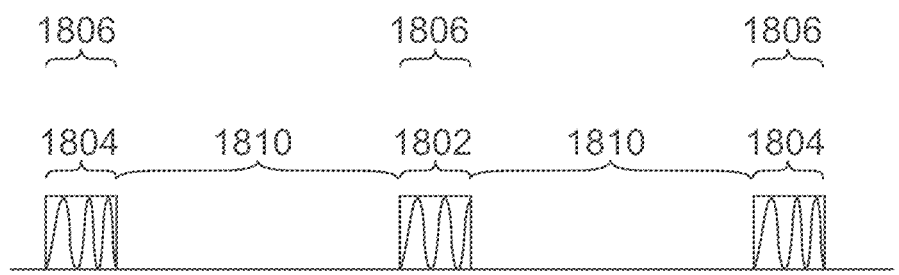

In one example embodiment, the sonar system transmits both CW pulses and FM pulses, either simultaneously, in substantially close succession, or in a sequence switching arrangement between pings. Thus, as illustrated in the timing diagram of FIG. 18, in the first instance, the CW and FM pulses 1802 and 1804 are transmitted within the same ping 1806, i.e., the second pulse beginning immediately after the end of the first pulse, with their sequential order being arbitrary. In the second instance, as illustrated in FIG. 19, a single ping comprises a CW pulse 1802 and an FM pulse 1806 separated by a short delay 1808, again with their order being unimportant. In the third instance, as illustrated in FIG. 20, a string of alternating CW and FM pulses 1802 and 1804 are transmitted, with a single pulse repetition interval (PRI) 1810 disposed between successive pulses, i.e., each alternating pulse comprises a ping 1806. In the figures, the CW pulse 1802 is shown leading the FM pulse 1804, but as above, their order is not important. Additionally, it may be noted in the figures that the two types of pulses are shown as having the same pulse length for discussion purposes. However, as discussed above, for pulse compression reasons, the FM pulses 1804 will typically be much longer than the CW pulses 1802.

Using any of the foregoing transmissions, the system subsequently receives the corresponding echo returns from the pings, processes them into corresponding image data sets in one of the signal processing techniques described above, and displays them simultaneously or contemporaneously such that the image data sets respectively produced by the CW and FM pulses overlay each other, i.e., are superimposed on top of each other, for example, or are otherwise blended with each other. In various embodiments, the CM and FM pulses may be differentiated from each other by their frequency or frequencies, for example, such that corresponding acoustic returns may be differentiated based on the frequency of the acoustic return (e.g., not by order received or by time delay between pulses). In further embodiments, acoustic returns corresponding to CM and FM pulses may be differentiated through use of pattern recognition and/or other signal processing routines applied to the acoustic returns that can differentiate the acoustic returns based on the pattern of their frequency content (e.g., as opposed to the frequency or frequencies themselves). As such, in embodiments where a sonar transducer assembly includes separate transducers dedicated to FM or CW operation, the CW and FM transmissions may be simultaneous, and the corresponding acoustic returns may be differentiated through use various signal processing routines that may or may not depend on the timing of the pulses, as described herein.

A similar but less robust result can be obtained in an alternative, simpler embodiment, in which the CW pulses 1802 are omitted, such as in a sonar system employing only pulse compression techniques. In this embodiment, the echo return data obtained by successive FM pulses 1804 are processed to obtain a set of high resolution image data. That data is then post-processed to intentionally blur or "smear out" the image data, and the resulting blurred image data set may then be displayed below, alongside, or overlaid with the original high resolution image data set from which it was obtained.

Figures 21A, 21B:
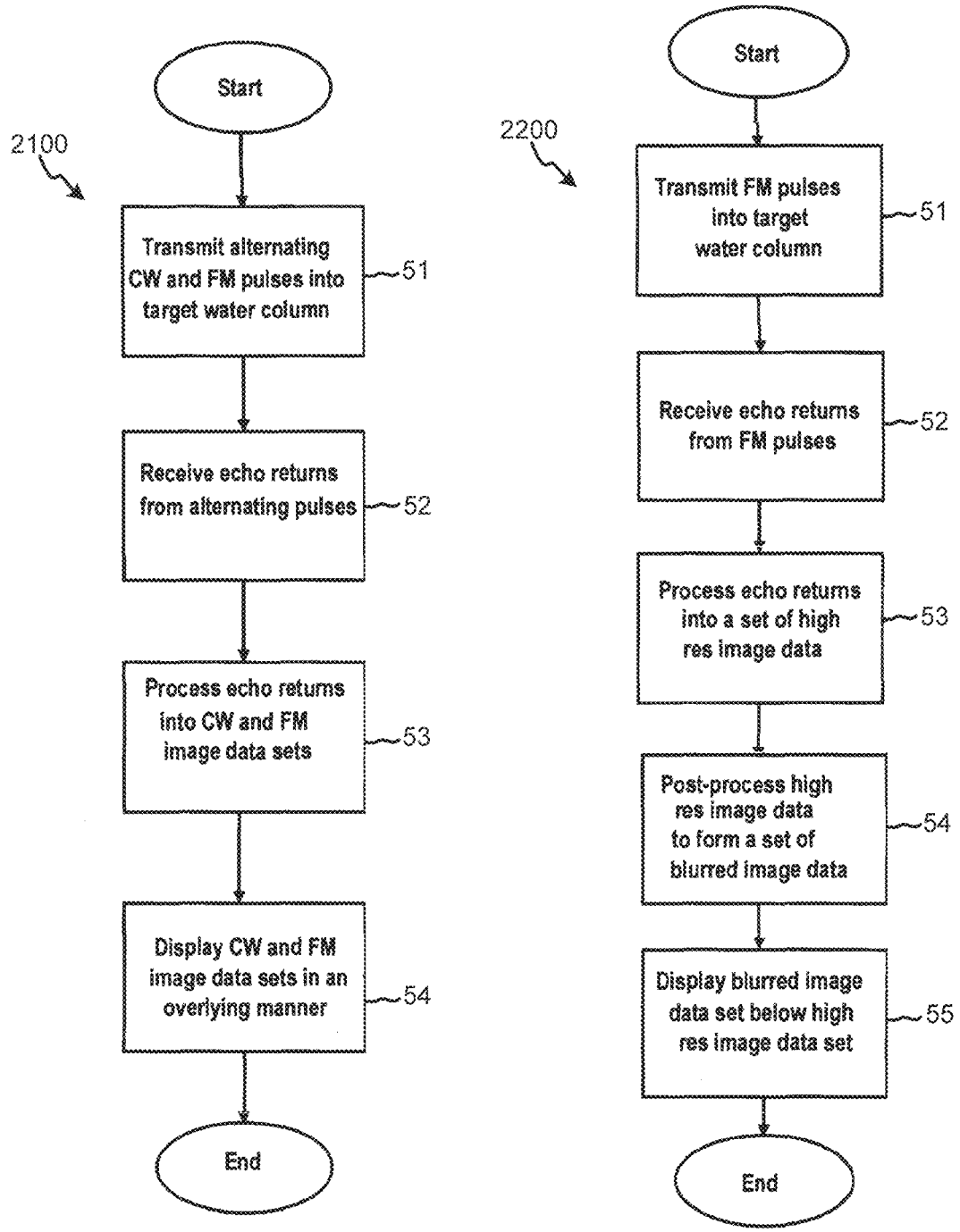
FIGS. 21A and 21B are functional block diagrams respectively illustrating example methods for forming enhanced sonar images in accordance with the disclosure.

FIGS. 21A and 22B are functional block diagrams respectively illustrating the foregoing two methods. In FIG. 21A, the method 2100 begins at S1 with transmitting CW and FM pulses into a target water column in accordance with one of the timing scenarios depicted in FIGS. 18-20. In some embodiments, the CW and FM pulses may be transmitted simultaneously or at least partially overlapped, rather than in an alternating fashion. At S2, the echo returns are received by the system, and at S3, the returns are processed into image data sets respectively corresponding to the CW and FM pulses. At S4, the CW and FM data sets are displayed such that the FM images overlay the CW images. In other embodiments, the two images may be blended, merged, or otherwise combined in a manner different than the FM images overlying the CW images. In some embodiments, the FM images may be displayed alongside the CW images. The alternate method 2200 depicted in FIG. 21B is very similar to the method 2100, except that at S1, only FM pulses are transmitted into the target water column, and that the second method 2200 includes an extra step, S4, at which the high resolution image data of the FM pulses is post-processed to form a set of blurred image data. At S5, the image data sets are displayed such that the high resolution data image set overlays the blurred image data set. Alternatively, the two data sets may be blended, merged, or otherwise combined in a different manner, including displayed alongside each other. In various embodiments, one data set may be rendered in greyscale to help differentiate the contributions to the overlaid, blended, merged, or otherwise combined image.

Figure 22:
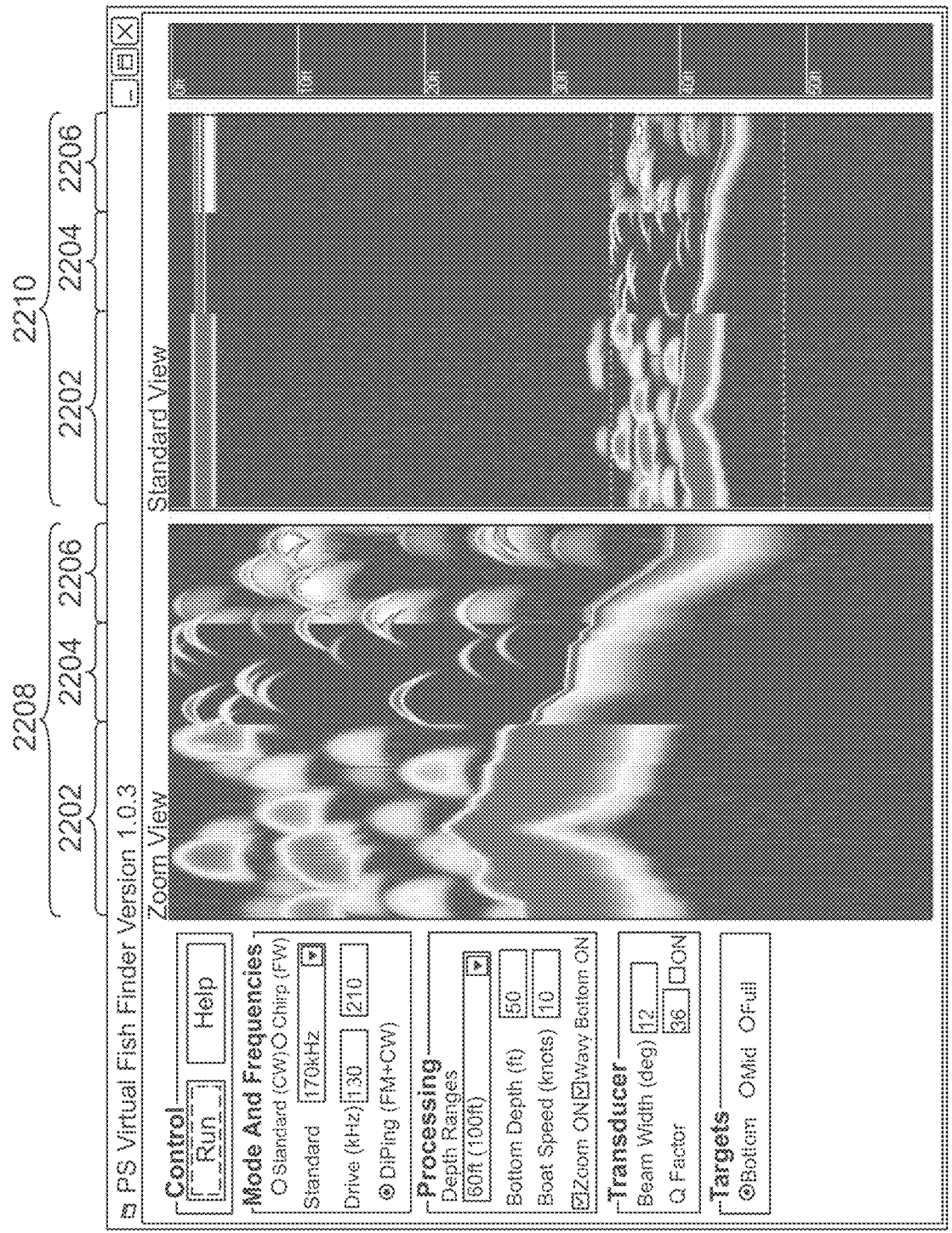
FIG. 22 is a screen shot from a fish-finder emulation software utility written to illustrate the results of a CW overlay technique in accordance with the disclosure.

FIG. 22 is a screen shot from a fish-finder emulation software utility written to illustrate the results of the CW overlay technique 2100 and 2200 above. In FIG. 22, a traditional CW sonar image 2202, an FM pulse compression image 2204, and an "overlay" image 2206, formed by overlaying the CW and FM images 2202 and 2204 as described above, are illustrated within each of a "zoom" view 2208 and a "standard magnification" view 2210 and from left to right in each view. As described above, the depth of the targets ensonified by the system, viz., the sea floor below the vessel, with a school of fish disposed above it, corresponds to the vertical axis of the display. Intensities of different acoustic returns (e.g., return signals) are indicate by a color scale (e.g., 2202, 2204) and/or a greyscale (e.g., the underlying CW image data in 2206). As can be seen in the standard view 2210 of FIG. 22, when operating in a purely FM pulse compression mode, corresponding to the image 2204, the targets occupy only a few vertical pixels, much less than the traditional single frequency CW mode, corresponding to the image 2202. Although this is advantageous when using the zoom view to discriminate between individual targets, e.g., fish and/or variations in the sea floor, it can make targets less discernable in the standard view 2210. However, by combining both the CW and FM images 2202 and 2204 (e.g., and in some embodiments placing the CW images in the background), the targets become more conspicuous (e.g., by retaining the enhanced resolution of the FM images) while retaining a close resemblance to a traditional CW sonar view. The resulting screen image therefore also offers a method of familiarizing a user with the new CW/FM overlay processing techniques. Thus, by simultaneously or contemporaneously overlaying CW and FM images on a display, an enhanced representation of targets and submerged structures is provided.

Embodiments of the present disclosure can provide inexpensive, feature-filled, reliable, compact, and accurate sonar systems, data and/or imagery. Such embodiments can be used to provide sonar data to assist in navigation, fish finding, and/or mapping for a vessel and/or to assist in the operation of other systems, devices, and/or sensors coupled to the vessel.

In accordance with various embodiments of the present disclosure, situational imagery that can be used to help operate a mobile structure may be provided by a pilot display system including one or more user interfaces configured to communicate with various sonar transducer assemblies, orientation sensors, gyroscopes, accelerometers, position sensors, and/or speed sensors providing measurements of an orientation, a position, an acceleration, and/or a speed of the mobile structure and/or any one of the other devices associated with operation of the mobile structure. In particular, sonar imagery and/or data, such as that provided by CW and/or FM overlay and related techniques as described herein, may form a portion of situational imagery provided to a user of a mobile structure employing such pilot display systems. For example, sensors may be mounted to or within the mobile structure (e.g., a watercraft, aircraft, motor vehicle, and/or other mobile structure), or may be integrated with a portable imaging device and/or sonar transducer assemblies. Embodiments of the present disclosure produce intelligent situational imagery, thereby providing imagery that is more intuitive and easier to interpret than other forms of display data provided by conventional systems and/or methods.

Figure 23A:
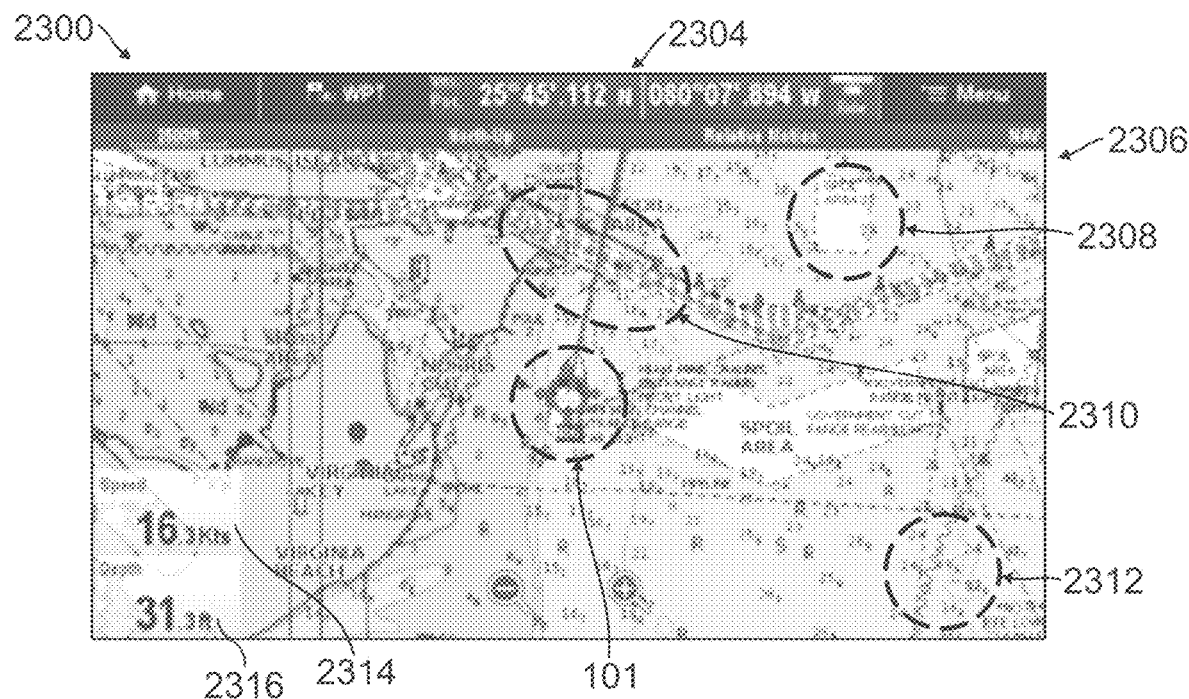
FIGS. 23A-B illustrate diagrams of situational image data rendered via a pilot display system in accordance with an embodiment of the disclosure.

FIG. 23A illustrates a diagram of situational image data 2300 rendered via a pilot display system (e.g., corresponding to system 100 of FIG. 1A) in accordance with an embodiment of the disclosure. In various embodiments, situational image data 2300 may be rendered and/or displayed to a user via user interface 120 of FIG. 1A. For example, situational image data may include data bar 2304. Data bar 2304 may include a variety of touch selectable buttons and/or indicators, such as a "Home" menu input, a "WPT" waypoint input, latitude data, longitude data, and/or a "Menu" input, as shown.

Further, situational image data 2300 may include chart plot 2306, which may include chart data, mapping data, sonar data, radar data, LIDAR data, engine data, navigation data, racing data, numerical data, other types of image data, and/or a combination of such types of data, for example, and chart plot 2306 may be scaled according to various environmental conditions of mobile structure 101. For example, system 100 may be configured to receive a speed of mobile structure 101 from speed sensor 142 mounted to mobile structure 101. System 100 may also receive an orientation of mobile structure from orientation sensor 140, including a vessel pitch, roll, and/or yaw. Based on the speed and/or the orientation of mobile structure 101, system 100 may generate situational image data 2300 and render and/or display the data via one or more displays of user interface 120. In particular, situational image data 2300 may be scaled according to the speed of mobile structure 101, the orientation of mobile structure 101, and/or the position and/or heading of mobile structure 101 relative to one or more features (e.g., hazards) indicated in chart plot 2306.

As shown in FIG. 2A, chart plot 2306 may be scaled and/or oriented, for example, according to a speed (indicated by speed indicator 2314) and/or heading of mobile structure 101, a depth (e.g., indicated by depth indicator 2316) of water underneath mobile structure 101, and/or a position and/or heading of mobile structure 101 relative to geographical areas 2308, 2312, and/or feature 2310. In addition, data bar 2304 may also be scaled or adjusted according to speed 2314 and/or depth 2316. As shown, geographic areas 2308, 2312 may be characterized by bathymetric contours, water depths, water temperatures, water column/volume debris, bottom profiles, and/or other characteristics related to radar, LIDAR, location detection, sonar, and/or other sensed environmental data. For example, geographic area 2308 near mobile structure 101 may correspond to "spoil area" indicative of an edge of a channel, sediments and/or contents in the water, shallow water, and/or material removed by dredges during channel construction. Feature 2310 may correspond to a bridge, a shipping lane, a gas line, and/or another type of chart feature indicating a possibly hazardous situation that would typically require detailed navigation and/or other type of user or autopilot interaction to address safely. System 100 may be configured to detect such features and/or conditions and generate situational image data based on those detections that facilitates operation of mobile structure 101.

Figure 23B:
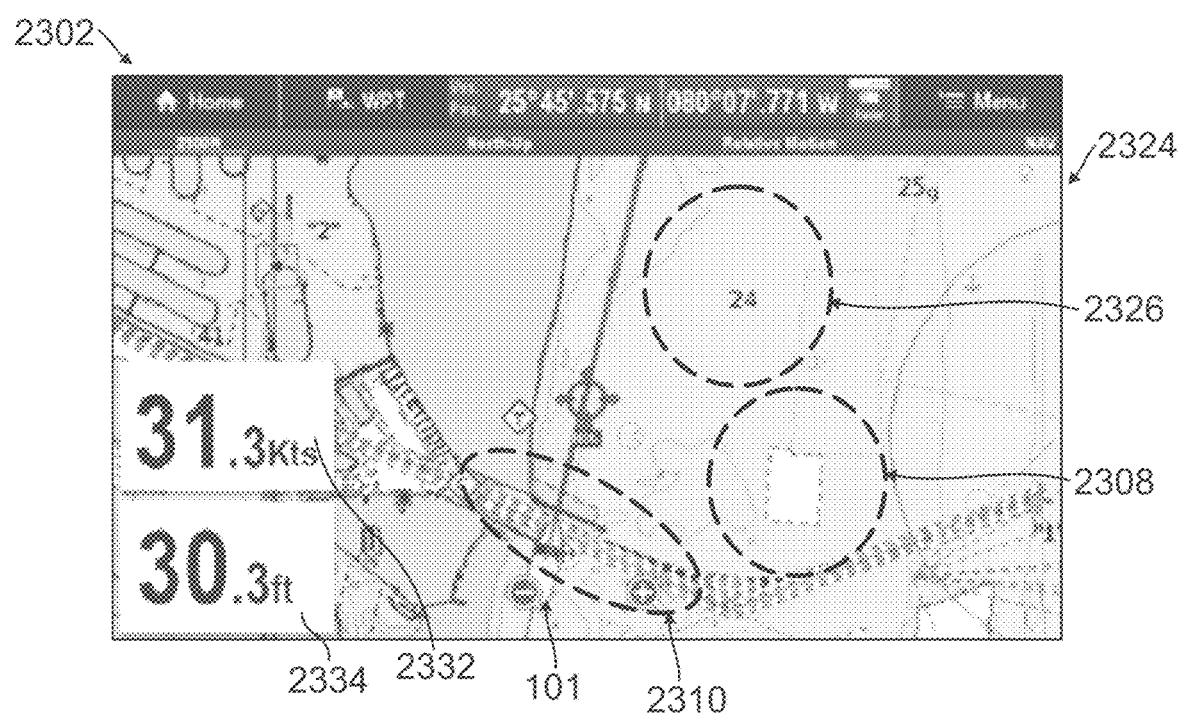

FIG. 23B illustrates a diagram of situational image data 2302 rendered via a pilot display system in accordance with an embodiment of the disclosure. In various embodiments, situational image data 2302 may include similar features as described with reference to situational image data 2300 in FIG. 23A, but where situational image data 2302 has been updated to account for an increased speed 2332 of mobile structure 101 and/or a decreased distance between mobile structure 101 and geographic area 2308 and/or feature 2310. For example, situational image data 2302 may include scaled chart plot 2324, itself including geographical areas 2326, 2308 and feature 2310 proximate mobile structure 101.

In some embodiments, situational image data 2302 may illustrate activating a "high speed mode" and/or an "easy view mode" such that certain details of chart plot 2324 are emphasized over other details. For purposes of comparison, situational image data 2300 may include chart plot 2304 that is scaled according to the speed of approximately 16.3 knots, and situational image data 2302 may correspond to chart plot 2324 that is scaled according to the higher speed of approximately 31.3 knots. As shown, speed 2332, depth 2334, potential hazards related to feature 2330, and/or heading data may be displayed, for example, with a larger font and/or with brighter features. As such, various Automatic Identification System (AIS) targets, radar targets, LIDAR targets, surface buoys, and/or other potential obstacles ahead of mobile structure 101 may be highlighted and/or brought to a user's attention by changing the scaling, arrangement, color scheme, and/or other characteristics of the situational image data.

As shown, chart plot 2324 may be scaled and/or modified by showing or hiding various forms of data or controls based on sensed environmental conditions. For example, certain features may be minimized, masked, and/or temporarily hidden or removed from chart plot 2324, such as by changing where the center of chart plot 2324 is located relative to a position and/or heading of mobile structure 101. As shown in the embodiment illustrated by FIG. 23B, situational image data 2302 has been rendered such that the center position of chart plot 2324 leads mobile structure 101 to provide an extended forward view along the expected trajectory of mobile structure 101. Further examples of such features may include data bar 2304, bathymetric data, water depth, water temperature, water column/volume debris, bottom profile, and/or various details related to radar, LIDAR, location detection, sonar, and/or other types of image data. In some embodiments, one or more touch sensing inputs and/or certain touchable zones associated with chart plot 2324 may be activated or deactivated.

As shown in FIG. 23A, mobile structure 101 may be positioned proximate the center of chart plot 2304. Thus, geographic areas 2308 and 2310 may be shown ahead of mobile structure 101 and geographic area 2312 may be shown behind mobile structure 101 while mobile structure 101 is piloted at a relatively leisurely speed. Yet, as shown in FIG. 23B, mobile structure 101 may be rendered proximate the bottom of chart plot 2324 to provide additional time for a pilot to respond to hazards in the path of mobile structure 101 while operated at a relatively high speed. Thus, geographic areas 2326 and 2308 may be rendered larger and be limited to areas generally ahead of mobile structure 101. Such rendering may allow for "look ahead" views while mobile structure 101 increases its speed or changes its heading or other operational state, providing more focused information of upcoming geographic areas and possible objects.

In some embodiments, situational image data 2302 may modify the view of mobile structure 101 and/or angles of mobile structure 101, possibly rendering a 3D view, based on an environmental state or combination of states. Such views may be focused on geographic areas 2326 and 2308 ahead and/or may denote positions of mobile structure 101 along a track or predetermined route. Further, such views may include way points and/or objects that provide visible reference and/or bearing points. Such points may be identified by a user or by one or more sensors (e.g., radar, LIDAR, sonar, other sensors) to allow the user and/or autopilot to calibrate or visually confirm the approximate location of mobile structure 101.

In some embodiments, system 100 may also include one or more proximity sensors configured to detect a proximity, presence, and/or location of a user on deck 106b or relative to or at user interface 120, and/or light sensors configured to detect an environmental light level near user interface 120. In some embodiments, at least one of the proximity sensors may be implemented with visible and/or thermal imaging sensors and/or cameras configured to detect proximity of a user relative to user interface 120 (e.g., a distance between user interface 120 and the user). As such, system 100 may be configured to determine a proximity of a user and/or a user presence at one of user interfaces 120 and/or a change in the environmental light level near user interface 120, and adjust the situational image data and/or the rendering accordingly.

For example, system 100 may be configured to detect that a user is far from user interface 120 and modify the generated situational image data to help compensate for the increased viewing distance, such as by decreasing the level of detail in the situational image data, increasing a font size of textual information in the situational image data, reducing the number of colors in a color palette used to render the situational image data, adjusting a brightness setting for the display, and/or modifying other characteristics of the image data, as described herein.

In other embodiments, system 100 may be configured to detect a change in lighting conditions affected by fog, daytime or nighttime conditions, a direction of sunlight relative to positions and/or orientations of displays of user interfaces 120, and/or the presence of a user (e.g., blocking environmental light). System 100 may be configured to modify characteristics of the situational image data and/or the display (e.g., brightness) based on the detected user presence, a relative location of a user, and/or the detected change in environmental light level.

In some embodiments, a pilot display system for marine applications may be configured to render situational image data indicative of fuel consumption efficiency. For example, situational image data may provide present fuel efficiencies compared to historic fuel efficiencies in order to guide a user or an autopilot to more efficient operation of mobile structure 101. For example, operators of powered vessel systems may be interested in maximizing the performance of the system's speed and ride while minimizing fuel-usage. One or more embodiments of the present disclosure provide fuel-usage performance graphs that help users visualize present efficiencies relative to historic readings and intuit available adjustments to increase operational efficiency. In some instances, the historic readings may include records of various factors relevant to fuel usage that were measured while the historic fuel efficiencies were recorded, such as wave conditions, trim tab deployment angle, time of day and/or tidal current conditions, environmental temperatures, and/or other factors relevant to fuel usage. Such factors may be displayed textually and/or in graph form for a particular historic fuel efficiency or selection of historic fuel efficiencies, for example, or may be correlated with current conditions to limit the historic readings displayed to a user to only those historic readings substantially similar or relevant to a current fuel usage.

For example, in one embodiment, system 100 may be configured to render a graph of fuel-usage rates against a speed over water (SOW) and/or a speed over ground (SOG) of mobile structure 101. In one embodiment, user interface 120 may be configured to render an area of the graph that includes a historic region, possibly including historic (e.g., previously measured and/or provided by a manufacturer) fuel-efficiency rates. User interface 120 may also be configured to render an area of the graph representing relatively high fuel-efficiency rates, as compared to the historical rates, an average of the historical rates (e.g., for particular speeds of mobile structure 101) and/or a present rate, where the average of historical rates may include a mean, mode, and/or median of fuel usage rates experienced by mobile structure 101 for a particular speed, rpm, and/or other state or condition of mobile structure 101. Further, user interface 120 may be configured to render an area of the graph representing relatively poor fuel-efficiency rates, as compared to the historic rates, the average of historical rates, and/or the present rate.

In some embodiments, one or more portions of the graph may be rendered according to a first chart characteristic (e.g., including a green color or tint and/or other graphical, symbolic/icon, and/or textual indication to communicate relatively good fuel efficiency) when the present fuel efficiency is close to or better than the historical average, and one or more portions of the graph may be rendered according to a second chart characteristic when the present fuel efficiency is close to or worse than the historical average. For example, such portions may be displayed in a red color or tint when the present fuel efficiency is worse than the historic averages and a green color or tint when the present fuel efficiency is better than the historic averages. In other embodiments, other easily discerned or intuited characteristics of the graph may be alternated and/or changed to indicate whether the present fuel efficiency is better or worse than the historical averages.

Fuel usage monitoring is critical to successfully piloting to a destination, particularly if the area being traversed is open water without opportunity for refueling. Various external factors may affect fuel-efficiency rates for mobile structure 101, such as relative wind speeds, predominate tidal currents (e.g., which are typically time dependent), and/or other external factors. Such external factors can drastically increase the fuel supply needed to reach a particular destination, and so displaying fuel-efficiency rates to a user in an easily interpreted manner can be very beneficial for safe and successful marine navigation.

Figure 24A:
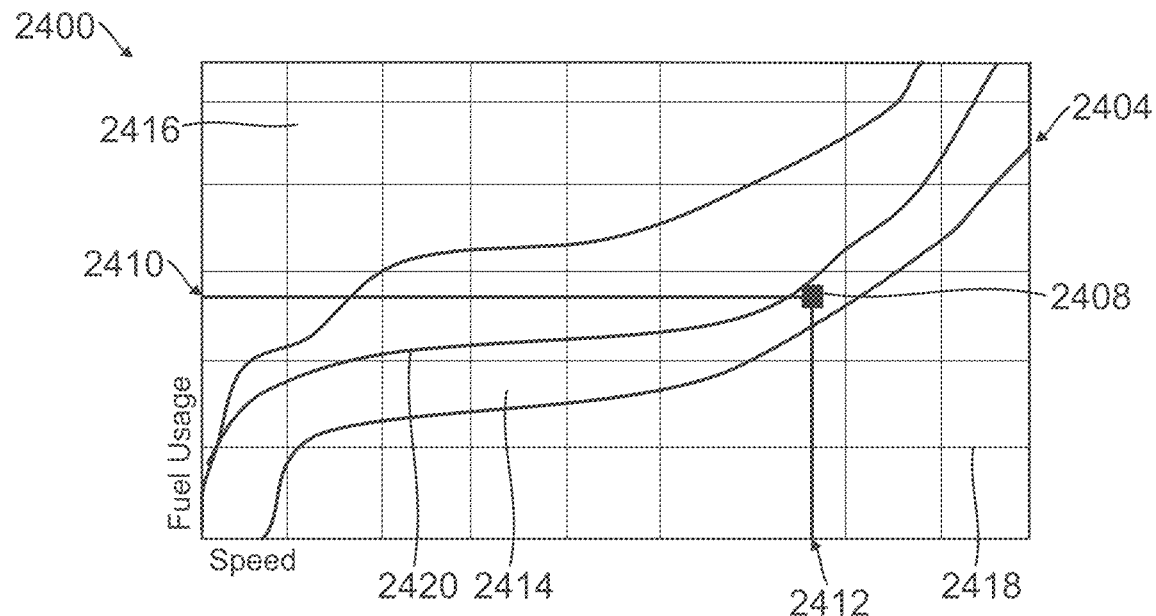
FIGS. 24A-B illustrate diagrams of situational image data rendered via a pilot display system in accordance with an embodiment of the disclosure.

FIG. 24A illustrates a diagram of situational image data 2400 rendered via a pilot display system in accordance with an embodiment of the disclosure. In various embodiments, situational image data 2400 may be generated and/or rendered via user interface 120 of FIG. 1A. As shown, situational image data 2400 may be configured to show, at a glance, the present fuel-usage efficiency for mobile structure 101. Situational image data 2400 may include a fuel efficiency chart 2404 configured to communicate varying efficiencies to a user.

Present and historical fuel-efficiency rates may be rendered via one or more displays of user interface 120. For instance, fuel-usage rate 2410 may be plotted against speed 2412 of mobile structure 101 on fuel efficiency chart 2404 to obtain fuel-efficiency rate 2408. In some embodiments, a fuel-usage sensor (e.g., other modules 180 of FIG. 1A) may be mounted to mobile structure 101 and configured to measure an amount of fuel stored and/or used by system 100. As such, system 100 may be configured to receive or determine fuel-usage rate 2410 from sensor data provided by the fuel-usage sensor. In other embodiments, other sensors (e.g., an RPM sensor, a fuel injection system sensor, and/or other sensors) may be used to estimate a fuel-usage rate for mobile structure 101. Fuel-efficiency rate 2408 may be determined based on fuel-usage rate 2410 and speed 2412 of mobile structure 101. Fuel-usage rate 2410 may be provided in a variety of units, for example, such as British or U.S. gallons per minute, hour, mile, or kilometer, liters per minute, hour, mile, or kilometer, and/or other units. Speed 2412 may be provided in similar units, in knots (e.g., one nautical mile, or 1.852 kilometers, per hour), and/or other units. Such units may be selected by a user through user input provided to user interface 120.

In various embodiments, fuel efficiency chart 2404 may include a number of regions. For example, fuel efficiency chart 2404 may include historical region 2414, poor efficiency region 2416, and/or high efficiency region 2418, and each region may be rendered using different colors or shades or tints to differentiate poor from high and/or historical from poor and high. As shown, fuel efficiency chart 2404 may include an average fuel-efficiency rate curve 2420 plotted against a number of speeds of mobile structure 101. As noted above, average fuel-efficiency rate curve 2420 may be determined by taking the mean values, mode values, and/or median values of historic fuel-efficiency rates for particular speeds, across a range of speeds, for example, as shown. Poor efficiency region 2416, shown above historical region 2414, may include various fuel-efficiency rates that are worse than those in historical region 2414. High efficiency region 2418, shown below historical region 2414, may include various fuel-efficiency rates that are better than those in historical region 2414.

Accordingly, system 100 may be configured to generate one or more regions to illustrate the instantaneous, historical, and/or nominal fuel efficiency of mobile structure 101 and convey such information to a user. For example, system 100 may be configured to generate historical region 2414, poor efficiency region 2416, and/or high efficiency region 2418. In some instances, system 100 may include a memory (e.g., a portion of controller 130, for example) with stored historical fuel efficiency rates for particular speeds of mobile structure 101. As such, system 100 may generate historical region 2414 based on fuel-efficiency rates measured previously and stored in and retrieved from the memory. In some embodiments, system 100 may be configured to generate historical region 2414 based on historical fuel-efficiency rates provided by a manufacturer (e.g., nominal or expected ranges of fuel-efficiency rates).

System 100 may also be configured to generate average fuel-efficiency rate curve 2420 based on the historical fuel-efficiency rates. Average fuel-efficiency rate curve 2420 may be calculated as mean values, mode values, and/or median values of historic fuel-efficiency rates, for example. Yet further, system 100 may generate poor efficiency region 2416 and/or high efficiency region 2418 based, at least in part, on generated historical region 2414 and/or average fuel-efficiency rate curve 2420.

Figure 24B:
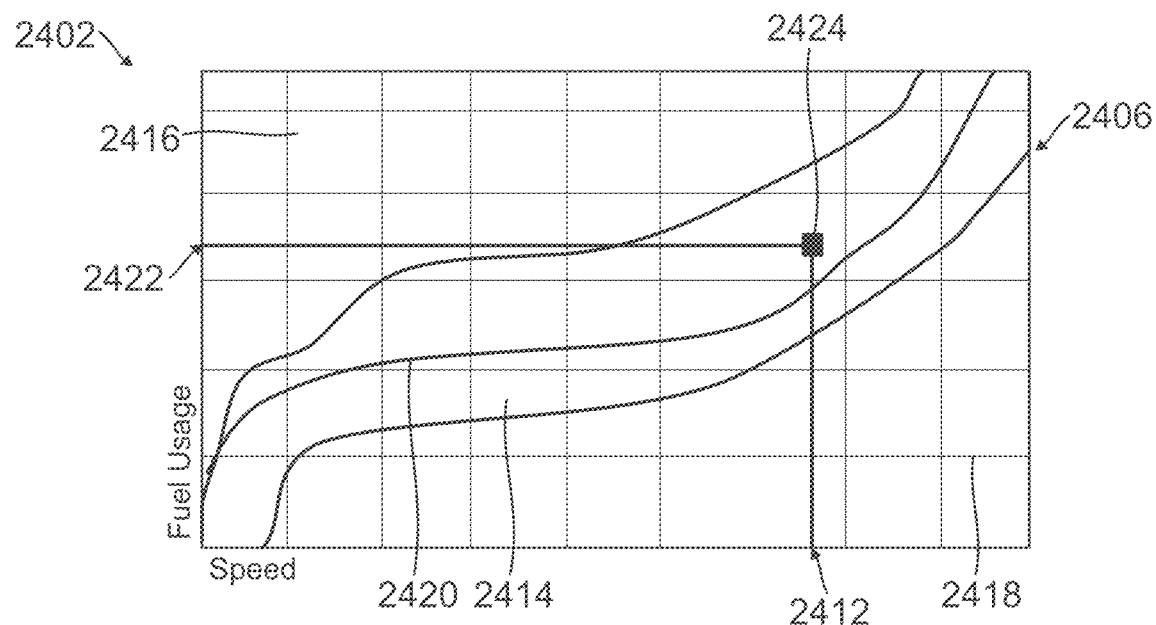

FIG. 24B illustrates a diagram of situational image data 2402 rendered via a pilot display system in accordance with an embodiment of the disclosure. In various embodiments, situational image data 2402 may include similar features as described with reference to situational image data 2400 in FIG. 24A. For example, situational image data 2402 may correspond to fuel efficiency chart 2406, which may show speed 2412, historical region 2414, poor efficiency region 2416, high efficiency region 2418, and historical-average fuel-efficiency rates 2420, which are also shown in FIG. 24A.

In some embodiments, situational image data 2400 may be rendered to show a change in fuel-efficiency rates of the system. For example, fuel efficiency chart 2406 may also show fuel-usage rate 2422 which is higher than fuel-usage rate 2410 in FIG. 24A, and fuel-efficiency rate 2424 which has drifted above and is worse than average fuel-efficiency rate curve 2420. In some embodiments, the fuel-usage rate 2422 may increase above fuel-usage rate 2410 due to the various external factors noted above, for example, such as the relative wind speed and/or a water current.

In various embodiments, a user may be alerted to changes in fuel-efficiency rates by graph 2406, for example, to facilitate safe and secure navigation (e.g., to ensure that the system has enough fuel to make it to a particular destination). For example, fuel efficiency chart 2406 may be rendered in a first color or tint, e.g., red to indicate relatively poor efficiency, based on fuel-efficiency rate 2424 drifting above curve 2420 and/or towards poor efficiency region 2416. Further, user interface 120 may be configured to display or flash fuel efficiency chart 2406 in one or more different colors and/or display chart 2406 on a main display to capture the attention of the user. In other embodiments, fuel efficiency chart 2404 may be rendered in a second color or tint, e.g., green to indicate nominal or relatively good efficiency, based on fuel-efficiency rate 2408 drawing towards the historic-average fuel-efficiency rates 2420 and/or towards high efficiency region 2418. In such embodiments, fuel efficiency chart 2404 may be dimmed and/or removed from a main display.

Many factors may be used to determine the danger of a potential collision to a mobile structure on water. A pilot display system, according to embodiments of the present disclosure, may include various sensors mounted on a mobile structure to receive numerous types of data corresponding to such factors. In some embodiments, the pilot display system may use the sensors to implement a "collision warning" feature that detects charted objects and initiates an alarm if the objects come within a given distance. Further, the pilot display system may include multiple displays to provide visual indications of dangers associated with potential collisions. For example, one or more displays may indicate particular types of collisions and/or threats, for instance, based on radar, LIDAR, and/or AIS, and the system may be configured to display a range of threats, prioritized by threat level. As such, embodiments of the present disclosure may be configured to provide a threat summary to a user by implementing a threat-based view. Further, situational image data may be generated and displayed to a user to provide rapid, prioritized, and intuitive depictions of potential collision threats to a mobile structure.

In some embodiments, a "strategic" threat-based view may provide information regarding multiple potential threats, each rated by a given threat level. A pilot display system, according to embodiments disclosed herein, may be configured to initiate alerts in the form of visual alerts and/or audio alerts for high threat level objects, for example, and to recommend and/or implement (e.g., through use of an autopilot) various options and/or courses of action to reduce the dangers of threatening objects and potential collisions. Such options and/or courses of action may include changing directions, changing speed of the mobile structure, and/or resorting to alternative courses/waypoint plots.

In some embodiments, objects that are less threatening such as a slower object, a stationary object, an object astern, and/or another vessel travelling away from mobile structure 101 may be suppressed, minimized, and/or temporarily omitted from the threat-based view. Audio alerts for less threatening objects may be subdued and/or muted, for example. In some embodiments, a color coded timeline may be generated and rendered/displayed to provide an indication or summary of multiple threats over time. Further, the timeline may show a severity related to each threat and a change in severity of each threat over time.

Figure 25A:
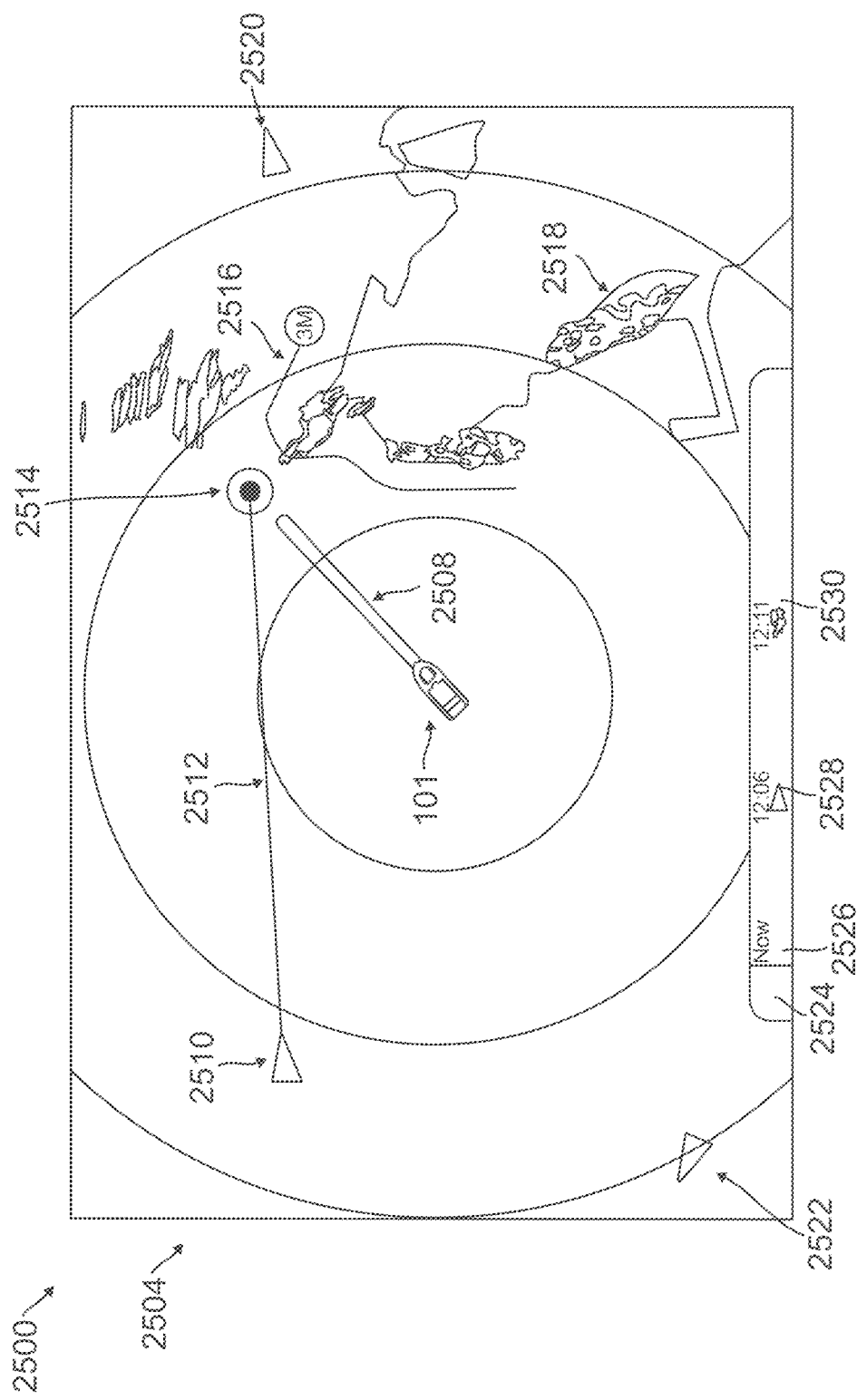
FIGS. 25A-B illustrate diagrams of situational image data rendered via a pilot display system in accordance with an embodiment of the disclosure.

FIG. 25A illustrates a diagram of situational image data 2500 rendered via a pilot display system in accordance with an embodiment of the disclosure. In various embodiments, situational image data 2500 may be rendered via user interface 120 of FIG. 1A. As shown, situational image data 2500 may be rendered to illustrate threat levels of one or more objects shown in proximity to mobile structure 101. Further, situational image data 2500 may include chart plot 2504 to illustrate various threat levels associated with the objects, which may be configured to emphasize the most immediate and/or severe threat levels.

In some embodiments, an object may be analyzed to determine a threat level associated with the object. For example, a system may determine a threat level associated with object 2510 colliding with mobile structure 101. For instance, system 100 may include GPS 146 and a target sensor (e.g., other modules 180) mounted to mobile structure 101. The target sensor (e.g., a ranging sensor) may be configured to detect object 2510 and/or one or more characteristics of object 2510 in relation to mobile structure 101. For example, in some embodiments, the target sensor may be configured to detect an absolute or relative (e.g., relative to mobile structure 101) location or position of object 2510. System 100 may be configured to receive a location of mobile structure 101 from GPS 146 and a location of object 2510 from the target sensor. In various embodiments, object 2510 may be detected and identified as a vessel, another mobile structure, and/or a watercraft capable of travelling by sail, gas power, and/or another mode of power, having a particular course, size, and/or speed.

System 100 may be configured to determine a threat level of object 2510 based at least on one or more locations of object 2510. For example, system 100 may be configured to determine a threat level for object 2510 based on the location of object 2510 and projected course 2512 of object 2510, where the projected course may be determined from multiple locations of object 2510 measured over time. The threat level of object 2510 may also be determined based on projected collision point 2514 of object 2510 and mobile structure 101, which may be determined from projected course 2508 of mobile structure 101 (e.g., which may be known, received from orientation sensor 140, and/or derived from multiple readings of steering sensor/actuator 150 and/or GPS 146, for example). As such, system 100 may generate situational image data 2500 based, at least in part, on the determined threat level, the location of object 2510 in relation to mobile structure 101, the speed of mobile structure 101, and/or a threat level color associated with the determined threat level.

Further, various parameters may be configured to define one or more threat levels of objects. For example, user-configurable parameters may include a minimum depth of water beneath mobile structure 101, a width or height of mobile structure 101, a capability of mobile structure 101 to travel by sail and/or gas power, a speed range of mobile structure 101, a turning radius of mobile structure 101, a size and shape of a safe zone defined around mobile structure 101, and/or other navigational characteristics of mobile structure 101. For example, parameters may be configured to define object 2510 as more threatening to mobile structure 101 when mobile structure 101 travels by sail as opposed travelling by gas power, possibly making maneuvering more challenging and/or time-consuming.

In some embodiments, threat levels of objects proximate to mobile structure 101 may be prioritized based on a number of factors. As shown, a threat level of object 2510 impacting mobile structure 101 may be higher than other possible threat levels, based on a determined probability of object 2510 colliding with mobile structure 101. In some embodiments, various threat levels and/or prioritizations may be modified as other objects approach mobile structure 101, which may be dependent on the magnitude of the approach within a given time period. In various embodiments, as the probability of object 2510 colliding with mobile structure 101 diminishes, object 2510 may be minimized, dimmed, and/or displayed with less intensity. In some instances, chart plot 2504 may be modified based on object 2510 changing its heading and/or changing its speed, such as indicating an amber warning (e.g., as opposed to red for a more serious threat), a direct proximity alert, and/or a collision warning.

In some embodiments, objects, projected courses, and/or other related aspects of chart plot 2504 may be rendered in one or more colors each corresponding to a particular threat level. For example, object 2510 may be an AIS target displayed in red to indicate a serious threat to mobile structure 101 based on projected course 2512 showing a potential collision path to collision point 2514. Further, depth contour 2516 may indicate "3 meters" to indicate a medium threat to mobile structure 101 due to shallow waters proximate to projected course 2508. As such, depth contour 2516 may be displayed in yellow and/or orange reflecting a medium threat level, the font size used may be increased or decreased based on increasing or decreasing threat level. In addition, radar and/or LIDAR returns of object 2518 may be determined as less threatening to mobile structure 101 based on projected course 2508 and/or a lack of course for object 2518. Thus, colder palettes, e.g., blue colors, may be used to indicate the low threat level of object 2518. In some embodiments, object 2518 may be omitted completely or rendered without color while at a low threat level. Further, mobile structures 2520 and 2522 may be detected as travelling away from mobile structure 101 and be determined or identified as non-threatening AIS targets and displayed with neutral colors such as gray and/or black.

In some embodiments, a timeline may be rendered to show various threat levels over time. For example, timeline 2524 may be rendered to show various threat levels associated with mobile structure 101 over a given period of time. For example, time 2526 may show "Now" as the present time of 12:00 PM, reflecting neutral colors to represent little or no threats to mobile structure 101. Time 2528 indicates "12:06 PM" as an estimated future time when mobile structure 101 may be proximate to or approaching object 2510 (e.g., also shown as a miniature triangle in timeline 2524), thereby reflecting a red color to represent a high threat level. Time 2530 indicates "12:11 PM" as an estimated future time when mobile structure 101 may be proximate to depth contour 2516 (e.g., also shown in miniature in timeline 2524), reflecting a red, an orange, and/or a yellow color to represent relatively threatening objects.

In some embodiments, a determined threat level may be modified. For example, the system may receive an updated location or course of mobile structure 101 from the GPS. In particular, the updated location may include one or more locations along projected course 2508. Further, the system may receive an updated location of object 2510 from the target sensor, possibly along projected course 2512. In addition, the system may determine a closing distance between object 2510 and mobile structure 101. In some instances, the closing distance may be one or more distances and/or areas between mobile structure 101 and object 2510 and/or projected collision point 2514. Further, the closing distance may be based on projected courses 2508 and 2512. Yet further, the system may determine the closing distance based, at least in part, on the updated locations of mobile structure 101 and/or object 2510.

As such, the system may modify one or more threat levels associated with object 2510 based on one or more closing distances. System 100 may be configured to generate updated situational image data 2500 based on such modified threat levels. In particular, the modified threat level may be associated with a modified threat level color, and portions of situational image data 2500 may be rendered in modified threat level colors via at least one display of user interface 120.

In various embodiments, potentially threatening objects may include radar and/or LIDAR targets and/or objects, AIS targets and/or objects, charted depths, and/or charted objects such as buoys, land masses, bridges, shallow waters, tide races, and/or other objects or structures that can be detected by a target sensor or charted on a map or bathymetric plot. Other potential threats may be related to weather (e.g., squalls, storms, and/or hurricanes), tides (e.g., height, drift, and/or set), and/or water currents. In further embodiments, some potential threats may involve certain waypoints or courses and low fuel levels, projected travelling distances and fuel-usage rates, obstacles identified from imaging analytics (e.g., thermal and/or visual imaging), sonar-detected hazards from forward-looking sonar (e.g., floating debris, containers, and/or ice), and/or from side vision (e.g., quay walls and/or pillars). In addition, potential threats may involve previously recorded or charted hazards from previous trips, crowd sourcing, and/or local navigation regulations such as preferred channels, speed restrictions, and/or prohibited areas.

In some embodiments, system 100 may be configured to recommend options and/or courses of action to reduce threat levels associated with objects. For example, system 100 may recommend a change in course or direction that mobile structure 101 may take to reduce one or more threat levels. Further, system 100 may be configured to generate and/or render and display projected courses for mobile structure 101 that represent safer zones free of objects associated with a certain threat level or levels. For example, system 100 may indicate alternative courses away from projected courses 2512 and 2514, depth contour 2516, and/or object 2518.

Figure 25B:
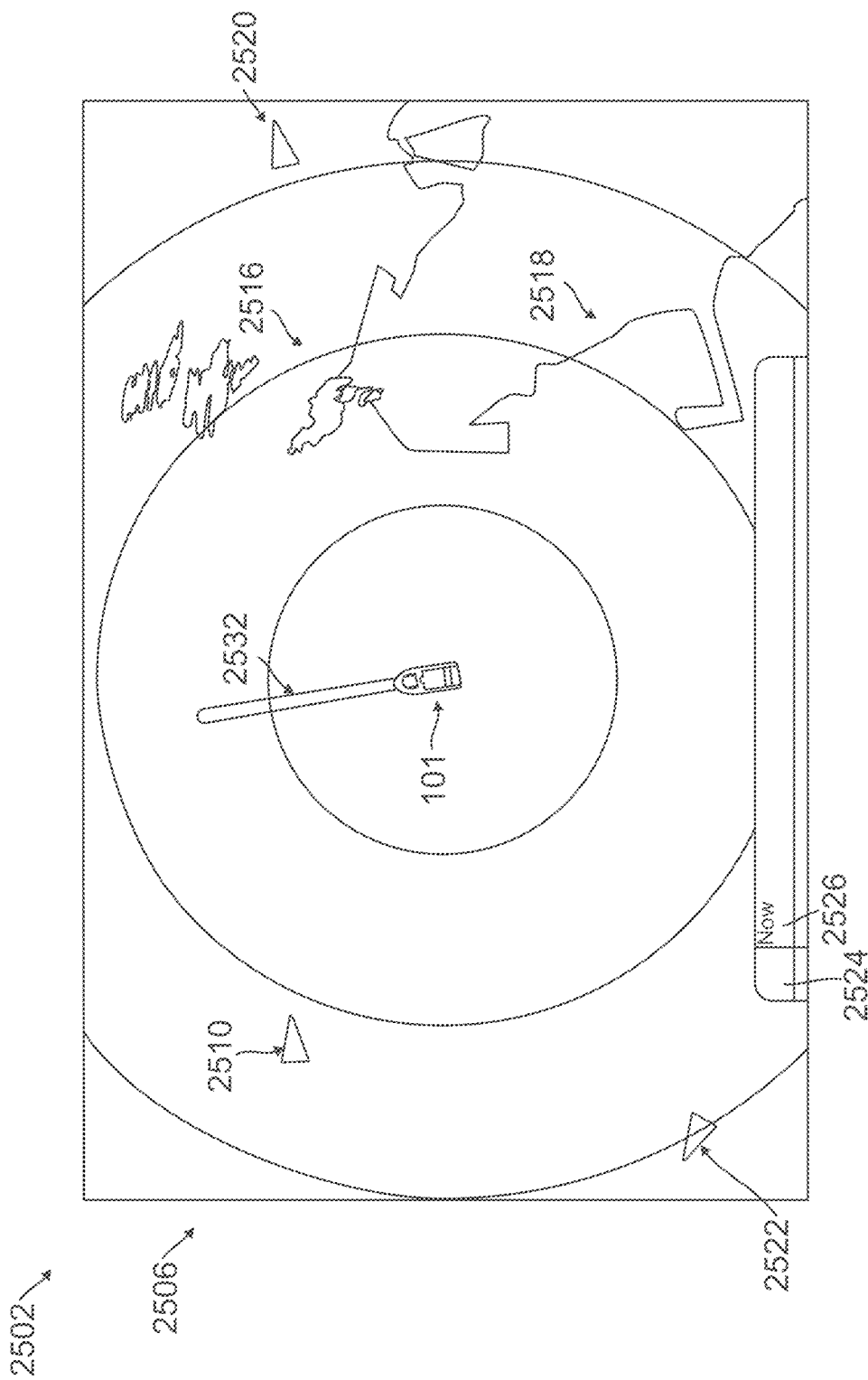

FIG. 25B illustrates a diagram of situational image data 2502 rendered via a pilot display system in accordance with an embodiment of the disclosure. In various embodiments, situational image data 2502 may include similar features as described with reference to situational image data 2500 in FIG. 25A. For example, situational image data 2502 may correspond to chart plot 2506, which shows mobile structure 101, projected course 2532 of mobile structure 101, object 2510, depth contour 2516, object 2518, and/or mobile structures 2520, 2522 that may be similar as described with reference to FIG. 25A.

In some embodiments, timeline 2524 may be based on a projected course (e.g., projected course 2508 of FIG. 25A and/or 2532 of FIG. 25B) of mobile structure 101 that is determined from the current position, speed, and/or heading of mobile structure 101. In other embodiments, timeline 2524 may be based on a projected course corresponding to a planned course, such as a course following a pre-plotted route and/or utilizing one or more waypoints, for example. In either embodiment, system 100 may be configured to determine timeline 2524 and/or one or more threat levels based on either type of projected course for mobile structure 101, such as by user selection. For example, object 2510 may not be a high level threat based on mobile structure 101 continuing on projected course 2532, but, object 2510 may be a high level threat if the projected course of mobile structure 101 includes changing its course from course 2532 to course 2508.

In various embodiments, situational image data 2502 may also be rendered via user interface 120 of FIG. 1A. As shown, situational image data 2502 may be rendered to illustrate threat levels of one or more objects 2510, 2516, 2518, 2520, and/or 2522 shown in proximity to mobile structure 101, and may be configured to emphasize the most immediate and/or severe threat levels. As noted, mobile structure 101 may change its projected course to reduce various threat levels. For example, chart plot 2506 may reflect a change from mobile structure 101's projected course 2508 to projected course 2532, thereby diminishing the probability of colliding with object 2510 and/or objects associated with contour 2516. As such, the intensity of the various threat levels may be reduced accordingly. In particular, various features of chart plot 2506 may be hidden and/or diminished. For example, depth contour 2516 may be hidden and/or shown with a colder palette. Further, the group of non-threatening mobile structures 2520 and 2522 may also include mobile structure 2510, which has begun to drift and has no projected intercept course. Thus, mobile structures 2510, 2520, 2522, and object 2518 may be minimized, diminished, omitted, and/or shown in neutral colors, as described herein.

In accordance with embodiments disclosed herein, a pilot display system may include one or more touchscreen displays that can be configured to display situational and/or other types of image data based on the displays' relative positions. For example, multiple touchscreen displays may be installed at a single station within a dashboard, a common table, and/or a video wall, also referred to herein as a helmstation. Although primarily described herein in reference to a helmstation on a mobile structure, in other embodiments, the multiple touchscreen displays may also be implemented into any video wall separate from a mobile structure, such as in a video wall for a marine control center on land, or in a general multiple-display video presentation system.

In some embodiments, a mobile structure may include multiple helmstations. For example, there may be helmstations on a flybridge, a main helm, a saloon, and/or an engine room of a watercraft. As such, a pilot display system, according to embodiments disclosed herein, may be configured to detect which displays are co-located and the relative positions and/or orientations of co-located displays. For example, system 100 may be configured to use multiple displays to render information in a coherent fashion across the multiple displays while minimizing overlap and/or duplication of information. For instance, a single image may be contiguously rendered across multiple displays located proximate to one another, such as displays abutting one another. In various embodiments, system 100 may include two or more co-located touchscreen displays, and system 100 may be configured to determine their relative positions and/or orientations based on swipe motions across two or more displays, as described herein. In some embodiments, such determination may be facilitated by a sequence of menu interactions and/or serial numbers for the displays.

Figure 26A:
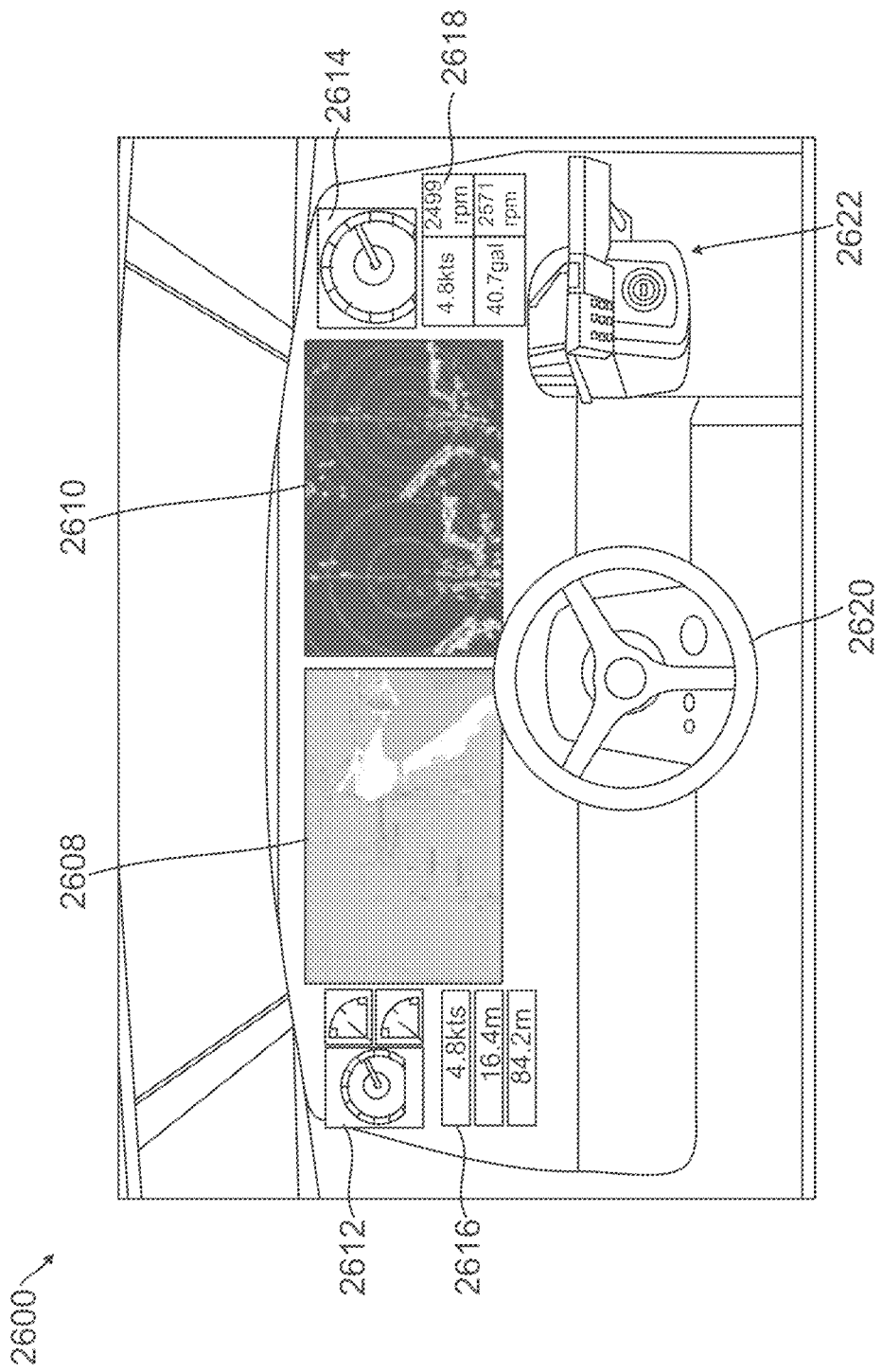
FIGS. 26A-C illustrate diagrams of pilot display systems including a user interface in accordance with an embodiment of the disclosure.

FIG. 26A illustrates a diagram of a pilot display system including a user interface 2600 in accordance with an embodiment of the disclosure. For example, user interface 2600 may be located at the main helm of a mobile structure. In various embodiments, user interface 2600 may be implemented with similar functionality as described with reference to user interfaces 120 of system 100 in FIGS. 1A and 1B. In the embodiment shown in FIG. 26A, user interface 2600 may include displays 2608 and 2610, gauges 2612 and 2614, meters 2616 and 2618, helm 2620, and throttle 2622.

Displays 2608 and 2610, gauges 2612 and 2614, and meters 2616 and 2618 may be implemented as one or more LCDs, OLEDs, touchscreen displays, projection devices, and/or other displays that may be configured to display situational image data. For example, displays 2608 and 2610 may be configured to provide a geographic map including positions, headings, and/or orientations of mobile structure 101 overlaid on a geographical map. Further, displays 2608 and 2610 may be configured to render chart plots 2306 and 2324 as described with reference to FIGS. 2A and 2B, fuel efficiency charts 2404 and 2406 as described with reference to FIGS. 3A and 3B, and chart plots 2504 and 2506 as described with reference to FIGS. 4A and 4B, as well as other forms of situational image data as described herein.

In some embodiments, gauges 2612 and 2614, and meters 2616 and 2618 may be implemented as digital and/or analog gauges and meters. Gauges 2612 and 2614, and meters 2616 and 2618 may include tachometers, boat speedometers, fuel gauges, hour meters, oil pressure gauges, water pressure gauges, depth sounders, water temperature gauges, trim gauges, engine synchronizers, and compasses, for example. As shown in user interface 2600, meters 2616 and 2618 may be configured to provide the speed of mobile structure 101. Meters 2616 and 2618 may also provide distances between a mobile structure and various objects, other mobiles structures, and destination points, for example. Helm 2620 and throttle 2622 may be configured to control the speed, direction, and/or the orientation of mobile structure 101.

Figure 26B:
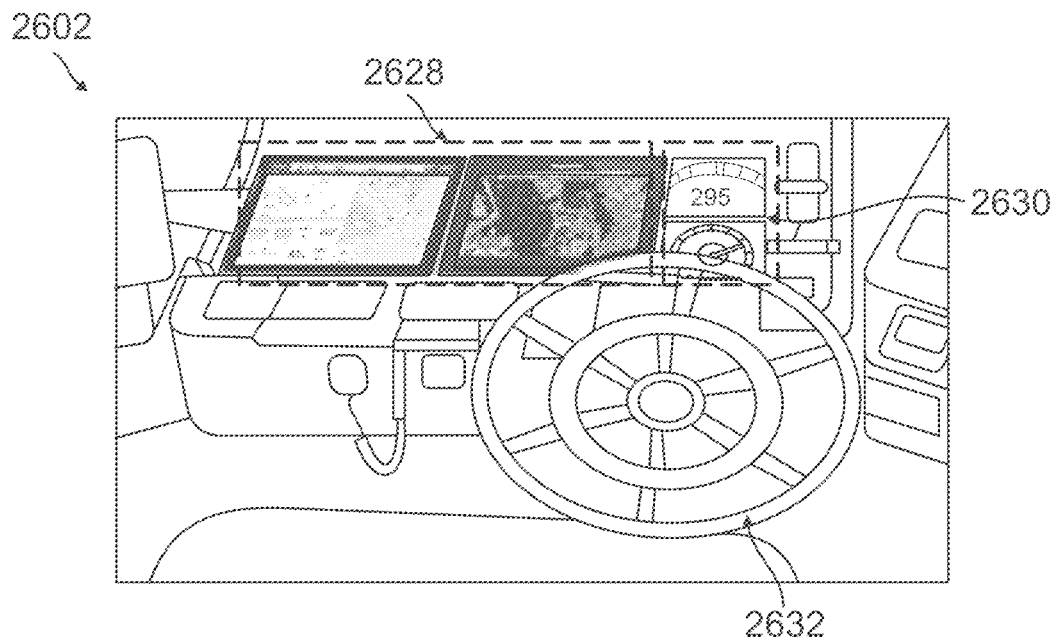
Figure 26C:
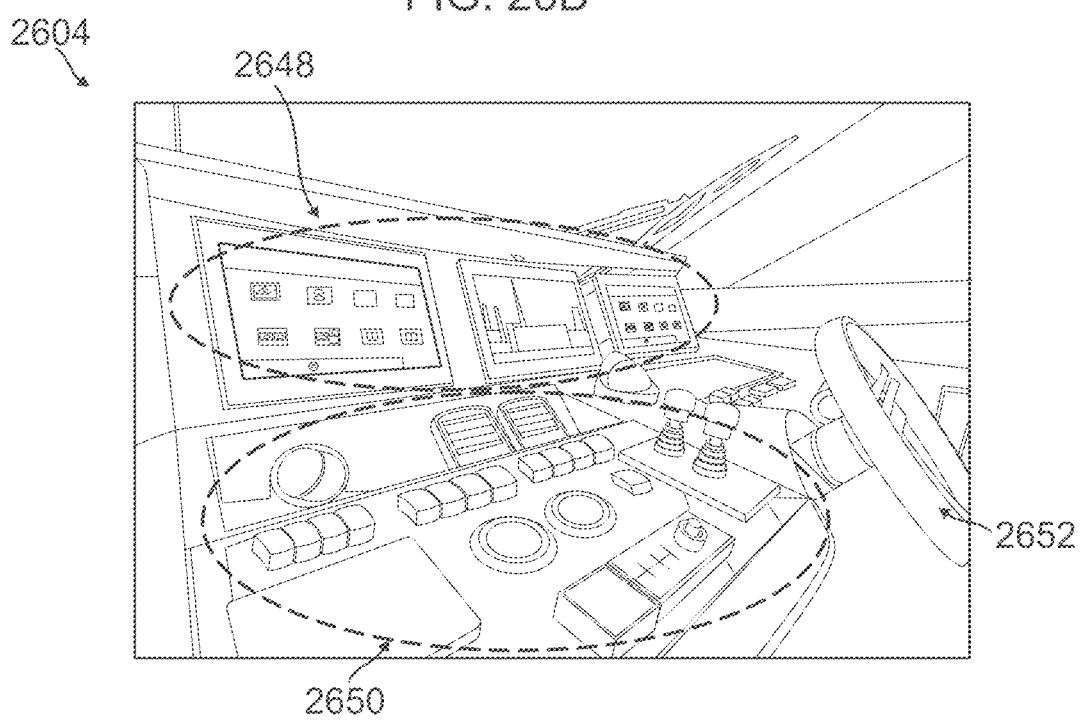
Figure 26D:
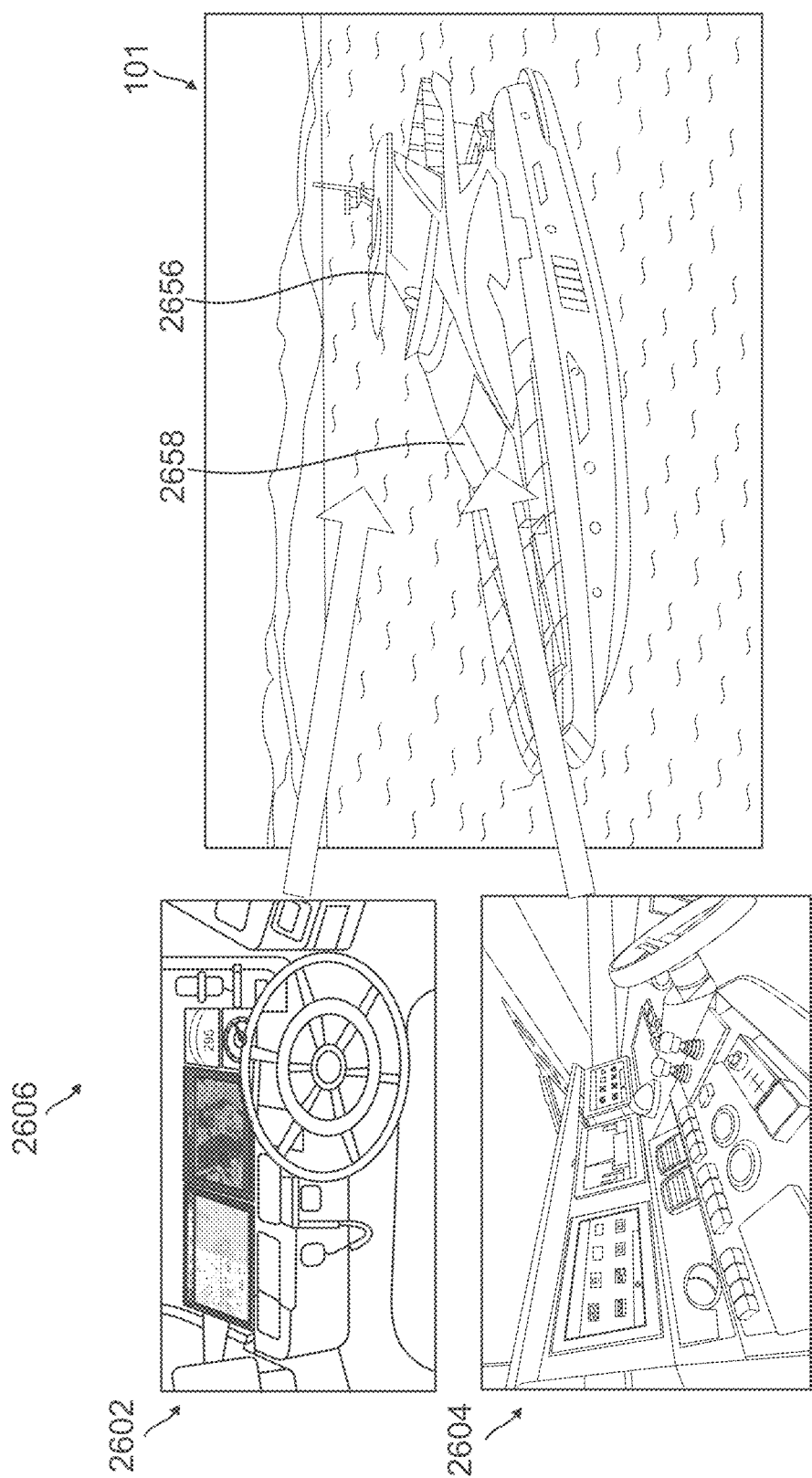
FIG. 26D illustrates a diagram of a pilot display system including multiple user interfaces in accordance with an embodiment of the disclosure.

FIG. 26B illustrates a diagram of a pilot display system including a user interface 2602 in accordance with an embodiment of the disclosure, located at a flybridge. In various embodiments, user interface 2602 may be implemented with similar functionality as described with reference to user interface 2600 in FIG. 26A. For example, as shown in FIG. 26B, user interface 2602 may include displays 2628, gauges and meters 2630, and helm 2632. FIG. 26C illustrates a diagram of a pilot display system including a user interface 2604 in accordance with an embodiment of the disclosure, located at a main helm or saloon. In various embodiments, user interface 2604 may be implemented with similar functionality as described with reference to user interfaces 2600 and 2602 in FIGS. 5A and 5B, respectively. For example, as shown in FIG. 26C, user interface 2604 may include displays 2648, gauges and meters 2650, and helm 2652. FIG. 26D illustrates a diagram of a pilot display system 2606 including multiple user interfaces 2602 and 2604 in accordance with an embodiment of the disclosure. In the embodiment shown in FIG. 26D, user interface 2602 may be located in flybridge 2656 of mobile structure 101 and user interface 2604 may be located in main helm 2658 of mobile structure 101.

In one embodiment illustrated in FIG. 26D, system 2606 may include a proximity sensor (e.g., other modules 180 of corresponding system 100 of FIG. 1A) and may be configured to detect a presence of a user at or near user interface 2602 and/or 2604. Further, system 2606 may include a light sensor (e.g., other modules 180) and may be configured to detect an environmental light level near user interface 2602 and/or 2604. Thus, system 2606 may modify various characteristics of the situational image data rendered in at least one of multiple displays based on the detected user presence and/or the detected change in environmental light level, as described herein.

Figure 27A:
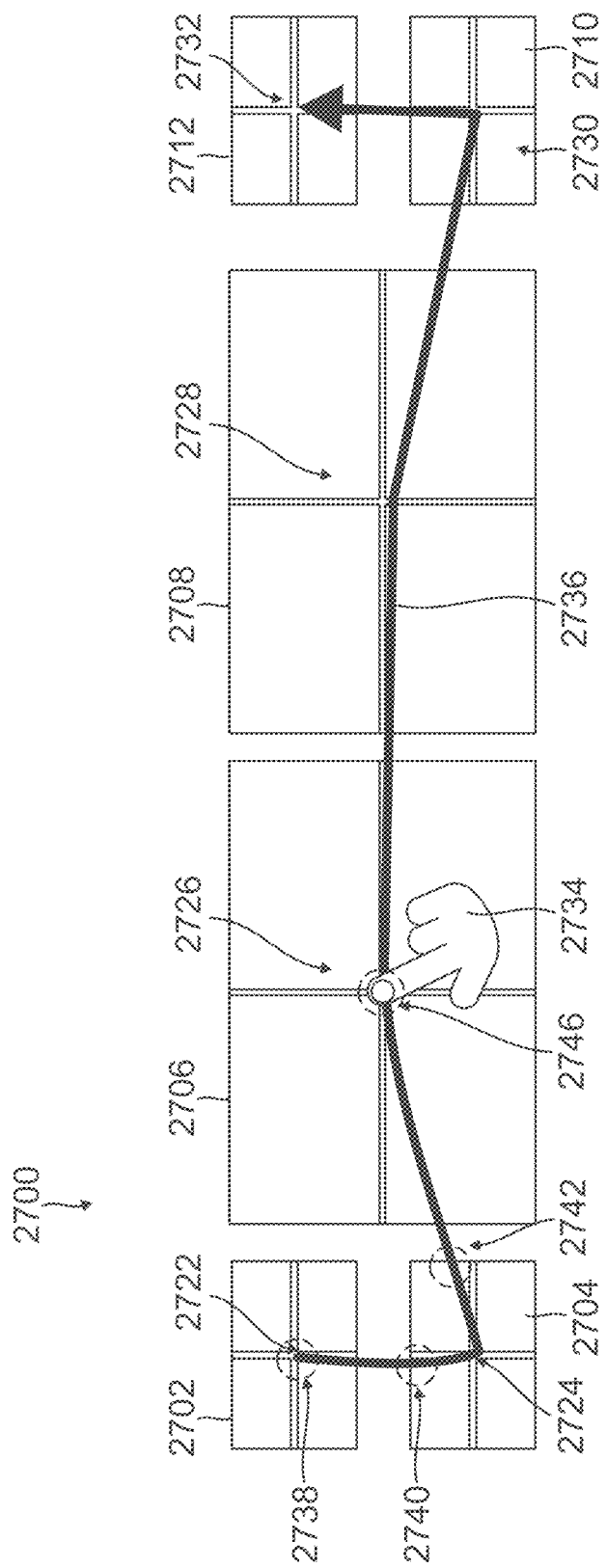
FIGS. 27A-B illustrate diagrams of pilot display systems including a user interface in accordance with an embodiment of the disclosure.

FIG. 27A illustrates a diagram of a pilot display system including a user interface 2700 in accordance with an embodiment of the disclosure. In various embodiments, user interface 2700 may be implemented with similar functionality as described with reference to user interface 120 in FIGS. 1A and 1B, and/or user interfaces 2600, 2602, and 2604 in FIGS. 5A-5D. In the embodiment shown in FIG. 6, user interface 2700 may include displays 2702-2712 that may, for example, be located in flybridge 2656 or main helm 2658.

In some embodiments, pilot display system 100 may be configured to identify the location and/or orientation of one display relative to another display. As shown in FIG. 27A, for example, the system may be configured to determine the location or orientation of first touchscreen display 2702 and second touchscreen display 2704 relative to each other. In some embodiments, touchscreen display 2702 may be implemented as a portable touchscreen display (e.g., a tablet computer) integrated with and/or networked with the other displays 2704-2712 of user interface 2700.

System 100 may be configured to detect substantially continuous swipe 2736 (e.g., user touch input) of manipulator 2734 over center points 2722 and 2724 of first and second touchscreen displays 2702 and 2704. For example, manipulator 2734 may be a human hand and/or a robotic hand, a drawing stylus, and/or a writing utensil. In some embodiments, system 100 may be configured to receive user touch inputs on center points 2722 and 2724 of first and second touchscreen displays 2702 and 2704, respectfully. For example, system 100 may be configured to determine a (first) relative orientation of touchscreen display 2702 from such user touch inputs, and identify that display 2702 is directly above and oriented similarly to touchscreen display 2704 in user interface 2700 (e.g., based on the geometry and timing of the user touch inputs/corresponding portion of substantially continuous swipe 2736). As such, the orientation and/or general position of touchscreen display 2704 relative to touchscreen display 2702 may be determined based on user touch inputs on and/or connecting center points 2722 and 2724. System 100 may be configured to render situational image data, as described herein, via one or across both touchscreen displays 2702 and 2704 based on the determined relative orientation.

In some embodiments, manipulator 2734 may make contact with each of center points 2722-2732 of displays 2702-2712, respectfully. For example, in addition to touchscreens 2702 and 2704, user interface 2700 may include touchscreen 2706. As such, the user touch input may correspond to a substantially continuous swipe 2736 motion connecting centers 2722-2726 of touchscreen displays 2702-2706, respectfully. System 100 may be configured to determine a (second) relative orientation of touchscreen display 2706 relative to touchscreen display 2702 and/or touchscreen display 2704 based on the portion of substantially continuous swipe 2736 between centers 2724 and 2726 and/or between all centers 2722, 2724, and 2726 of the three displays. Once such second relative orientation is determined, system 100 may be configured to render situational image data via one and/or across two or three of touchscreen displays 2702-2706 based on the first and/or second determined relative orientations.

In some embodiments, system 100 may be configured to determine the relative location of displays using geometry of substantially continuous swipe 2732 and/or timing between portions of swipe 2732 connecting two adjacent displays. For example, manipulator 2734 may make substantially continuous swipe 2736 by indicating entry point 2738 on display 2702 possibly followed by an entry point 2740 on display 2704. As such, the system may determine the location of display 2702 to be directly "above" display 2704 in user interface 2700 based on the direction of swipe 2732 between entry point 2738 and entry point 2740, and may be configured to determine distance between display 2702 and 2704 based on the speed of the swipe across display 2702 and the time between the user touch input at entry point 2738 and at entry point 2740. In addition, manipulator 2734 may make contact with center point 2724 followed by release point 2742. As such, the system may determine a particular angle using entry point 2740, center point 2724, and release point 2742 to estimate the location of display 2706. System 100 may be configured to further determine the relative position of display 2706 relative to display 2704 based on the center point 2746 indicated by manipulator 2734. As such, the system may determine the location of display 2704 to be proximately towards the lower left-side of display 2706. As such, the system may further determine the relative locations of displays 2702-2712 using the geometry of swipe 2736.

In some embodiments, a "nudge" feature may be used to make corrections to a particular determined relative orientation and/or position as determined by swipe 2736. In some instances, system 100/2606 may display an overall layout of the multiple displays (e.g., as image data provided on one or more displays) and various types of inputs may be used to position display-specific image data indicated in the overall layout over a corresponding display or display outline indicated in the overall layout. For example, the types of inputs may indicate up, down, left, and/or right, to allow a user to drag the image data into a particular position on the overall layout. Further, system 100/2606 may be configured to provide a snap-grid function when displaying the overall layout to help the user position and/or re-position display-specific image data on the overall layout.

In some instances, the nudge feature may be implemented as one or more of a touch, drag, tap-type swipe, flick, or other momentary user manipulation of a touchscreen at centers or edges of the displays, where each swipe, drag, or flick at a center of a display adjusts that display's longitudinal or lateral relative position depending on the direction of the swipe, drag, or flick, and where each swipe, drag, or flick at the edge of a display adjusts that display's relative orientation clockwise or counterclockwise depending on the position and/or direction of the swipe, drag, or flick. In some embodiments, the nudge feature may include system 100 analyzing entry points 2738 and 2740, and the distance between 2738 and 2740, to correct swipe 2736 between entry points 2738 and 2740. Further, system 100 may be configured to analyze the angle based on entry point 2740, center point 2724, and release point 2742, and correct the angle based on an expected orientation and/or position. Once the relative positions and/or orientations of the touchscreen displays 2702, 2704 and 2706 are determined and/or refined, system 100 may use any combination of the touchscreens to render situational image data.

For example, in some embodiments, system 100 may be configured to manage one or more alarms using user interface 2700. In particular, the system may render a visual alarm on a single display in a helm station as opposed to on multiple displays in the helm station, which might otherwise occur if the displays' positions and/or orientations were not registered to each other. For example, referring back to FIG. 24B, fuel efficiency chart 2406 may be selectively rendered on touchscreen display 2702 or 2706, possibly to alert a user (e.g., by rendering on larger touchscreen 2706) that fuel-efficiency rate 2424 is drifting away from historic-average fuel-efficiency rates 2420. In another embodiment, referring back to FIG. 25A, at least a portion of chart plot 2504 may be rendered on touchscreen display 2708 to indicate an increasing threat level and to indicate a starboard threat (e.g., in the case of contour 2516). In various embodiments, system 100 may be configured to shift and/or show certain situational data on one or more displays based on the relative importance of the data (e.g., alerts or threats on a larger display or on multiple displays simultaneously), one or more relative directions associated with the data (e.g., the direction of an imminent high level threat, or a direction at which a visible or thermal image was captured), and/or other characteristics of the data and/or associated environmental conditions.

Figure 27B:
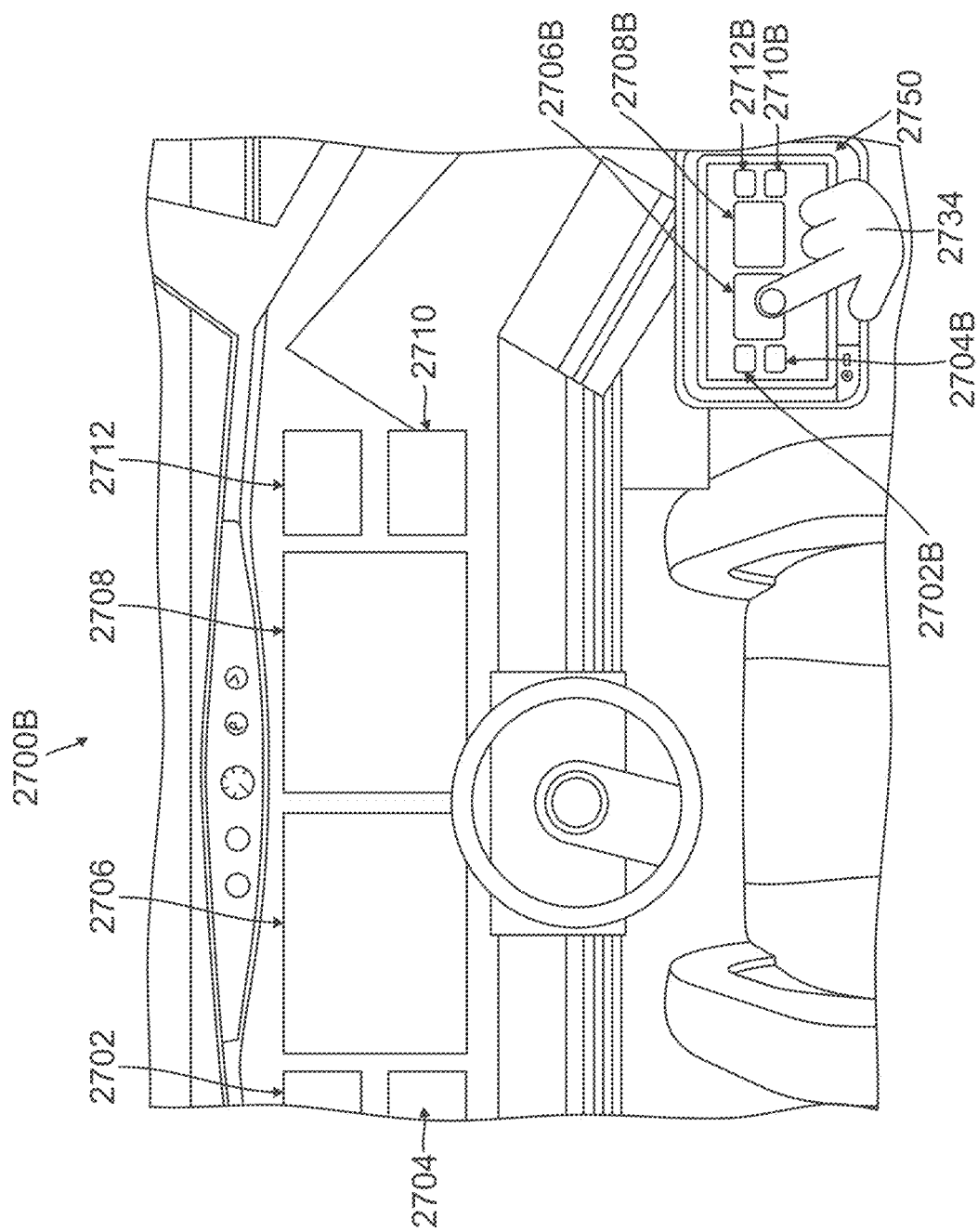

FIG. 27B illustrates a diagram of user interface 2700B of a pilot display system for mobile structure 101 in accordance with an embodiment of the disclosure. In various embodiments, user interface 2700B may be implemented with similar functionality as described with reference to user interface 2700. For example, user interface 2700B may include displays 2702-2712 and/or display 2750, which may all be manipulated by manipulator 2734. In particular, display 2750 may be implemented as a touchscreen display that is mobile/portable throughout a helmstation, a flybridge, a mobile structure, and/or a control center on land.

As shown, display 2750 may be configured to render displays 2702B-2712B (e.g., thereby providing an overall layout schematic as described herein) that correspond to/represent respective displays 2702-2712. In some embodiments, display 2750 may be configured to control operation of displays 2702-2712 remotely. For example, in some embodiments, display 2750 may be moved throughout a mobile structure and provide remote control and viewing of the content displayed by displays 2702-2712. In various embodiments, a user may manipulate display 2750 to select one or more of displays 2702-2712 to control and/or adjust. As shown in the embodiment of FIG. 27B, manipulator 2734 may select display 2706B, display 2706B may be rendered with a given color, and corresponding display 2706 may be controlled to render the same given color to indicate the selected display.

In some embodiments, display 2750 may be located remotely (e.g., on land or on another mobile structure) from mobile structure 101 and displays 2702-2712 may be located on mobile structure 101. As such, the pilot display system of mobile structure 101 may be controlled on land/remotely while mobile structure 101 is travelling on water. In one embodiment, one or more users on mobile structure 101 may sleep or perform other tasks while mobile structure 101 is controlled by separate users on land.

In various embodiments, system 100 may be configured to use user interface 2700 to implement one or more video-walls on mobile structure 101. In particular, the system may render situational image data across multiple displays, as described herein. For example, chart plot 2504 may be rendered across multiple touchscreen displays 2708, 2710, and 2712, so as to provide maximum detail, for example, such as when in risk of an imminent high level threat, or when navigating narrow waterways at high speeds. In particular, touchscreen display 2708 may show object 2510 and projected course 2512 to collision point 2514, possibly to emphasize the threat level associated with object 2510. Further, displays 2710 and 2712 may display a portion of depth contour 2516 and object 2518.

In other embodiments, system 100 may be configured to manage and/or substantially eliminate duplications. For example, in one embodiment, system 100 may be configured to render situational image data on display 2706 and render the same data on display 2708 possibly to emphasize, for example, a threat level with object 2510. Referring back to FIGS. 2A and 2B, system 100 may be configured to also avoid duplicating data, e.g., speed 2332, depth reading 2334, and/or data bar 2304. In another embodiment, system 100 may be configured to avoid duplicating controls, e.g., menu and way point of data bar 24, over multiple displays at a single helmstation.

In additional embodiments, system 100 may be configured to implement one or more operational modes. For example, the system may modify the situational image data displayed in a helmstation based on the higher speed mode and/or the easy view mode described above in relation to FIGS. 2A and 2B. Further, the system may implement other modes such as a docking mode and/or an anchoring mode, where port or starboard displays show corresponding port or starboard docking camera imagery, sonar imagery, radar and/or LIDAR imagery, and/or other situational image data. In some instances, situational image data may be rendered in easy view mode on one display and docking mode on another display in a single helmstation. In similar embodiments, system 100 may be configured to implement a mode associated with a particular station on a mobile structure. For example, referring back to FIG. 26D, system 100 may be configured to implement a helm station mode in helmstation 2658, a flybridge mode in flybridge 2656, and/or an engine monitoring mode in an engine room of a mobile structure. As such, the flybridge mode may render image data used for docking and/or fishing, the main helm mode may render image data for general navigational purposes, and the engine monitoring mode may render primarily operational aspects of the propulsion system (e.g., fuel usage, fuel efficiency, engine temperature, oil pressure, and/or other propulsion system monitoring data, which may be graphed over time.

In further embodiments, system 100 may be configured to implement different settings for each of one or more stations. For example, basic non-color palettes (e.g., color palettes suitable for outdoor conditions such as sunny and/or rainy conditions) may be provided in flybridge 2656 and color palettes suitable for indoor conditions may be provided in main helm 2658, to account for differing light levels and to enhance visibility of a display. In other embodiments, a low light palette (e.g., red-scale) may be used for a flybridge or main helm at night to reduce a risk of night blindness. Likewise, system 100 may be configured to apply particular brightness settings at any helmstation or across certain areas of a helmstation to facilitate visibility of image data. For example, system 100 may be configured to implement a power saving mechanism to control the powering on and powering off of any one of displays 2702-2712. Further, the power saving mechanism may be controlled within main helm 2658 and/or remotely from other stations of the mobile structure.

In one embodiment, similar to that described with reference to FIG. 27B, once the co-location and relative positions and/or orientations of the displays are determined, system 100 may be configured to implement a remote control and/or viewing mode to enable remote control and/or viewing of the touchscreen displays using a separate portable electronic device (e.g., a tablet, smart phone, and/or other portable electronic device with a user interface) and/or one or more displays in a separate helmstation. For example, in some embodiments, system 100 may be configured to detect a user leaving a helmstation and to render a virtual display configuration corresponding to user interface 2700 of FIG. 27A on a portable electronic device carried by the user, which allows the user to view and/or control user interface 2700 remotely while carrying the portable electronic device about main helm 2658, flybridge 2656, and/or the engine room. As noted above, display 2702 may be implemented as such portable electronic device, and may be selectively removed from user interface 2700 according to user input and/or detection of the user leaving the corresponding helmstation with display 2702.

Figure 28:
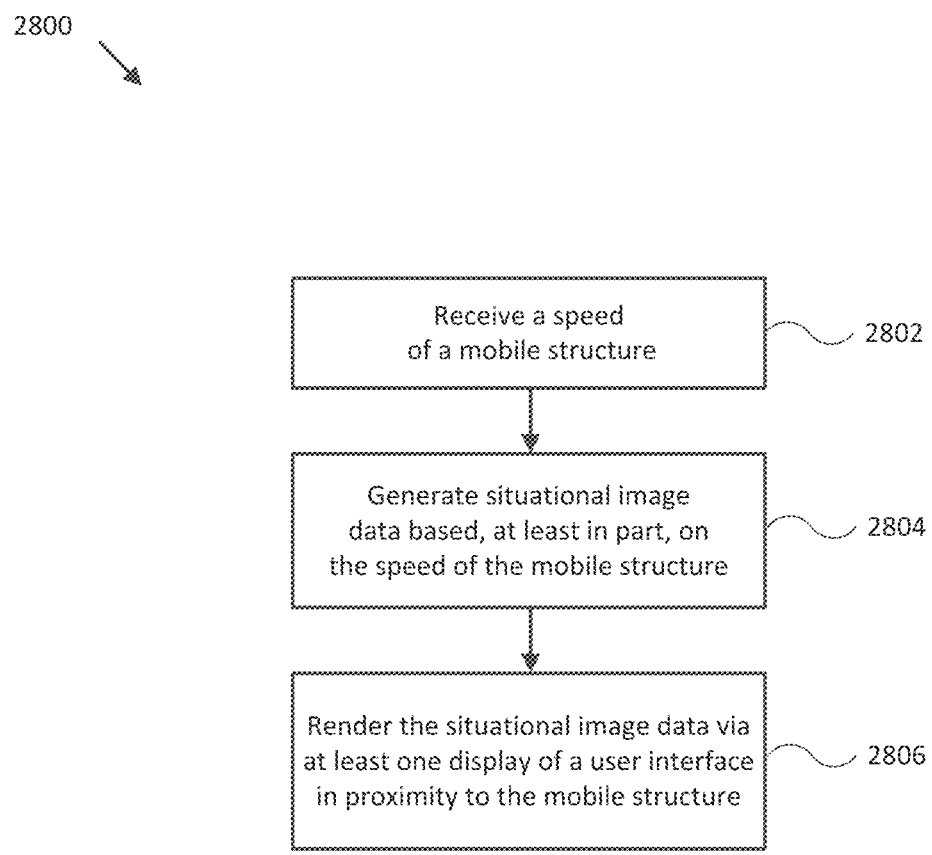
FIG. 28 illustrates a flow diagram of various operations to operate a pilot display system in accordance with an embodiment of the disclosure.

Turning now to FIG. 28, FIG. 28 illustrates a flow diagram of process 2800 to provide situational image data for mobile structure 101 in accordance with embodiments of the disclosure. In some embodiments, the operations of FIG. 28 may be implemented as software instructions executed by one or more logic devices associated with corresponding electronic devices, sensors, and/or structures depicted in FIGS. 1A through 6. More generally, the operations of process 2800 may be implemented with any combination of software instructions and/or electronic hardware (e.g., inductors, capacitors, amplifiers, actuators, or other analog and/or digital components).

It should be appreciated that any step, sub-step, sub-process, or block of process 2800 may be performed in an order or arrangement different from the embodiment illustrated by FIG. 28. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although process 2800 is described with reference to systems described in reference to FIGS. 1A-6B, process 2800 may be performed by other systems different from those systems and including a different selection of electronic devices, sensors, assemblies, mobile structures, and/or mobile structure attributes.

Process 2800 represents a method for providing situational image data 2300, 2302, 2400, 2402, 2500, 2502, via user interfaces 120/130, 2600, 2602, 2604, and 2700 in accordance with embodiments of the disclosure. At the initiation of process 2800, various system parameters may be populated by prior execution of a process similar to process 2800, for example, or may be initialized to zero and/or one or more values corresponding to typical, stored, and/or learned values derived from past operation of process 2800, as described herein.

In block 2802, a logic device receives a speed of a mobile structure. For example, controller 130 of systems 100 or 100B may be configured to receive a speed of mobile structure 101 from speed sensor 142 mounted to mobile structure 101. In other embodiments, controller 130 may be configured to determine a speed of mobile structure 101 from multiple position measurements provided by GPS 146. In some embodiments, controller 130 may also receive an orientation of mobile structure 101 from orientation sensor 140. Controller 130 may be configured to detect a user presence at user interface 120 by a proximity sensor and/or a change in light level by a light sensor near user interface 120. Controller 130 may also be configured to receive a fuel-usage rate from a fuel-usage sensor configured to measure an amount of fuel used by the mobile structure. Controller 130 may be configured to receive a location of mobile structure 101 from GPS 146 and a location of an object from target sensor configured to detect the object in relation to mobile structure 101. In various embodiments, controller 130 may be configured to receive touch inputs from one or more touchscreen displays.

In block 2804, a logic device generates situational image data based, at least in part on, the speed of the mobile structure. For example, controller 130 may be configured to generate situational image data corresponding to a chart plot that is scaled, oriented, and/or brightened according to the speed, orientation, detected user presence, and/or change in light level received or detected in block 2802. In some embodiments, controller 130 may be configured to generate fuel efficiency charts and/or chart plots indicating varying threat levels associated with objects near mobile structure 101.

In block 2806, a logic device renders situational image data via at least one display of a user interface in proximity to the mobile structure. For example, controller 130 may be configured to render the situational image data generated in block 2804 via one or more displays of user interface 120. In some embodiments, controller 130 may be configured to render the situational data via a first display and a second display, based on the orientation of the second display relative to the first display as described with references to FIGS. 27A-B.

It is contemplated that any one or combination of methods to provide situational image data may be performed according to one or more operating contexts of a control loop, for example, such as a startup, learning, running, and/or other type operating context. For example, process 2800 may proceed back to block 2802 and proceed through process 2800 again to produce updated situational image data, as in a control loop.

Embodiments of the present disclosure can thus provide situational image data rendered in a highly intuitive form that can be easily and quickly comprehended by a user or pilot of a mobile structure. Such embodiments may provide situational image data to assist in navigation of a mobile structure, survey of a body of water, and/or to assist in the operation of other systems, devices, and/or sensors coupled to the mobile structure.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising:
   a transmitter configured to transmit pulses of continuous wave (CW) and pulse compression (FM) sonar signals to a sonar transducer;
   a receiver configured to receive acoustic returns comprising echoes of the transmitted sonar signals;
   a user interface configured to receive user input and provide user feedback with respect to a mobile structure, wherein the mobile structure is a watercraft; and
   a logic device configured to communicate with the transmitter, the receiver, and the user interface, wherein the logic device is configured to:
      process the acoustic returns into CW and FM sonar image data sets corresponding to the CW and FM sonar signals;

receive a speed of the mobile structure from a speed sensor mounted to the mobile structure;
determine one or more threats to the mobile structure based at least on the speed of the mobile structure, wherein the determining the one or more threats comprises determining a threat level of each of the one or more threats relative to the mobile structure;
generate situational image data based, at least in part, on the speed of the mobile structure and the one or more threats, wherein the situational image data comprises an overhead chart plot of the one or more threats in a geographical area near the mobile structure, the overhead chart plot comprising at least one of mapping data or navigation data, and wherein the overhead chart plot is adjusted based on an updated speed of the mobile structure relative to the one or more threats indicated in the overhead chart plot, an updated position of the mobile structure relative to the one or more threats indicated in the overhead chart plot, and an updated threat level of the one or more threats indicated in the overhead chart plot; and
render the situational image data via at least one display of the user interface, wherein rendering the situational image data comprises overlaying the CW and FM sonar image data sets in an overlay image of the overhead chart plot.

2. The system of claim 1, wherein the logic device is configured to:
generate the situational image data such that a center position of the overhead chart plot as rendered via the at least one display leads a position of the mobile structure according to an expected trajectory of the mobile structure and a level of detail of the overhead chart plot is increased or decreased according to the received speed of the mobile structure.

3. The system of claim 1, wherein the logic device is configured to:
receive a fuel-usage rate from a fuel-usage sensor configured to measure an amount of fuel used by the mobile structure; and
determine a fuel-efficiency rate of the mobile structure based, at least in part, on the fuel-usage rate and the speed of the mobile structure, wherein the situational image data comprises a fuel efficiency chart and the determined fuel-efficiency rate is plotted against the speed of the mobile structure on the fuel efficiency chart.

4. The system of claim 1, further comprising:
the sonar transducer, wherein the sonar transducer is configured to ensonify a target column of water; and
wherein:
the logic device is configured to process the acoustic returns into a relatively high resolution sonar image data set and to post-process the relatively high resolution sonar image data set to generate a blurred sonar image data set;
the user interface is configured to display the relatively high resolution and blurred sonar image data sets such that either the relatively high resolution or the blurred sonar image data set overlays the other sonar image data set; and
the situational image data comprises the relatively high resolution and blurred sonar image data sets.

5. A method for providing an enhanced sonar image using the system of claim 4, the method comprising:
ensonifying a target column of water with sonar beams corresponding to the pulses of FM sonar signals;
receiving acoustic returns comprising echoes of the ensonifying beams;
processing the acoustic returns into the relatively high resolution sonar image data set corresponding to the FM sonar signals;
post-processing the relatively high resolution sonar image data set to generate the blurred sonar image data set; and
displaying the relatively high resolution and blurred sonar image data sets such that either the relatively high resolution or the blurred sonar image data set overlays the other sonar image data set.

6. The system of claim 1, further comprising:
the sonar transducer, wherein the sonar transducer is configured to ensonify a target column of water,
wherein the transmitter is configured to:
transmit a pulsed CW signal and a pulsed FM signal simultaneously;
transmit a pulsed CW signal and a pulsed FM signal sequentially with substantially no delay between transmissions;
transmit a pulsed CW signal and a pulsed FM signal separated by a delay; and/or
transmit pulsed CW and FM signals in a pattern or an alternating fashion,
wherein each CW or FM pulse defines a single ping and successive pairs of CW or FM pings are separated by a pulse repetition interval (PRI); and
wherein:
the user interface is configured to display the CW and FM sonar image data sets simultaneously or contemporaneously and overlaid in the overlay image of the overhead chart plot.

7. The system of claim 6, wherein:
the sonar transducer is a multichannel transducer;
the transmitter is configured to form an angular array of transmit beams having generally equal transmissivity and extending radially from a single point at discrete angular intervals and/or the receiver is configured to form an angular array of receive beams having generally equal sensitivity and extending radially from a single point at discrete angular intervals; and
the logic device comprises at least one of an analog to digital converter (ADC), a finite impulse response (FIR) filter, a fast Fourier transformer (FFT), an inverse fast Fourier transformer (IFFT), a comparator configured to compare the acoustic returns to the transmitted signals, and/or a comparator configured to compare the acoustic returns to complex conjugates of the transmitted signals.

8. The system of claim 1, further comprising a proximity sensor and/or a light sensor configured to detect a proximity of a user relative to the user interface, wherein the logic device is configured to:
receive an orientation of the mobile structure from an orientation sensor mounted to the mobile structure;
generate the situational image data based, at least in part, on the orientation and the speed, wherein the situational image data corresponds to a chart plot of a geographical area near the mobile structure that is scaled according to the speed of the mobile structure;
determine the proximity of the user to the user interface; and
modify characteristics of the situational image data based on the determined proximity of the user.

9. The system of claim 1, wherein the at least one display comprises first and second touchscreen displays and the logic device is configured to:
- receive user touch input on the first and second touchscreen displays;
- determine a relative orientation of the second display relative to the first display based, at least in part, on the user touch input; and
- render the situational image data via at least one of the first and second touchscreen displays based, at least in part, on the determined relative orientation.

10. The system of claim 9, wherein:
- the relative orientation comprises a first relative orientation;
- the at least one display comprises a third touchscreen display;
- the user touch input comprises a substantially continuous swipe motion connecting centers of the first, second, and third touchscreen displays; and
- the logic device is configured to:
  - determine a second relative orientation of the third touchscreen display relative to the first and/or second touchscreen displays based, at least in part, on the substantially continuous swipe motion; and
  - render the situational image data via the at least one of the first, second, and third touchscreen displays based, at least in part, on the first and/or second determined relative orientations.

11. The system of claim 1, further comprising:
- the speed sensor;
- the at least one display of the user interface;
- an orientation sensor, a GPS, a fuel-usage sensor, and/or a target sensor mounted to the mobile structure; and/or
- a proximity sensor and/or a light sensor configured to detect a proximity of a user relative to the user interface;
- wherein the logic device is configured to generate the situational image data based on the speed, location, and/or orientation of the mobile structure, a fuel usage rate for the mobile structure detected by the fuel-usage sensor, a location of an object detected by the target sensor, and/or a proximity of the user to the user interface.

12. The system of claim 1, wherein the logic device is configured to:
- receive a direction of the mobile structure from an orientation sensor mounted to the mobile structure;
- determine the one or more threats to the mobile structure based at least on the speed and the direction of the mobile structure; and
- adjust the situational image data based on the speed and the direction of the mobile structure, wherein the adjusting comprises switching between a first view mode and a second view mode, the second view mode removing one or more features or controls from the overhead chart plot based on an updated speed of the mobile structure.

13. A method comprising:
- ensonifying a target column of water with sonar beams corresponding to pulses of continuous wave (CW) and pulse compression (FM) sonar signals;
- receiving acoustic returns comprising echoes of the ensonifying beams;
- processing the acoustic returns into CW and FM sonar image data sets corresponding to the CW and FM sonar signals;
- receiving a speed of a mobile structure, wherein the mobile structure includes a watercraft;
- determining one or more threats to the mobile structure based at least on the speed of the mobile structure, wherein the determining the one or more threats comprises determining a threat level of each of the one or more threats relative to the mobile structure;
- generating situational image data based, at least in part, on the speed of the mobile structure and the one or more threats, wherein the situational image data comprises an overhead chart plot of the one or more threats in a geographical area near the mobile structure, the overhead chart plot comprising at least one of mapping data or navigation data, and wherein the overhead chart plot is adjusted based on an updated speed of the mobile structure relative to the one or more threats indicated in the overhead chart plot, an updated position of the mobile structure relative to the one or more threats indicated in the overhead chart plot, and an updated threat level of the one or more threats indicated in the overhead chart plot; and
- rendering the situational image data via at least one display of a user interface in proximity to the mobile structure, wherein the rendering the situational image data comprises overlaying the CW and FM sonar image data sets in an overlay image of the overhead chart plat.

14. The method of claim 13, further comprising:
- receiving an orientation of the mobile structure; and
- generating the situational image data based, at least in part, on the orientation and the speed, wherein a center position of the overhead chart plot as rendered via the at least one display leads a position of the mobile structure according to an expected trajectory of the mobile structure, and a level of detail of the overhead chart plot is increased or decreased according to the received speed of the mobile structure.

15. The method of claim 13, further comprising:
- receiving a fuel-usage rate from a fuel-usage sensor configured to measure an amount a fuel used by the mobile structure; and
- determining a fuel-efficiency rate of the mobile structure based, at least in part, on the fuel-usage rate and the speed of the mobile structure, wherein the situational image data comprises a fuel efficiency chart and the determined fuel-efficiency rate plotted against the speed of the mobile structure on the fuel efficiency chart.

16. The method of claim 13, wherein the at least one display comprises first and second touchscreen displays, the method further comprising:
- receiving user touch input on the first and second touchscreen displays;
- determining a relative orientation of the second display relative to the first display based, at least in part, on the user touch input; and
- rendering the situational image data via at least one of the first and second touchscreen displays based, at least in part, on the determined relative orientation.

17. The method of claim 13, wherein:
- the relative orientation comprises a first relative orientation;
- the at least one display comprises a third touchscreen display;
- the user touch input comprises a substantially continuous swipe motion connecting centers of the first, second, and third touchscreen displays; and the logic device is configured to:
- determine a second relative orientation of the third touchscreen display relative to the first and/or second touchscreen displays based, at least in part, on the substantially continuous swipe motion; and
- render the situational image data via the at least one of the first, second, and third touchscreen displays based, at least in part, on the first and/or second determined relative orientations.

18. The method of claim 13, further comprising:
wherein the ensonifying comprises one or more of:
- transmitting a pulsed CW signal and a pulsed FM signal simultaneously;
- transmitting a pulsed CW signal and a pulsed FM signal sequentially with substantially no delay between transmissions;
- transmitting a pulsed CW signal and a pulsed FM signal separated by a delay; and/or
- transmitting a pulsed CW and FM signals in a pattern or an alternating fashion,
- wherein each CW or FM pulse defines a single ping and successive pairs of CW or FM pings are separated by a pulse repetition interval (PRI); and
- displaying the CW and FM sonar image data sets overlaid in the overlay image of the overhead chart plot.

19. The method of claim 18, wherein the displaying comprises at least one of transposing the image data sets from a polar coordinate system to a rectangular coordinate system and/or scaling the image data sets to fit a rectangular display.

20. The method of claim 13, further comprising:
- receiving a direction of the mobile structure from an orientation sensor mounted to the mobile structure;
- generating the situational image data based on the speed and the direction of the mobile structure; and
- modifying the situational image data based at least on an updated speed and/or an updated direction of the mobile structure, wherein the modifying the situational image data comprises switching between a first view mode and a second view mode, the second view mode removing one or more features or controls from the overhead chart plot based on the updated speed and/or the updated direction of the mobile structure.

* * * * *

UNITED STATES PATENT AND TRADEMARK OFFICE
CERTIFICATE OF CORRECTION

PATENT NO. : 11,624,822 B2
APPLICATION NO. : 15/494232
DATED : April 11, 2023
INVENTOR(S) : Stokes et al.

It is certified that error appears in the above-identified patent and that said Letters Patent is hereby corrected as shown below:

In the Specification

Column 1, Line 19, change "patent application Ser. No." to --Patent Application No.--.

Column 28, Line 9, change "in water, c 1500" to --in water, c $\approx$ 1500--.

Column 34, Line 12, change "patent application Ser. No." to --Patent Application No.--.

Signed and Sealed this
Thirteenth Day of June, 2023

Katherine Kelly Vidal
*Director of the United States Patent and Trademark Office*